US012218762B2

(12) United States Patent
Iyer et al.

(10) Patent No.: US 12,218,762 B2
(45) Date of Patent: Feb. 4, 2025

(54) AUTONOMOUS UPLINK TRANSMISSION IN UNLICENSED NEW RADIO SPECTRUM

(71) Applicant: InterDigital Patent Holdings, Inc., Wilmington, DE (US)

(72) Inventors: Lakshmi R. Iyer, King of Prussia, PA (US); Joseph M. Murray, Schwenksville, PA (US); Mohamed Awadin, Plymouth Meeting, PA (US); Qing Li, Princeton Junction, NJ (US); Yifan Li, Conshohocken, PA (US); Guodong Zhang, Woodbury, NY (US); Pascal M. Adjakple, Great Neck, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 4 days.

(21) Appl. No.: 17/265,245

(22) PCT Filed: Aug. 8, 2019

(86) PCT No.: PCT/US2019/045708
§ 371 (c)(1),
(2) Date: Feb. 2, 2021

(87) PCT Pub. No.: WO2020/033689
PCT Pub. Date: Feb. 13, 2020

(65) Prior Publication Data
US 2022/0116152 A1    Apr. 14, 2022

Related U.S. Application Data

(60) Provisional application No. 62/734,516, filed on Sep. 21, 2018, provisional application No. 62/716,607, filed on Aug. 9, 2018.

(51) Int. Cl.
*H04L 1/1812*    (2023.01)
*H04L 1/1829*    (2023.01)

(52) U.S. Cl.
CPC .......... *H04L 1/1819* (2013.01); *H04L 1/1854* (2013.01)

(58) Field of Classification Search
CPC .... H04L 1/1819; H04L 1/1854; H04L 1/1896
See application file for complete search history.

(56) References Cited

U.S. PATENT DOCUMENTS 11,303,392 B2 * 4/2022 Sun ...................... H04L 1/1614
2006/0176811 A1   8/2006 Yang et al.
(Continued)

FOREIGN PATENT DOCUMENTS

| AU | 2015200794 A1 | 3/2015 |
| CN | 103339893 A | 10/2013 |
| CN | 105071902 A | 11/2015 |

OTHER PUBLICATIONS

Ericsson: "On AUL support on LAA sCell" 3GPP Draft; R1-1713310, 3rd Generation Partnership Project (3GPP), Mobile Competence Centre; 650, Route Des Lucioles; F-06921 Sophia-Antipolis Cedex; France vol. RAN WG1, No. Prague, Czech Republic; Aug. 21, 2017-Aug. 25, 2017 (Aug. 20, 2017), XP051316114, Retrieved from the Internet: URL:http://www.3gpp.org/ftp/Meetings3GPP_SYNC/RAN1/Docs/ [retrieved on Aug. 20, 2017].

(Continued)

*Primary Examiner* — Jamal Javaid
*Assistant Examiner* — Ryan C Kavleski
(74) *Attorney, Agent, or Firm* — Flaster Greenberg, P.C.

(57) ABSTRACT

Hybrid automatic repeat request (HARQ) processes may be transmitted via configured grants as well as scheduled grants. The configured grants may include time and frequency resources, and transmissions may occur across con- (Continued)

tiguous transmissions. HARQ process information, such as HARQ IDs and redundancy versions, may be communicated via a control channel, and the control channel may be multiplexed with the transmission resources of the configured grants. Retransmission timers may be used for HARQ processes conveyed via configured grants, and the transmitting apparatus may signal to a receiver when to send an acknowledgement. An acknowledgement may take the form of bitmaps for code block groups of a HARQ. A configured grant may be selected from among multiple configured grants based upon low latency, for example. A group of configured grants may be activated or deactivated via a single command.

18 Claims, 82 Drawing Sheets

(56) References Cited

U.S. PATENT DOCUMENTS

| | | | |
|---|---|---|---|
| 2012/0294204 | A1 | 11/2012 | Chen et al. |
| 2016/0174259 | A1 | 6/2016 | Mukherjee et al. |
| 2017/0310431 | A1 | 10/2017 | Iyer et al. |
| 2017/0367110 | A1 | 12/2017 | Li et al. |
| 2018/0014298 | A1* | 1/2018 | Sun ............... H04W 72/21 |
| 2018/0048432 | A1 | 2/2018 | Sun et al. |
| 2019/0149308 | A1* | 5/2019 | Son ............... H04L 5/0007 375/260 |
| 2019/0342911 | A1* | 11/2019 | Talarico ........... H04L 5/0098 |
| 2019/0379518 | A1* | 12/2019 | Yang ............... H04W 72/51 |
| 2019/0386780 | A1* | 12/2019 | Zou ............... H04L 1/1657 |
| 2020/0007296 | A1* | 1/2020 | Papasakellariou ... H04L 5/001 |
| 2020/0287691 | A1* | 9/2020 | Baldemair ........ H04L 5/0055 |

OTHER PUBLICATIONS

Huawei et al. "Transmission with configured grant in NR unlicensed band", 3GPP Draft; R1-1805922, 3rd Generation Partnership Project (3GPP), Mobile Competence Centre; 650, Route Des Lucioles; F-06921 Sophia-Antipolis Cedex; France vol. RAN WG1, No. Busan, Korea; May 21, 2018-May 25, 2018 (May 20, 2018), XP051441141, Retrieved from the Internet: URL:http://www.3gpp.org/ftp/Meetings%5F3GPP%5FSVNC/RAN1/Docs/ [retrieved on May 20, 2018].

Huawei et al., "UL data transmission with and without SR/UL grant", 3GPP Draft; R1-1715419, 3rd Generation Partnership Project (3GPP), Mobile Competence Centre ; 650, Route Des Lucio Les F-06921 Sophia-Antipolis Cedex; France No. Nagoya, Japan; Sep. 18, 2017-Sep. 21, 2017 (Sep. 17, 2017), XP051338887 Retrieved from the Internet: URL:http://www.3gpp.org/ftp/Meetings_3GPP_SVNC/RAN1/Docs/ [retrieved on Sep. 17, 2017].

Third Generation Partnership Project (3GPP), "Physical layer procedures"; Technical Specification Group Radio Access Network; Evolved Universal Terrestrial Radio Access (E-UTRA); Release 15, 3GPP TS 36.213 V15.0.0, Dec. 2017, 493 pages.

Third Generation Partnership Project (3GPP), "Overall description", Technical Specification Group Radio Access Network; Evolved Universal Terrestrial Radio Access (E-UTRA) and Evolved Universal Terrestrial Radio Access Network (E-UTRAN); Stage 2, Release 15, 3GPP TS 36.300 V15.0.0, Dec. 2017, 338 pages.

Third Generation Partnership Project (3GPP), "Medium Access Control (MAC) protocol specification", Technical Specification Group Radio Access Network; NR; Release 15, 3GPP TS 38.321 V15.1.0, Mar. 2018, 67 pages.

Third Generation Partnership Project (3GPP), "Radio Resource Control (RRC) protocol specification", Technical Specification Group Radio Access Network; NR; Release 15, 3GPP TS 38.331 V15.1.0, Mar. 2018, 268 pages.

Third Generation Partnership Project (3GPP), "Study on Scenarios and Requirements for Next Generation Access Technologies", Technical Specification Group Radio Access Network; Release 14, 3GPP TR 38.913 V14.3.0, Jun. 2017, 39 pages.

ETSI, "Harmonised Standard covering the essential requirements of article 3.2 of Directive 2014/53/EU" 5GHz RLAN; ETSI EN 301 893 V2.1.1, Sophia Antipolis Cedex, France, May 2017, 122 pages.

Ling, et al., "Practical LTE and Wi-Fi Coexistence Techniques beyond LBT", 6 pages.

Third Generation Partnership Project (3GPP), "LS on RRC parameters for FeLAA", RAN1, 3GPP TSG RAN WG1 Meeting #92, Athens, Greece, Feb. 26-Mar. 2, 2018, R1-1803168, 1 page.

Third Generation Partnership Project (3GPP), "Handling of SPS and CS Reconfiguration", Ericsson, 3GPP TSG-RAN WG2 AH 1807, Montreal, Canada, Jul. 2-6, 2018, Tdoc R2-1810183, 4 pages.

Third Generation Partnership Project (3GPP), "Discussion on BWP operation for NR-U", Huawei, HiSilicon, 3GPP TSG-RAN WG2 Meeting#AH-1807, Montreal, Canada, Jul. 2-6, 2018, R2-1810579, 3 pages.

Third Generation Partnership Project (3GPP), "BWP selection based on HARQ process ID in NR-U", LG Electronics, 3GPP TSG-RAN WG2 Ad hoc 1807, Montreal, Canada, Jul. 2-6, 2018, R2-1810597, 2 pages.

Wikipedia Definition of Network Allocation Vector, 1 page.

Third Generation Partnership Project (3GPP), 3GPP RAN1 status on LAA and NR-Unlicensed, IEEE 802.11-18/0542r0, Mar. 2018, 24 pages.

Third Generation Partnership Project (3GPP), "RAN1 Chairman's Notes", RAN1, 3GPP TSG RAN WG1 Meeting #92bis, Sanya, China, Apr. 16-20, 2018, 153 pages.

Third Generation Partnership Project (3GPP), "RAN1 Chairman's Notes", RAN1, 3GPP TSG RAN WG1 Meeting #93, Busan, Korea, May 21-25, 2018, 166 pages.

Third Generation Partnership Project (3GPP), "Chairman Notes", RAN2 Chairman (Intel), 3GPP TSG-RAN WG2 NR Ad hoc 1801, Vancouver, Canada, Jan. 22-Jan. 26, 2018, 91 pages.

MulteFire Alliance, "Guidelines for MulteFire Specifications (Release 1)", MFA TR MF.100 V1.0.1, Apr. 2017, Fremont, CA, 7 pages.

MulteFire Alliance, "User Equipment (UE) Procedures in Idle Mode", Technical Specification Group Radio Access Network; Evolved Universal Terrestrial Radio Access (E-UTRA); Release 1, MF TS 36.304 V1.0.1, May 2017, Fremont, CA, 59 pages.

* cited by examiner

Figure 36 S-UL retransmission in NR-AUL resource

FIG. 49

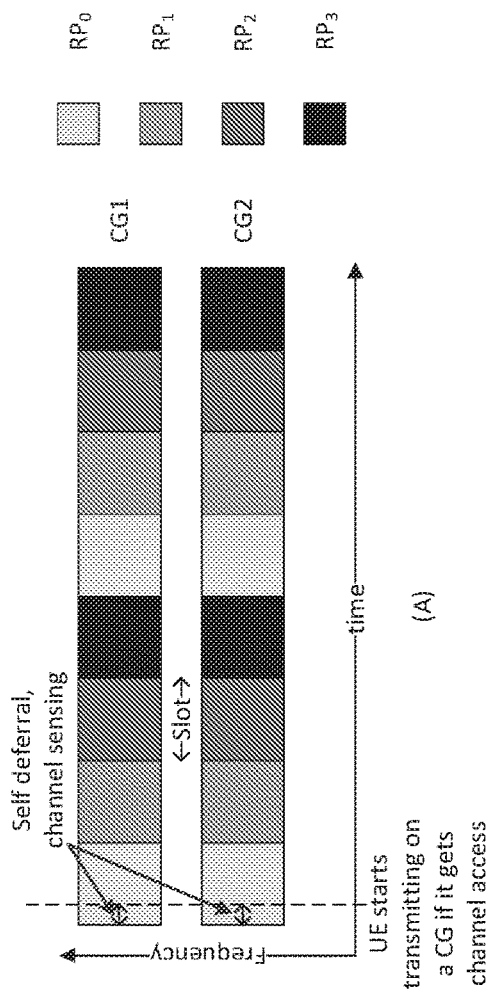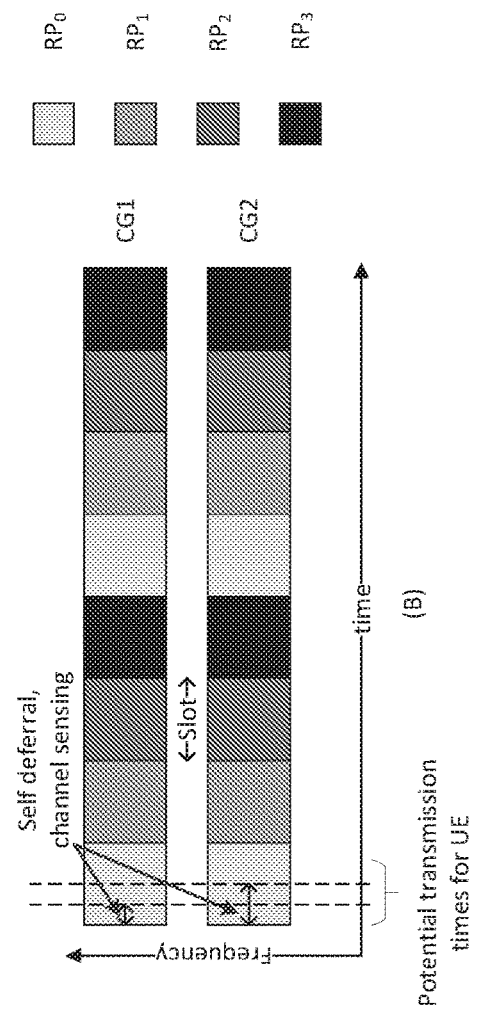
FIG. 68A
FIG. 68B

AUTONOMOUS UPLINK TRANSMISSION IN UNLICENSED NEW RADIO SPECTRUM

CROSS-REFERENCE TO RELATED APPLICATIONS

This application is the National Stage Application of International Patent Application No. PCT/US2019/045708 filed Aug. 8, 2019 which draws priority from U.S. Patent Application Ser. 62/716,607 filed Aug. 9, 2018, and U.S. Patent Application Ser. No. 62/734,516 filed Sep. 21, 2018, both titled "Autonomous uplink transmission in unlicensed new radio spectrum," the contents of which are hereby incorporated by reference in their entireties.

BACKGROUND

Machine-To-Machine (M2M), Internet-of-Things (IoT), and Web-of-Things (WoT) network deployments may include nodes such as M2M/IoT/WoT servers, gateways, and devices which host M2M/IoT/WoT applications and services. Such network deployments may include, for example, constrained networks, wireless sensor networks, wireless mesh networks, mobile ad-hoc networks, and wireless sensor and actuator networks.

SUMMARY

In unlicensed spectra of new radio, for example, autonomous uplink transmission may be achieved via a variety of means. These include: flexible time resource allocation for autonomous operation; transmission of UL control information content and resource mapping on autonomously transmitted PUSCH; UE-COT sharing to enable ACK/NACK feedback in a DL CORESET; autonomous frequency resource selection across BWPs; and BWP switching methods to access autonomous resources, for example.

Flexible time resource allocation may be supported in unlicensed spectra of new radio by a variety of means. For example, a gNB may configures a UE's NR-Autonomous UpLink (NR-AUL) transmission as an RRC based resource allocation (Type-1 NR-AUL) or DCI activated resource allocation (Type-2 NR-AUL).

Similarly, a gNB provides may provide CBG based ACK/NACK feedback to UE for NR-AUL PUSCH. Here, the gNB may use Code Block Group (CBG) based feedback only if CBG is NACKed, or the gNB may use Transport Block (TB) based feedback.

A UE may select the MCS and indicate it through NR-AUL-Uplink Control Information (NR-AUL-UCI) on certain PUSCH transmissions. A gNB may configures a UE with a bitmap of NR-AUL resources through RRC or DCI. UEs may transmit NR-AUL PUSCH beginning from multiple OFDM symbols (OS). A UE may indicate PUSCH duration through NR-AUL-UCI.

UEs may use the same number of resources for NR-AUL-UCI on PUSCH regardless of PUSCH symbol length. UEs may scramble NR-AUL-UCI using a scrambling sequence that is common to multiple NR-AUL-UCIs so that gNB can descramble without knowledge of the UE ID. Data on PUSCH may be scrambled by UE-specific scrambling sequence. UEs may repeat PUSCH transmissions but may transmit NR-AUL-UCI only one the first transmission. A UE may sets the NRAULTransmissionTimer timer every time a NR-AUL PUSCH is transmitted, including repetitions, and, on expiration, the UE may retransmit the PUSCH. A UE may share COT with gNB and multiple UL and DL switches may be supported. RTS-CTS handshaking may occur through COT sharing. A UE may transmits the RTS as UCI without data on the NR-AUL PUSCH resource.

A gNB may configure aperiodic CORESET with flexible time resource so that UE can receive control information from gNB during COT sharing.

UE may share COT only on time resources where CORESETs are configured to it. Here, a UE may indicate the CORESET or search space for COT sharing by transmitting CORESET and/or search space set ID through the NR-AUL-UCI.

FDM UEs may share COT with gNB by allowing COT sharing to occur on pre-configured time resource.

Frequency resources may be managed unlicensed spectra of new radio by a number of means. For example, a UE may autonomously select a frequency resource for NR-AUL transmission. A gNB may configure multiple NR-AUL frequency resources per BWP to the UE through RRC. A gNB may configure multiple BWPs to the UE through RRC. The gNB may activate multiple BWPs to the UE at a given time.

Similarly, a UE may autonomously switch from one frequency resource to another if it aulResourceSwachTimer on a frequency resource expires. A UE may transmit the identity of the frequency resource in the NR-AUL-UCI. A UE may autonomously select a frequency resource for transmission and return to the previous frequency resource after completing the autonomous transmission. AUE may autonomously select a frequency resource for transmission and the gNB switches the DL BWP correspondingly to BWP of that resource. A UE transmit S-UL transmission and subsequently a retransmission as an NR-AUL transmission.

Herein are described enhancements to configured grants to support multiple repetitions; multiple grant configuration to UE; group-grant configuration to reconfigure/activate/update multiple grants at once; switching between configured grants; frequency and time hopping of UE resources to minimize chance of collisions.

A UE may have multiple NR-AUL grants configured with different timing offsets in a frequency resource; UE selects the grant for which it gets channel access.

A UE may use a different interlace in each repetition of its HARQ process transmission.

The following enhancements are proposed for configured grants:
  UE does back-to-back HARQ process repetitions for low latency and high reliability.
  UE transmits HARQ processes and its repetitions in a time interlaced manner.
  UE may use different number of OS allocation for transmitting each repetition of the HARQ ID.
  UE may be configured with multiple configured grants.
    Each configured grant may have a grant ID
    A group of grants may belong to a grant-group; updates to the grant-group apply to all the grants within the group
    Multiple grants may be activated/deactivated by activating/deactivating the grant-group
    UE may switch from one grant to another in a grant-group
  UE may switch from one grant to another to finish K repetitions
  UE may transmit on one grant and retransmit on another grant UE may support early termination of repetition; on early termination of one HARQ ID, the UE switches to a grant that provides minimum latency to transmit another HARQ process UE may do frequency hopping and time hopping when transmitting the HARQ IDs and the repetitions.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE FIGURES

A more detailed understanding may be had from the following description, given by way of example in conjunction with the accompanying drawings. The drawings are not necessarily drawn to scale.

FIG. 42A shows 2OS mini-slots. FIG. 42B shows 4OS mini-slots. FIGS. 42C and 42D illustrate a mixes of 7OS and 4OS mini-slots.

FIG. 43A shows two OS mini-slots for HARQ IDs. FIG. 43B shows 4OS mini-slots for HARQ IDs, and FIG. 43C shows different lengths for mini-slots.

FIG. 49 shows an example of a set of CGs providing different offsets. A UE may be configured with all or a subset of these CGs.

FIG. 68A illustrates an example of a UE sensing to determine available CG, with a common self-deferral value across CG.s FIG. 68B illustrates an example of a UE sensing to determine available CG, with a self-deferral value generated per CG.

AUTONOMOUS RETRANSMISSIONS

Figure 1:
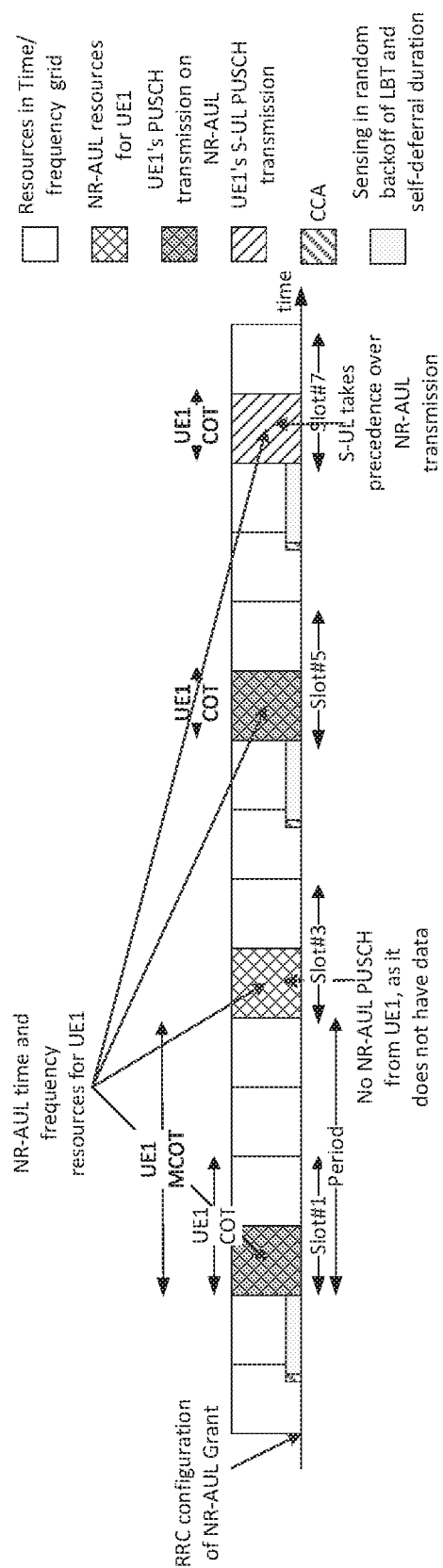
FIG. 1 is a timing diagram of an example Type-1 NR-AUL concept of an RRC based NR-AUL grant.

The UE starts a timer on its first transmission of a PUSCH TB. The UE may autonomously retransmit if it does not receive feedback before the timer's expiration. This ensures that if the eNB did not receive the TB, the UE can attempt retransmission on AUL resources again.

Operation in Unlicensed Spectrum

In unlicensed operation, the listen-before-talk (LBT) procedure is defined as a mechanism by which an equipment applies a clear channel assessment (CCA) check before using the channel. The clear channel assessment (CCA) utilizes at least energy detection to determine the presence or absence of other signals on a channel to determine if a channel is occupied or clear, respectively. Depending on the type of channel access, the maximum time a device may use the channel is 'Maximum Channel Occupancy Time (MCOT), after which it releases the channel.

Frame Structure Type 3

Frame structure type 3 was introduced for LAA secondary cell operation with normal cyclic prefix in 3GPP LTE Rel. 13. The subframe of this frame can be used for uplink/downlink transmission or can be empty. LAA transmission ran start and end at any subframe and can consist of one or more consecutive subframes in the transmission burst.

Configured Grant (CG) in NR Rel.15

3GPP New Radio Rel.15 supports two types of configured grants (CG). In Type-1 CG, RRC configures the UE with periodicity, offset, time-frequency allocation, UE-specific DMRS configuration, MCS/TBS, repetitions, power control, etc. In Type-2 CB, similar to SPS in LTE-A, RRC configures the UE with periodicity, power control, and repetitions, while activation DCI provides offset, time-frequency allocation, MCS/TBS, UE-specific DMRS configuration, etc.

CG supports both slot and mini-slot based transmissions. Furthermore, it supports synchronous HARQ transmission, e.g., HARQ process ID and RV are implicitly indicated through the resource. A retransmission may occur through a scheduled grant. A transmission may be repeated, if configured, and may occur until ACK is received in the form of a scheduled grant or until the maximum number of configured repetitions is completed.

A configuredGrantTimer is configured to the UE to manage the procedures related to CG. See Chairman Notes, 3GPP TSG-RAN WG2 Meeting AH1801, January 2018, Vancouver, Canada. The configuredGrantTimer is started/restarted upon PUSCH transmission using configured grant or upon the reception of a dynamic UL grant whose associated HARQ process is a HARQ process preconfigured for a configured grant. Only the first transmission in a repetition bundle (re)starts configuredGrantTimer.

Autonomous UL Transmissions in LTE feLAA Rel.15

3GPP LTE feLAA Rel.15 work item on "enhancements to LTE operation in unlicensed spectrum" introduced LTE frame structure Type 3 with flexible starting and ending positions in a subframe. The same work item also introduced Autonomous UL (AUL) transmission using Type 3 frame structure wherein the UE selects an MCS and transmits PUSCH in an asynchronous HARQ procedure. The UE also transmits the AUL-UpLink Control Information (AUL-UCI) to indicate the MCS, UE-ID, HARQ process and RV for the PUSCH transmission. AUL-DownLink Feedback Information (AUL-DFI) was introduced to provide explicit ACK/NACK feedback from gNB to the UE for the AUL transmission.

MCOT Sharing

A UE supporting AUL can obtain an MCOT and allow eNB to share the COT to transmit AUL-DFI to the UE. The last symbol of the AUL burst may be dropped to allow the eNB to sense the channel and transmit within the UE's COT. The AUL-UCI carries 1 bit to indicate if a subframe supports COT sharing. If the UE indicates a subframe as being applicable for UL to DL COT sharing, the UE will stop its AUL PUSCH transmission in the preceding subframe at symbol #12 irrespective of the RRC configuration for the PUSCH ending symbol.

The eNB may also allow AUL on UL subframes within the eNB's COT. A 1-bit field in C-PDCCH indicates whether AUL can share the COT with the gNB.

Flexible Time Resource Allocation

UL grants can be configured via a bitmap instead of periodicity alone. This gives the UE more flexibility in transmission as the UE may find an opportunities to transmit PUSCH without latency in waiting for an opportunity based on its configured period.

Multiple CAT4 LBT Transmissions without Waiting for Feedback

In case of scheduled UL, a CAT4 LBT transmission can occur only on receiving a grant. However, in AUL there can be a CAT4 LBT transmission without a grant; so, multiple consecutive CAT4 LBT AUL transmissions may occur without intermittent grant or feedback.

Limitations of Configured Grants from NR-U Perspective

Due to channel access uncertainty, a UE may have to wait for a long time to get the resource corresponding to the HARQ buffer in which it has data to send, since the HARQ process is synchronous.

Furthermore, in CG retransmissions rely on scheduled grants—this implies LBT both at the gNB and UE to retransmit on a scheduled resource. This increases latency and affects system capacity.

Furthermore, only Type-2 CG supports transmission adaptation, which can be done by the activation DCI. In an unlicensed system, activation DCI is less efficient than allowing the UE to select the MCS autonomously according to its channel conditions.

Since many features of LTE feLAA AUL can apply to NR-U, it was decided in the 3GPP RAN1 93 meeting that five modifications to configured grant procedures might be considered. First is removing dependencies of HARQ process information to the timing. Second is introducing UCI on PUSCH to carry HARQ process ID, NDI, RVID. Third is introducing Downlink Feedback Information (DFI) including HARQ feedback for configured grant transmission. Fourth is increased flexibility on time domain resource allocation for the configured grant transmissions. Fifth is supporting retransmissions without explicit UL grant. See Chairman Notes, 3GPP TSG-RAN WG1 Meeting #93, May 2018, Busan, Korea.

NR BandWidth Part (BWP) Operation

3GPP New Radio Rel.15 introduced the concept of BandWidth Part (BWP). Here, the receive and transmit bandwidths of a UE may be set to a part of the cell's total bandwidth and can be dynamically adjusted to meet the capacity requirements and power saving requirements of the UE. For example, the UE may operate on a narrow BWP during periods of low activity to save power.

A Serving Cell may be configured with at most four BWPs, and for an activated Serving Cell, there is always one active BWP at any point in time. The gNB may indicate a UE to switch to a different BWP through the DCI. The UE runs a BWPInactivityTimer in its active BWP. On expiry, the UE switches to a default BWP.

BWP and Channelization

The following was agreed in the 3GPP New Radio RAN1 #92bis meeting. See Chairman Notes, 3GPP TSG-RAN WG1 Meeting #92bis, April 2018, Sanya, China.

At least for band where absence of Wi-Fi cannot be guaranteed (e.g. by regulation), LBT can be performed in units of 20 MHz.

The 3GPP New Radio Study Item (SI) on NR-U will further study details on how to perform LBT for a single carrier with bandwidth greater than 20 MHz, e.g., integer multiples of 20 MHz.

This supports a mode of operation wherein the UE's BWP in NR-U may consist of one or more 20 MHz bandwidths depending on channel availability.

BWP Switching for NR-U

In NR, when switching BWPs, the UE may have to retune to the frequency of the new BWP. The time to make this switch is referred to as the switching delay and is one of the following values: 400 us, 600 us, 950 us, or 2000 us. See R2-1810579, "Discussion of BWP operation in NR-U", Huawei, 3GPP TSG-RAN WG2 Meeting #AH-1807, July 2018, Montreal, Canada.

BWP switching is attractive for NR-U as a UE may switch to a BWP where its LBT is successful.

However, the switching delays can be significant for NR-U deployments as a UE may not be able to switch fast enough to a BWP whose channel is available. The following enhancements have been proposed to improve the BWP operations. See ETSI EN 301.893, 5 GHz RAN; Harmonised Standard covering the essential requirements of article 3.2 of Directive 2014/53/EU V2.1.1, 2017-05

Option 1: One active wideband BWP with multiple channels may be activated for the UE. There may be multiple parallel LBT procedures for different channels within a BWP. The actual transmission bandwidth may be selected as the set of adjacent sub-bands with successful LBT. So dynamic bandwidth adaptation may be supported in this active wideband BWP.

Option 2: Multiple non-overlapped BWPs may be configured to the UE within a wide component carrier, similar to carrier aggregation in LTE LAA. To maximize the BWP utilization efficiency, the BWP bandwidth can be the same as the bandwidth of sub-band for LBT. The UE may support multiple active BWPs and transmit on a BWP where it has successful LBT.

Example Challenge—Time Resource Management for Autonomous NR-U Transmissions

According to the RAN1 #93 agreements, the SI will consider more flexibility for time domain resource allocation for the UEs. Additionally, the allocation must be such that TDMed and FDMed UEs can be supported. Therefore, procedures and methods are required to enable efficient time domain resource usage given the constraints of a UE's MCOT. This may include, for example: flexible autonomous resource allocation indication and COT sharing with gNB; autonomous HARQ transmission and indication; and autonomous retransmissions.

Example Challenge—Autonomous Selection from Multiple Frequency Resources

Since CG operation of NR is evolved for NR-U, consideration may be given to allowing the UE to select a frequency resource autonomously for transmission based on channel availability. To support this, mechanisms may be defined for configuration of multiple NR-AUL resources for a UE, and for repetition and retransmission on multiple resources.

Example Solutions

In the following discussion, we use the term 'New RadioAutonomous UpLink' (NR-AUL) to refer to autonomous (UpLink) UL transmission by the NR UE on the unlicensed spectrum.

High Level Features of NR-U AUL

3GPP NR-U is considering autonomous asynchronous UL transmission where the UE can select the HARQ related parameters on its NR-AUL grant and transmit an UL control signal 'NR-AUL-UCI' multiplexed on the NR-AUL PUSCH to the gNB to indicate the HARQ information and potentially other information such as the UE's ID. The gNB may transmit DL control information 'NR-AUL-DFI' to provide explicit HARQ ACK/NACK feedback to the UE on the NR-AUL transmissions. NR is also considering retransmission of TBs on NR-AUL resources.

In the following discussion, the term CCA refers to the 25 µs channel sensing used in LTE LAA.

Type-1 NR-AUL Configuration

We propose herein to support an AUL mode of operation for NR-U wherein AUL resource parameters are configured to the UE through RRC. Upon RRC configuration, the resource is activated to the UE autonomously when the channel is available. Explicit activation is not required in this mode of operation. The UE uses the autonomous grant only if it has data to transmit; otherwise, it does not use the grant. This configuration is especially useful for mMTC devices as they usually have small amounts of data to transmit and explicit activation overhead can be significant.

FIG. 1 illustrates the concept of the Type-1 NR-AUL grant where the gNB configures the time and frequency resources for the UE through RRC signaling. When the UE needs to transmit NR-AUL PUSCH, it performs LBT and gets access to an NR-AUL. The LBT may be CAT 4 LBT with a random backoff given by the Contention Window Size (CWS) for the priority class of the channel access. The UE stops NR-AUL transmission in a given channel access under the following conditions.

UE's COT expires

NR-AUL resource terminates, even if the UE's MCOT has not expired. In FIG. 1, UE1 releases the channel in Slot #5 after the NR-AUL transmission, as a NR-AUL resource is no longer available to it.

If the UE has other transmissions such as S-UL (scheduled-Uplink) PUSCH grant on an NR-AUL resource, it performs S-UL instead of NR-AUL transmission. Here, the S-UL grant may have partial or full overlap of resources in time with the NR-AUL grant. In FIG. 1, UE1 has an S-UL in slot #7, which is an NR-AUL resource; UE1 does S-UL and releases the channel as NR-AUL resource is not available in the adjoining OS.

Type-2 NR-AUL Configuration

Figure 2:
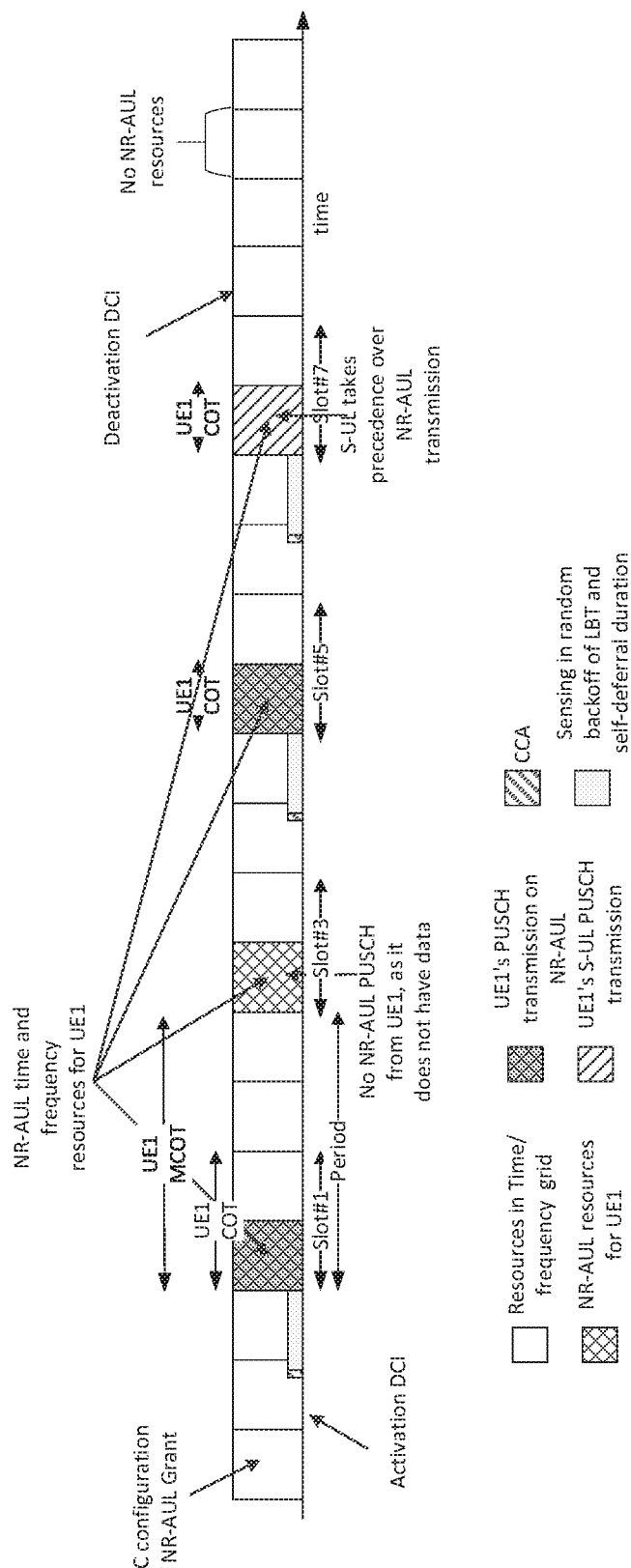
FIG. 2 is a timing diagram of an example Type-2 NR-AUL concept of a DCI based activation of NR-AUL grant.

We propose herein to support an AUL mode of operation for NR-U wherein certain AUL resource parameters are configured to the UE through RRC signaling. The gNB transmits an activation DCI to activate the resource to the UE, upon which the UE may transmit on NR-AUL resources if it has data to transmit. The gNB may transmit the deactivation DCI to deactivate the resource to the UE, upon which the UE cannot transmit on those NR-AUL resources. The concept is shown in FIG. 2. The activation DCI may provide MCS, time and frequency resources for the transmission. When activated, the UE transmits NR-AUL PUSCH only when it has data to send.

The UE's NR-AUL PUSH transmission ends on a Type-2 resource under the following conditions.

UE's COT expires

NR-AUL resource terminates, even if the UE's MCOT has not expired. In FIG. 2 UE1 releases the channel in Slot #5 after the NR-AUL transmission, as a NR-AUL resource is no longer available to it.

Alternatively, the UE may be deactivated and therefore it loses the grant; in FIG. 2, the deactivation DCI deactivates the grant after slot #7.

If the UE has other transmissions such as S-UL (scheduled-Uplink) PUSCH grant on an NR-AUL resource, it performs S-UL instead of NR-AUL transmission. In FIG. 2, UE1 has an S-UL in slot #7, which is an NR-AUL resource; UE1 does S-UL and releases the channel as NR-AUL resource is not available in the adjoining OS.

CBG Based Feedback and Retransmission

The NR-AUL-DFI will be transmitted by the gNB to the UE to provide ACK/NACK feedback similar to the AUL-DFI of LTE feLAA. However, unlike LTE, NR supports CBG based feedback. As CBG based feedback and retransmissions improve resources efficiency (because only CBGs in error need to be retransmitted), we propose the following to allow NR-AUL-DFI to provide enhanced ACK/NACK feedback in the following ways.

TB-based feedback: NR-AUL-DFI (from gNB to UE) carries 1-bit ACK/NACK feedback per TB for N HARQ processes in the form of a bitmap where each bit in the bitmap maps to one HARQ Process. N may correspond to all HARQ processes configured to the UE, including HARQ processes not configured for NR-AUL transmission.

CBG-based feedback: Multi-bit CBG based feedback (from gNB to UE) for each TB of K HARQ processes, along with indication of the ID of the $k^{th}$ HARQ process. 1-bit ACK/NACK feedback is provided for each CBG in each TB of the HARQ process. UE may receive feedback for up to $K_{max}$ HARQ IDs in a single DCI. When $K<K_{max}$, the UE may set the bits to zero for fields with corresponding to IDs>K When $K>K_{max}$, the gNB may transmit multiple NR-AUL-DFI DCI to the UE which will detect them in different candidate locations within the search space.

The HARQ IDs of processes supported through NR-AUL-DFI are RRC configured to the UE. Note that the number of CBGs per TB is already configured to the UE through RRC. Additionally, $K_{max}$ may be RRC configured to the UE.

A one-bit field dfiType in NR-AUL-DFI may indicate if it is carrying TB-based or CBG-based feedback, so that a common length and a common RNTI can be used for the DCI. (Zero padding may be used to ensure that the DCIs have the same length). This keeps the blind decoding complexity within acceptable level at the UE. The NR-AUL-DFI may have same length and format as the activation/deactivation DCI of Type2 CG; additionally, all the DCIs related to NR-AUL operation (activation/deactivation, NR-AUL-DFI) may use a common RNTI such as CS-RNTI or an RRC configured UE-specific NR-AUL-RNTI.

Figure 3:
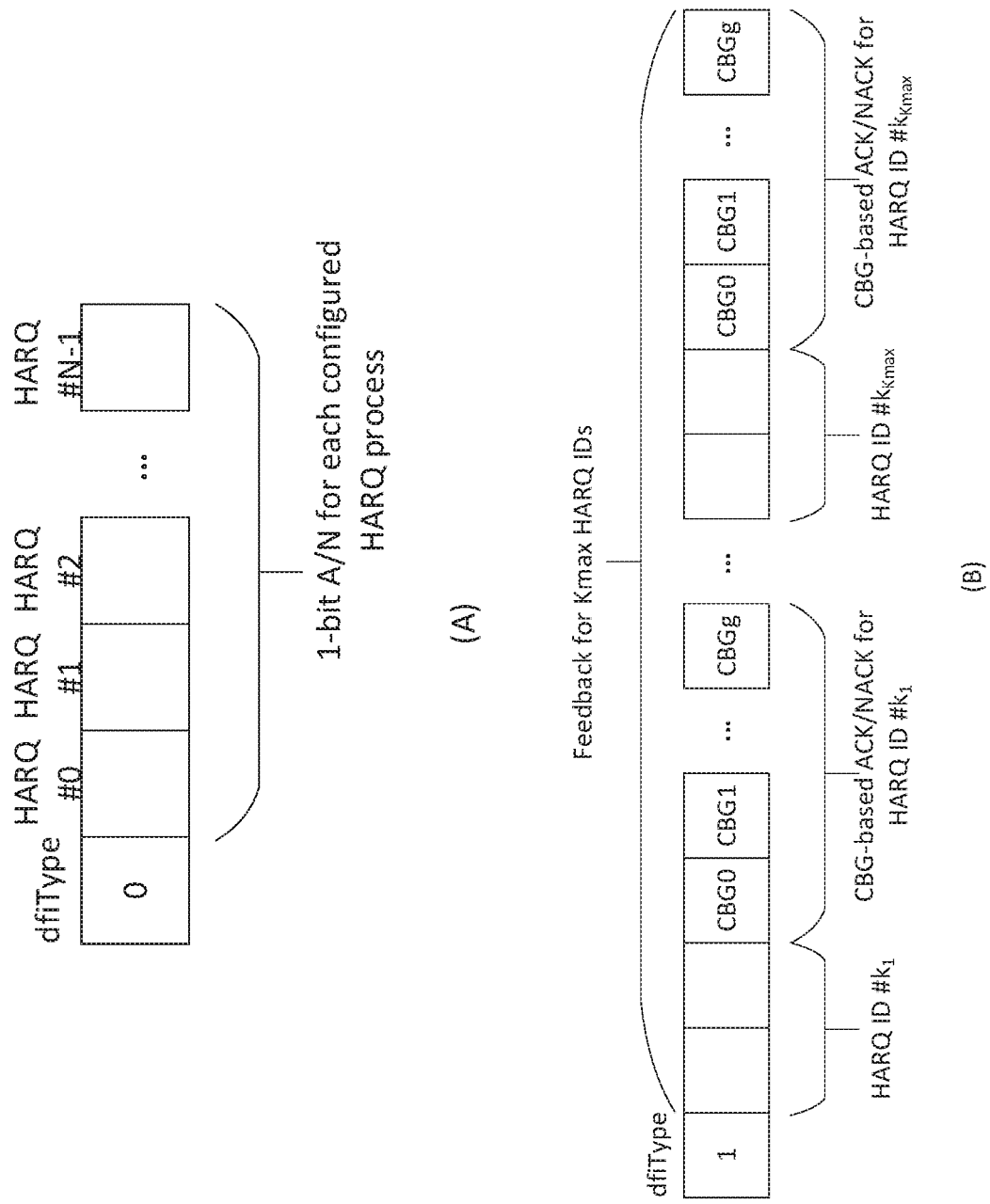
FIG. 3A is a timing diagram of an example ACK/NACK feedback through NR_AUL-DFI with TB based 1-bit feedback for N HARQ processes.
FIG. 3B is a timing diagram of an example ACK/NACK feedback through NR_AUL-DFI with CBG-based multi-bit feedback for Kmax HARQ process.

FIG. 3A and FIG. 3B show examples where dfiType=0 is interpreted as TB-based feedback and dfiType=1 is interpreted as CBG-based feedback. On decoding the DCI, the UE determines the type of feedback—TB-based or CBG-based from the dfiType.

UE may be RRC configured to support TB based transmission and retransmission, CBG based transmission and retransmission, or both, for example.

When configured for CBG based communication, if the gNB provides CBG-based feedback for an NR-AUL HARQ process and at least one of the bits indicates NACK, the UE retransmits the NR-AUL PSUCH with only CBGs that were NACKed.

The UE also transmits the Code Block Group Transmission Indication (CBGTI) field in the NR-AUL-UCI; CBGTI has one bit for each CBG in transmission. UE sets the bits corresponding to the CBGs in the transmission or retransmission so that the gNB can process the PUSCH without ambiguity in recognizing the CBGs in the PUSCH.

If the gNB provides only TB-based feedback for a HARQ process and it is a NACK, then the UE retransmits the whole TB. The UE may set all the bits of CBGTI to one to indicate transmission of the entire TB. Alternatively, the UE may not transmit the CBGTI field in NR-AUL-UCI of retransmission—this allows to keeps the amount of UL control overhead limited and improves coverage.

In one example, for the initial transmission the NR-AUL-UCI may not contain the CBGTI field. However, in a retransmission, the NR-AUL-UCI may contain the CBGTI field. Therefore, the length of the NR-AUL-UCI may be different for initial transmission and retransmission. Nevertheless, the gNB does not know if a received PUSCH carries NR-AUL-UCI with or without the CBGTI field, e.g., it does know the length of the NR-AUL-UCI. Therefore, it blindly decodes for two possible NR-AUL-UCI lengths to receive the control information—one without CBGTI and one with CBGTI fields. The hypothesis that is successful indicates the TB/CBG content of the PUSCH to the gNB.

Figure 4:
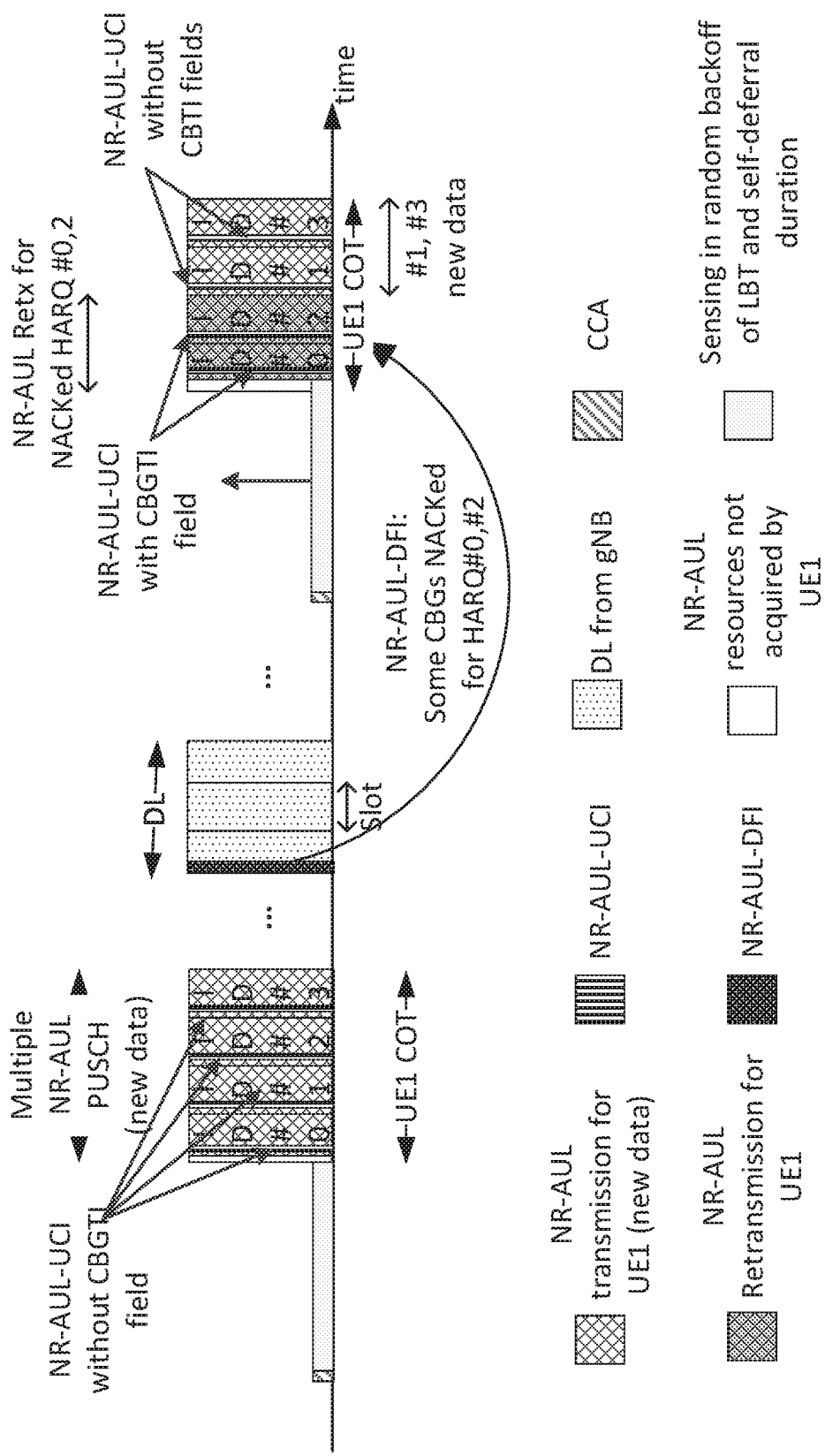
FIG. 4 is a timing diagram of an example where NR-AUL Retransmissions carry CBGTI fields if NACK is available from the gNB.

This concept is shown in FIG. 4 where UE1 transmits NR-AUL PUSCH HARQ IDs #0, #1, #2 and #3 with new data on the TB; the NR-AUL-UCI does not carry the CBGTI field and all CBGs are present. The UE receives feedback on NR-AUL-DFI indicating CBG based NACK for some CBGs on HARQ processes #0, #2. When the UE1 gets access to NR-AUL resources again, it retransmits IDs #0 and #2 only with the CBGs that were NACKed and indicates those CBGs through a CBGTI field in the NR-AUL-UCI of ID #0, #2 in the retransmission.

Figure 5:
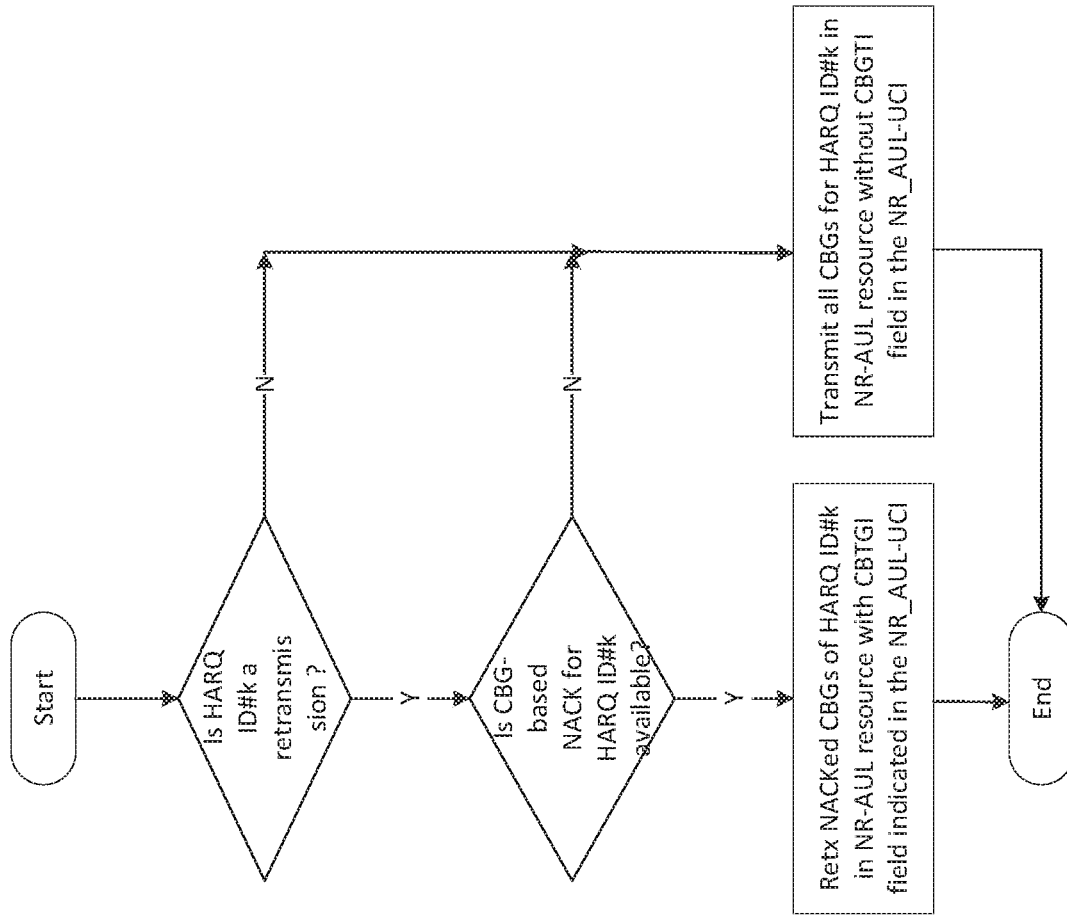
FIG. 5 is a flow chart of an example procedure for UE transmission of NR-AUL-UCI with or without a CBGTI field.

An example procedure for transmission of UE NR-AUL-UCI is shown in FIG. 5.

Alternatively, the UE may always transmit CBGTI field in all the NR-AUL-UCI (including the first transmissions) so that the decoding complexity is minimized at the gNB, although this comes at the cost of increased control signaling overhead.

Autonomous MCS Selection

In Type-1 CG in NR, the MCS is RRC configured to the UE; in feLAA AUL, the MCS is transmitted to the UE via activation DCI but the UE can also autonomously select its MCS value and indicate it to the gNB through the AUL-UCI.

For Type-1 NR-AUL, we propose herein to support autonomous MCS selection by the UE. The RRC configuration may include a default MCS value but the UE may choose to override it depending on the perceived SINR on the UL channel. The UE reports the selected MCS value to the gNB through the NR-AUL-UCI. The gNB identifies the DMRS and recognizes the presence of AUL PUSCH; further, it decodes the NR-AUL-UCI. Upon successfully decoding the NR-AUL-UCI, the gNB obtains the MCS value, and HARQ parameters to decode the data on PUSCH.

In another example, the gNB may configure a subset of possible MCS values to the UE through RRC signaling. The UE may autonomously select one of the configured values and indicate it through the NR-AUL-UCI. As fewer bits are required to indicate an index into a subset, this reduces the payload due to MCS bits in the control information.

The MCS bits (typically indicated by 5 bits) can be a significant part of the NR-AUL-UCI payload (which may be around 25 bits), and the NR-AUL-UCI can take significant amount of resources especially for small data PUSCH. Therefore, we propose herein to indicate the MCS through NR-AUL-UCI selectively, e.g. certain PUSCH transmissions carry the field, and certain PUSCH transmissions do not. The gNB knows the expected size of UCI payload with MCS and expected size without MCS. Therefore, it decodes the NR-AUL-UCI blindly for these two hypotheses—without MCS bits, with MCS bits. The hypothesis that is successful will determine the MCS for decoding the PUSCH.

Consider an example where the initial transmission in NR-AUL-PUSCH uses the RRC configured MCS. If it is NACKed or the UE does not receive feedback for extended time, it may retransmit it on Type-1 AUL resource with a UE-selected MCS that is then indicated in the NR-AUL-UCI. This allows the UE to adapt MCS to the channel conditions.

Consider another example where the UE is configured with NR-AUL grant where it can repeat a PUSCH transmission repK times. In this case, the UE may transmit the MCS only in the first PUSCH in the bundle. The remaining PUSCH may use the same MCS and not explicitly carry the MCS bits.

Figure 6:
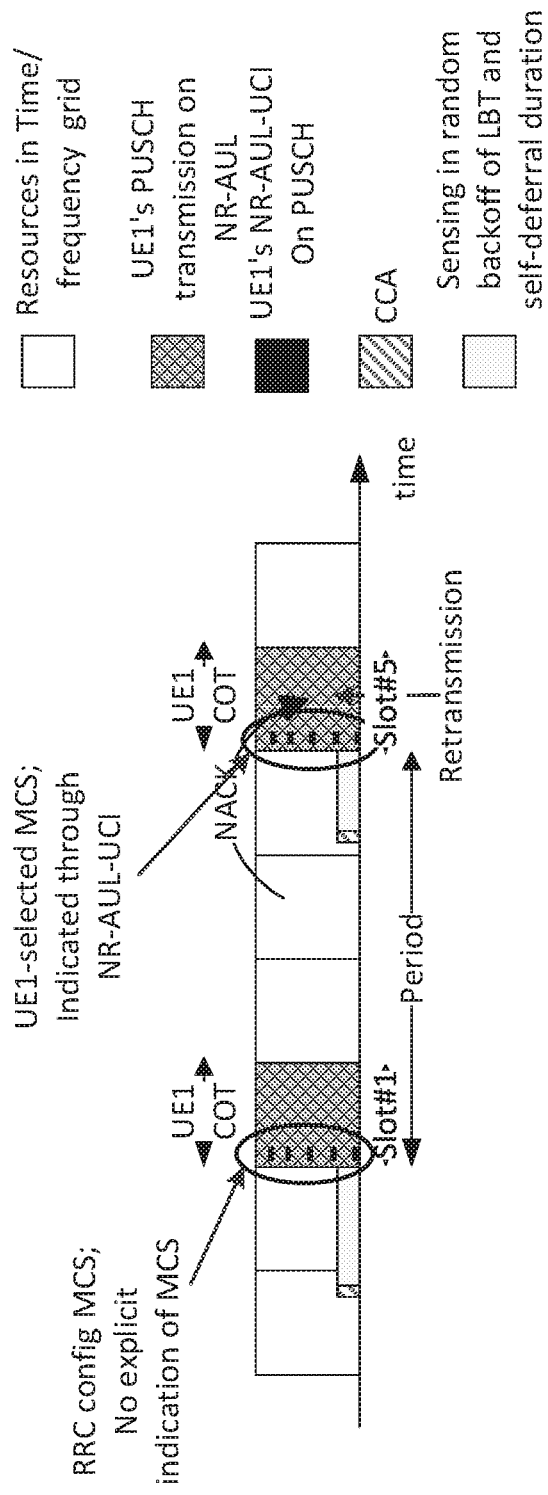
FIG. 6 is a timing diagram of an example NR-AUL-UCI with and without MCS configuration. In Slot #1, MCS is RRC configured and not indicated on NR-AUL-UCI. In Slot #5, MCS is selected by UE and indicated through the NR-AUL-UCI.

FIG. 6 illustrates an example o NR-AUL-UCI with and without MCS configuration. In Slot #1, MCS is RRC configured and not indicated on NR-AUL-UCI, in Slot #5, MCS is selected by UE and indicated through the NR-AUL-UCI.

Time Resource Configuration for NR-AUL

We propose herein that a UE may transmit NR-AUL PUSCH on resources where NR-AUL resource is configured and the slot format indication is either 'F' or 'U' for the OFDM Symbols (OS). Mere configuration of 'F' or 'U' does not indicate a NR-AUL resource as the gNB may use the resources for scheduled grants. Therefore, explicit NR-AUL time resources should be configured. This can be done in the following ways.

Aperiodic Resource Configuration

A B-bit bitmap of NR-AUL time resources may be configured to the UE. feLAA uses a similar AUL configuration where each bit denotes a slot. As NR supports more flexibility, we propose herein that a bit in the bitmap may correspond to an NR-AUL resource on N consecutive OS for a given numerology. The bitmap may indicate the AUL grant for resources in L frames. N is RRC configured. N=2, 4, 7, and 14 are good choices to support mini-slot and slot configurations in NR. The first bit of the bitmap applies to the $1^{st}$ N OS following an offset of F OS for the SFN for which mod(SFN, L)=0, where F<14OS is also RRC configured. The offset F allows to fine tune the location of the resource within a slot; this is especially useful if the resources must begin after the location of certain critical signals such as the DL SSBs whose resources do not align with slot boundaries.

Given that a PBCH TTI is 80 ms, L=8 (8 10 ms frames) may be a good choice to indicate through the bitmap as the SI remains unchanged during this period.

Figure 7:
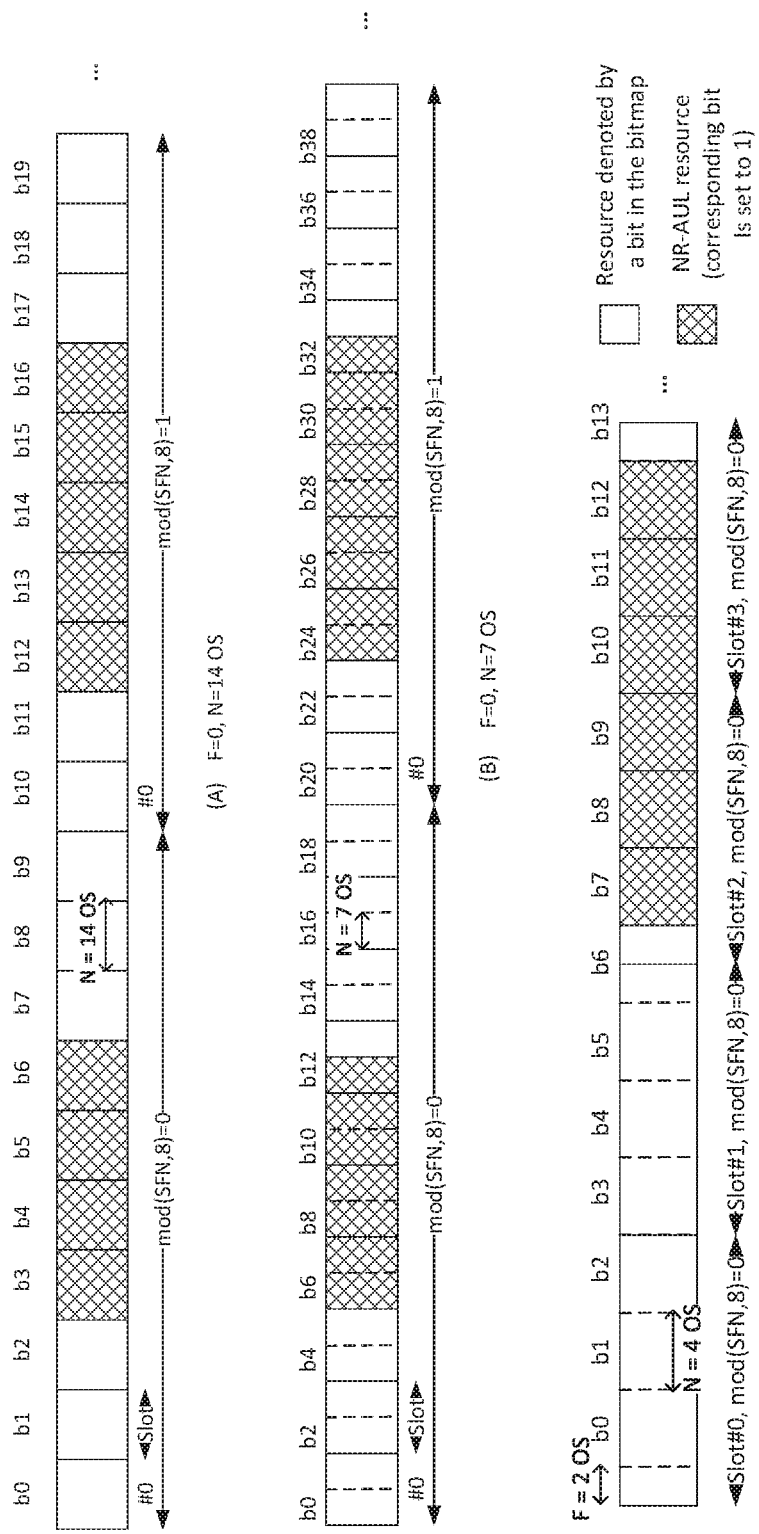
FIG. 7A is a timing diagram of an example of a bitmap based resource allocation with a bitmap of slots with offset set to zero.
FIG. 7B is a timing diagram of an example of a bitmap based resource allocation with a (B) Bitmap of mini-slots of length 7 OS with offset set to zero.
FIG. 7C is a timing diagram of an example of a bitmap based resource allocation with a bitmap of mini-slots of length 4OS with offset set to 2OS.

The bitmap based resource allocation concept is shown in FIGS. 7A, 7B, and 7C for different values of N and F.

Periodic Resource Configuration

UE may be configured with periodic NR-AUL time resources with opportunities for repetition in a bundle of resources similar to Type-1 and Type-2 CGs in NR. The resources for PUSCH transmission are allocated in a contiguous manner in these configured grants. The UE may also be configured with multiple such configured grants where, at least the time resources may be different between the grants. Additionally, the number of contiguous time resources for PUSCH may also be different between the grants. Depending on where the UE gets channel access, the UE selects one appropriate configured grant for PUSCH transmission. This selection may be based on the resource that gives the lowest latency for transmission following channel access Time Resource Configuration for Type-1 and Type-2 NR-AUL Depending on the traffic, one type of resource (periodic or aperiodic resource) may have more advantages over the other. For example, the aperiodic configuration allows flexibility to provide AUL resources in a complex frame structure with multiple UL and DL switches; it is well suited to bursty transmissions for eMBB. The periodic configuration is well suited URLLC and mMTC as the resources are available at a regular interval.

To take advantage of both resource allocation possibilities, we propose herein that both configurations may be provided to a UE and a 1-bit field aulTimeResourceType may be used to indicate the configuration to be used.

Type-1 NR-AUL will have RRC configured bitmap for aperiodic resource indication. aulTimeResourceType is RRC configured to the UE.

Type-2 NR-AUL may have one of the following configurations. aulTimeResourceType is indicated through the activation DCI:

Bitmap for aperiodic resource is RRC configured.

Bitmap for aperiodic resource is indicated through activation DCI. This approach can make the DCI large if the bitmap covers the pattern for multiple frames GC-PDCCH Indication of NR-AUL Resources Currently, GC-PDCCH is used to dynamically indicate slot format in NR. The DCI uses format 2_0 with SFI_RNTI scrambling. The gNB may indicate the format for several slots in a single DCI.

We propose herein that NR-U introduce a GC-PDCCH to dynamically indicate NR-AUL resources.

The indication is in the DCI of the GC-PDCCH and is in the form of a B-bit bitmap where each bit corresponds to N consecutive OS. When the bit is set, it indicates an NR-AUL resource of N OS. B may be RRC configured to the UE.

Figure 8:
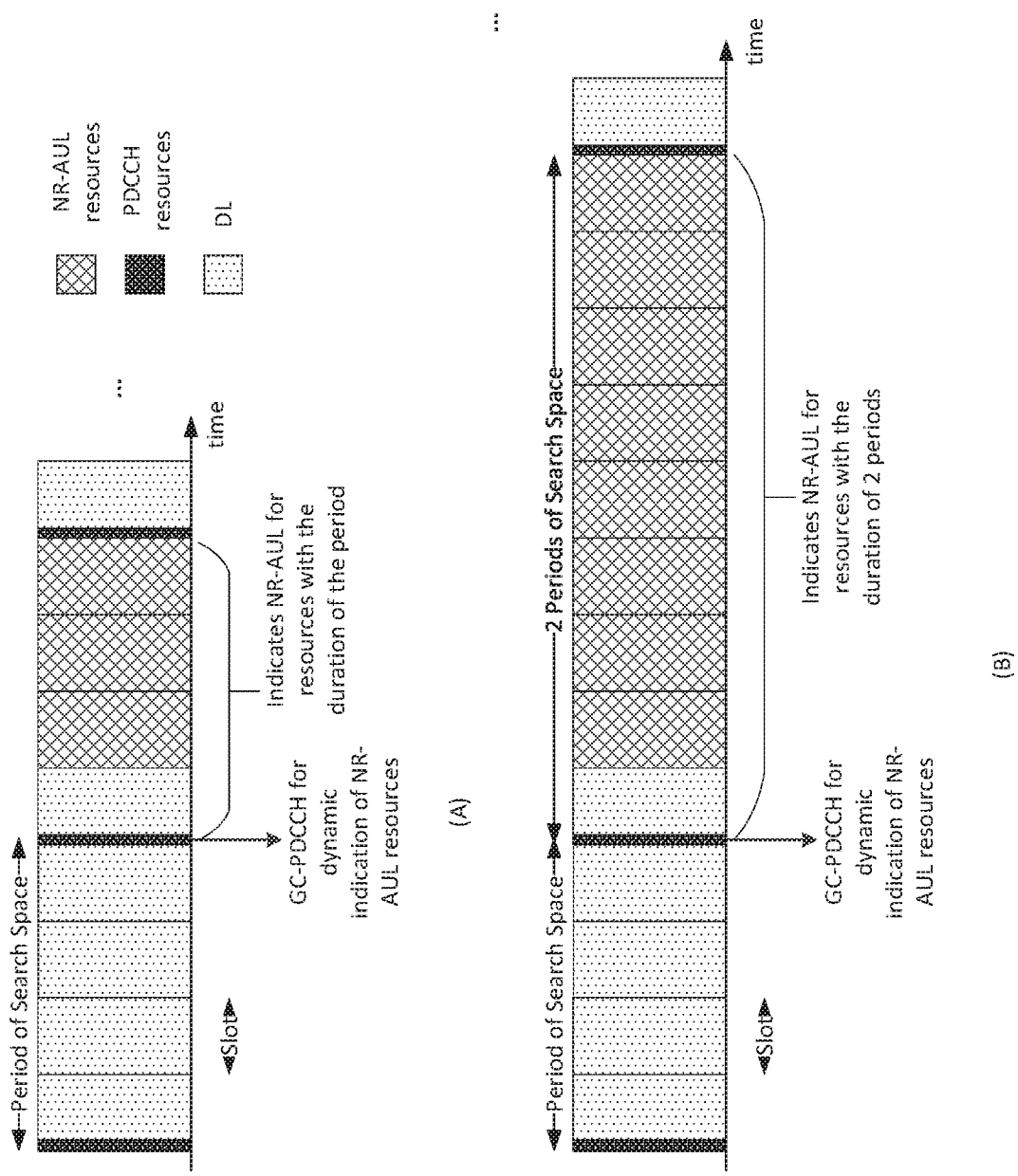
FIG. 8A is a timing diagram of an example of B-bitmap mapping to resources with an allocation to one period of search space.
FIG. 8B is a timing diagram of an example of B-bitmap mapping to resources with an allocation to multiple periods of search space.

The UE may interpret the bitmap in the following ways.
N may be directly given to the UE through RRC.
The bitmap may denote the resources within the current and next period of the search space carrying the indication. Therefore, the UE may interpret each bit in the bitmap to denote a group of N OS=floor(NumOSinP/B) where NumOSinP corresponds to the number of OS within a period of the space set. FIG. 8A shows an example where N is computed by allocating the B bits to the resources within 1 period of the search space.
Alternatively, the indication may be for M periods of the search space, where so that B/M bits indicate the resources for each period. The value of M is configured by the gNB. FIG. 8B shows an example where N is computed by allocating the B bits to the resources within 1 period of the search space.

Figure 9:
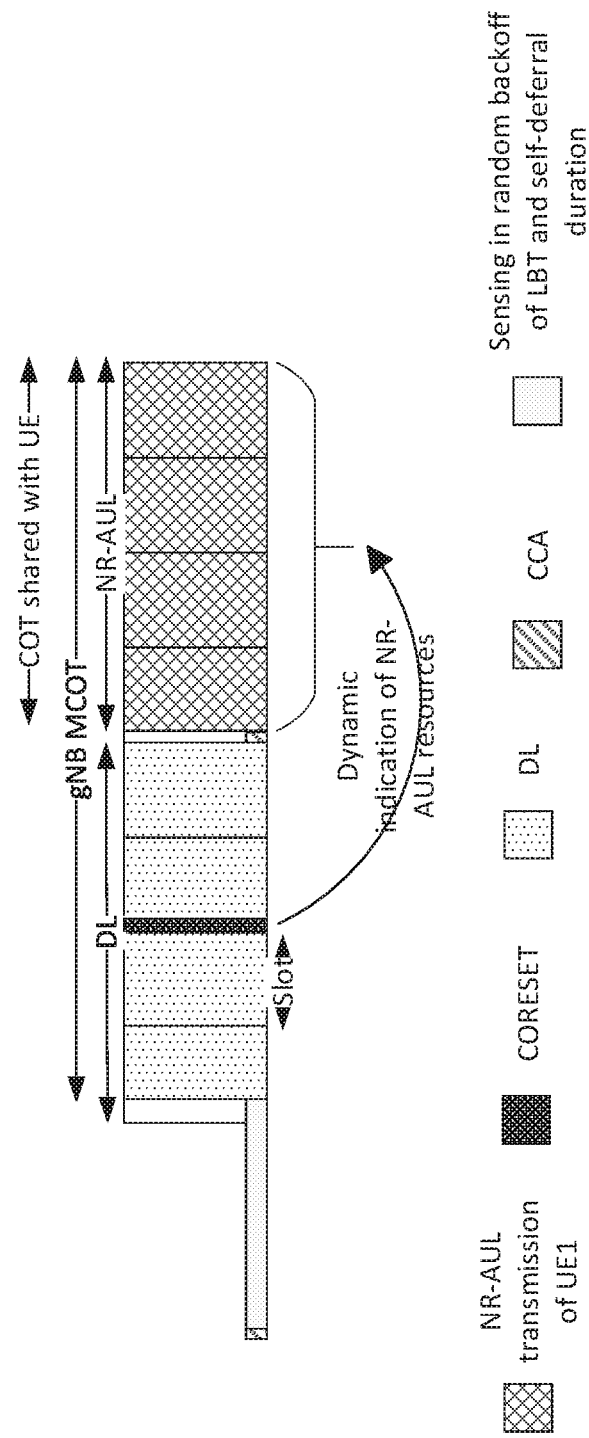
FIG. 9 is a timing diagram of an example dynamic indication of the NR-AUL resources through a GC-PDCCH.

An example is shown in FIG. 9 where the gNB shares its COT with UEs. The gNB obtains the COT after CAT 4 LBT and transmits the GC-PDCCH indicating the NR-AUL resources in the remainder of the COT.

The GC-PDCCH may be scrambled with the UE-specific NR-AUL-RNTI that is also used for NR-AUL-DFI and activation or deactivation in a Type-2 configuration; this is meant to provide a specific UE the NR-AUL resources.

Alternatively, the GC-PDCCH may be transmitted using the 'GC-AUL-RNTI' (group common-AUL-RNTI) which may be configured to multiple UEs and may be different from the UE-specific NR-AUL-RNTI; here, multiple UEs receive the dynamic NR-AUL resource grant. This DCI may be transmitted in an existing DCI format such as format 2_0 and may have the same length as the DCI scrambled with SFI_RNTI so that the blind decoding overhead is minimized for the UE.

If a resource (one or more OS) indicated for NR-AUL through RRC signaling or DCI corresponds to DL signaling such as SS/PBCH or (Discovery signal) DRS, the UE assumes that the resource is DL and is not available for NR-AUL.

If a resource (one or more OS) indicated for NR-AUL through GC-PDCCH overlaps with a resource configured as 'D' through RRC signaling, UE may assume that it is available for NR-AUL.

If a resource indicated for NR-AUL through RRC signaling or activation DCI overlaps with a resource configured as 'D' through SFI-RNTI based DCI, UE may assume that the resource is DL and is not available for NR-AUL.

If a resource (one or more OS) indicated for NR-AUL through RRC signaling or activation DCI overlaps with a resource configured as 'D' through RRC signaling, UE may assume the transmission direction depending on the use case. For example,
If UE has a CORESET configured on those resources, it may expect DL transmission on those resources.
If the UE does not have a CORESET configured on those resources, it may assume that the resource is available for NR-AUL transmission.

NR-AUL PUSCH Multiplexing

In AUL feLAA, TDMed UEs which use all interlaces of the PUSCH resource, randomly select a self-deferral value from a preconfigured list; the deferral is applied to the OS #0 in the subframe so that PUSCH transmission can begin from the OS #1. If the channel is clear until the deferral is complete, the UE occupies the channel. As TDM UEs may generate different self-deferral values, a UE with larger deferral value will detect occupation from a UE with smaller deferral value and avoid collision.

Self-Deferral Values for UE on Multiple OS

For NR-U, the self-deferral and multiplexing can be enhanced for better resource usage by using the flexible nature of PUSCH resource allocation; unlike LTE, NR already supports PUSCH transmission starting at any symbol of the slot and PUSCH transmission for different durations (variable OSs). By taking advantage of this, NR-U can allow different starting locations for the NR-AUL PUSCH transmission.

We propose herein to enable the gNB to configure UE through RRC signaling with a subset $S=\{s_1, s_2, \ldots s_T\}$ of T starting symbol locations (within a slot) to a UE for an NR-AUL PUSCH transmission following channel access. If every possible symbol location within the slot were allowed, the gNB will have considerable burden of detecting the UE transmission on every symbol of the slot.

Figure 10:
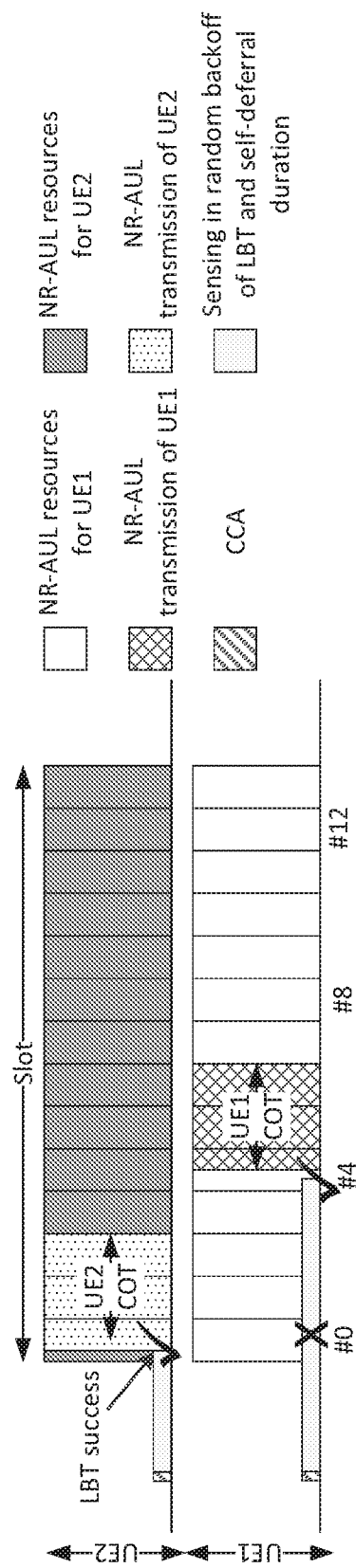
FIG. 10 is a timing diagram of an example of multiple starting locations for NR-AUL PUSCH transmission within a slot.

As an example, FIG. 10 shows that UE1 and UE2 contend to get channel access for the same resources. UE2 has a smaller self-deferral, and may therefore, it gets the channel at $s_1=0^{th}$ OS and blocks UE1. It has a mini-slot NR-AUL PUSCH transmission length of two symbols in OS #1 and OS #2 with CP extension in OS #0. UE2 finishes transmission on OS #2.

UE1 has $s_2=4^{th}$ OS. It attempts and gets channel access on OS #4 for NR-AUL PUSCH transmission.

Figure 11:
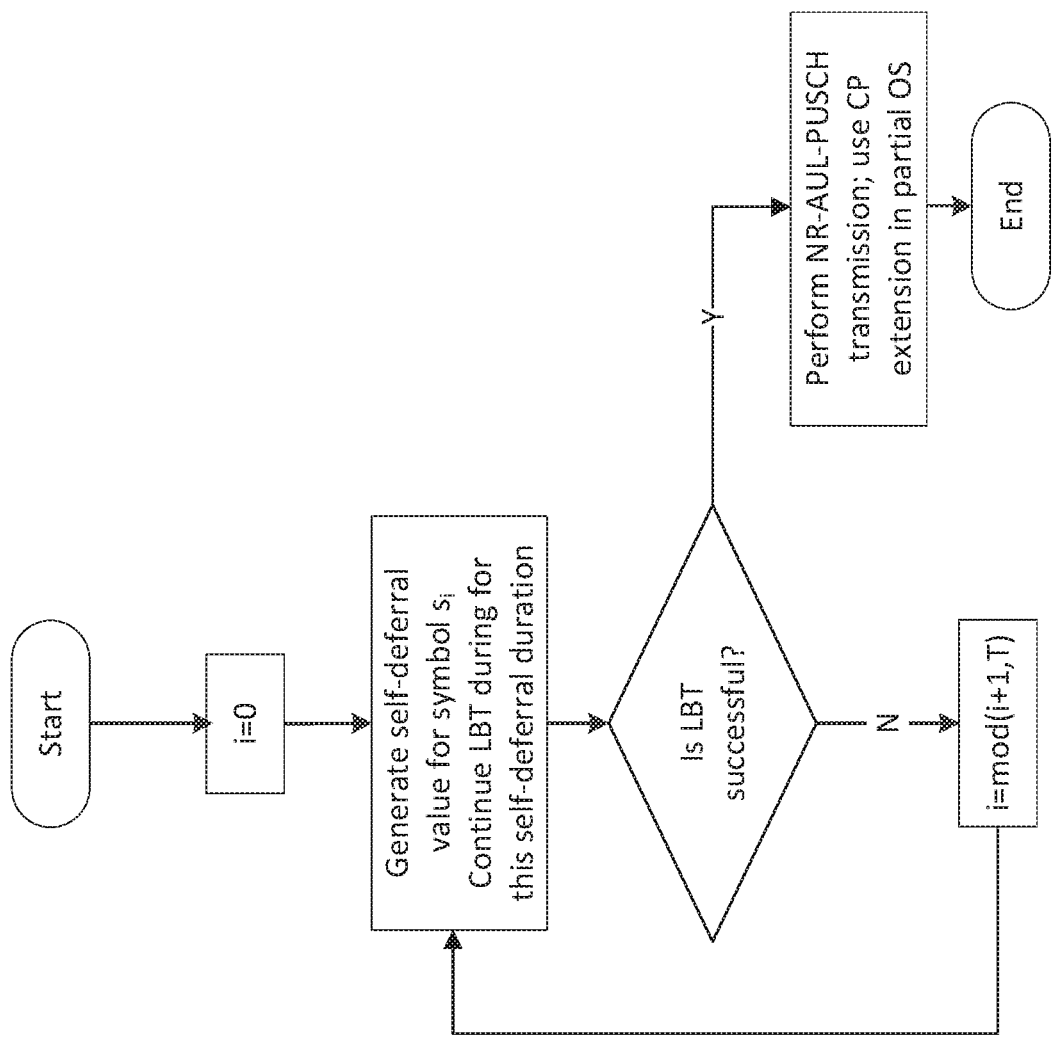
FIG. 11 is a flow chart of an example UE procedure to perform self-deferral for NR-AUL resource access.

The UE generates a random self-deferral value for gaining channel access in the $s_4^{th}$ OS of a slot. The self-deferral value is <=1 OS and may be selected randomly by the UE from pre-configured values. If channel access fails, the UE attempts channel access again during $s_{i+1}$ using another randomly generated self-deferral value. The UE continues this procedure until it gains channel access in that slot; otherwise if it fails, it will repeat the procedure for the next adjoining NR-AUL slot beginning with i=1. The UE does CP extension of symbol $s_i+1$ on the portion of $s_i$ where it occupies the channel. FIG. 11 shows this procedure.

PUSCH Duration Indication to gNB

Note that in AUL feLAA, the PUSCH transmission begins at OS #0 or OS #1 only. In NR-AUL PUSCH, if we allow PUSCH transmission starting on different OS locations in a slot, the following scenarios may be considered for the duration of the PUSCH transmission. The length L OS, e.g., duration of NR-AUL PUSCH transmission may be RRC configured or indicated through the activation DCI to the UE. The UE may transmit NR-AUL PUSCH in the following ways.

Figure 12:
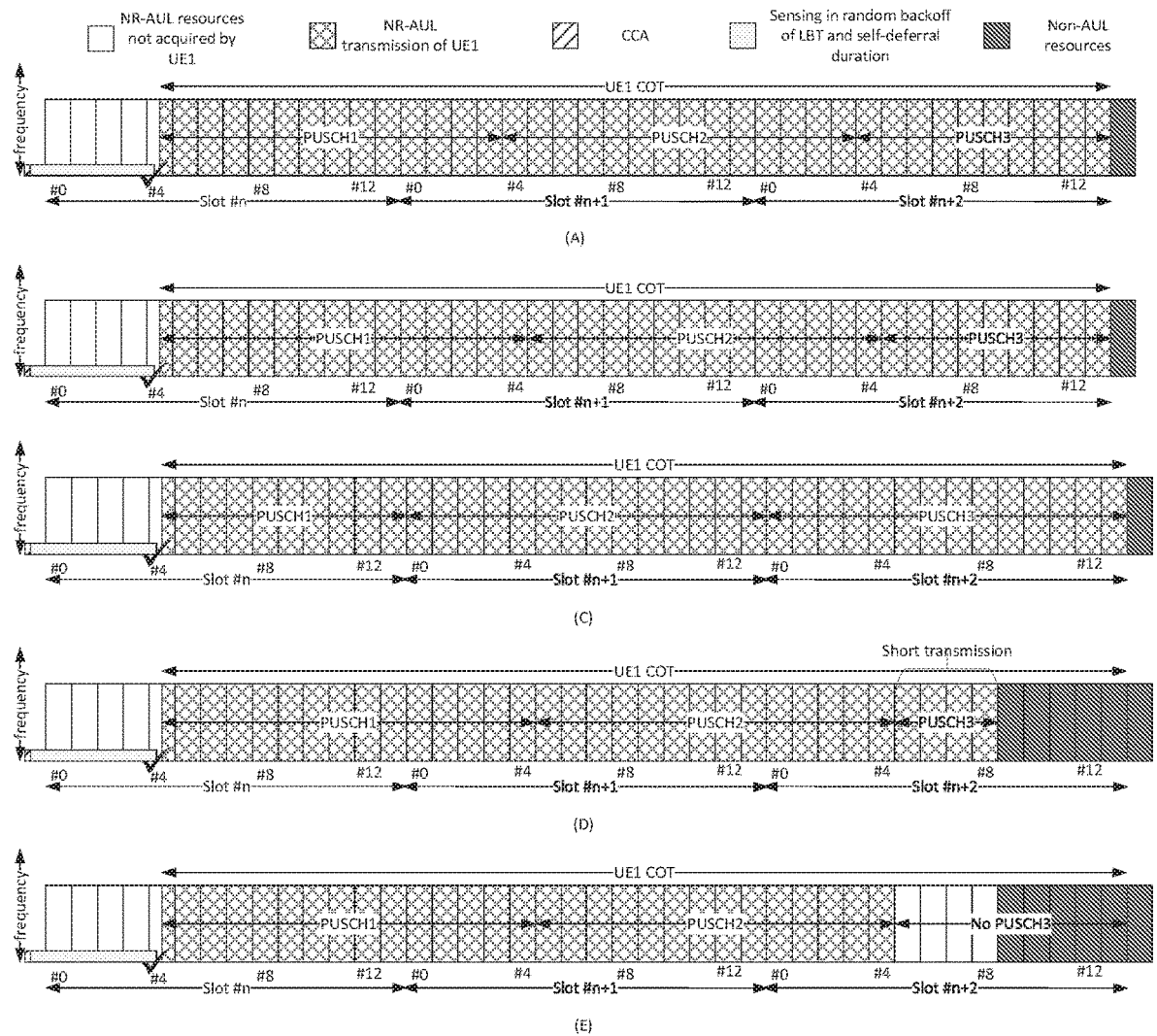
FIG. 12A is a timing diagram of an example NR-AUL PUSCH time resources, where all PUSCH transmissions of slot-length, regardless of starting OS-1st OS of PUSCH1 with CP extension.
FIG. 12B is a timing diagram of an example NR-AUL PUSCH time resources, where all PUSCH transmissions of slot-length, regardless of starting OS-PUSCH1 begins after OS with CP extension.
FIG. 12C is a timing diagram of an example NR-AUL PUSCH time resources Aligning 1st transmission to slot boundary.
FIG. 12D is a timing diagram of an example NR-AUL PUSCH time resources, where a last transmission is short as NR-AUL resources are no longer available
FIG. 12E is a timing diagram of an example NR-AUL PUSCH time resources, where there is no PUSCH transmission if slot-length transmission cannot be made.

Transmission of length-L NR-AUL PUSCH
Even if the UE gets delayed channel access into a resource, it still transmits length L PUSCH which may cross-over slot or mini-slot boundary; this is like a sliding window for transmitting the length-L PUSCH wherein, the starting time depends on the channel availability. The PUSCH symbols may be counted from the partial OS where it gets channel access (partial OS carries extended CP) as shown in FIG. 12A. Here, UE1 is configured for full-slot PUSCH transmission but gets channel access at $s_i=4$. PUSCH1 and PUSCH2 transmissions are 14-symbol long and begin on OS #4 of a slot and end at OS #3 of the next slot. On OS #4 of slot #n, the UE does CP extension of OS #5 for PUSCH1 transmission.

Alternatively, the PUSCH symbols may be counted from OS where UE gets full access as shown in FIG. 12B. UE1 transmits PUSCH1 from OS #5 in slot #n through OS #4 in slot #n+1.

Transmission of Variable length NR-AUL PUSCH

We propose herein to also allow the UE to transmit shorter length P OS PUSCH (P<L) transmissions depending on the resource availability. P may be selected by the UE. P may be restricted to a set of values configured to the UE by the gNB through RRC signaling.

For example, the UE's first NR-AUL PUSCH transmission may be shorter than L due to the delayed channel access. The UE aligns subsequent NR_AUL PUSCH transmissions to certain boundaries such as slot or mini-slot boundary. FIG. 12C shows an example where UE1 acquires the channel at $s_i$=4. It is configured for PUSCH transmissions of length L=14 (slot duration). But its first transmission PUSCH1 is shorter and from OS #4 to OS #13 of slot #n. In OS #4, the UE performs CP extension of the OS #5. PUSCH2 and PUSCH3 transmissions are aligned to the slot boundaries and occur in slots n+1 and n+2 respectively with full length L.

If enough NR-AUL resources are not available, either because the UE's COT expires or NR-AUL resources are not assigned, a PUSCH transmission may terminate in the last possible OS and can be shorter than L; this allows the UE to fully utilize the channel access opportunity and not waste an opportunity if the resource permits only less than L OS. As seen in FIG. 12D, PUSCH3 transmission is short and ends at the end of slot #n+2 at which the AUL resource ends.

Alternatively, if enough AUL resources are not present to transmit L-length PUSCH, the UE may not transmit any more NR-AUL PUSCH as shown in FIG. 12E.

For variable length PUSCH transmission, the UE's PUSCH transmission length must be either implicitly derivable at the gNB or explicitly indicated to the gNB through NR-AUL-UCI.

Implicit derivation of PUSCH length at the gNB

The gNB identifies the DMRS and recognizes NR-AUL UE activity. If the DMRS location indicates the starting OS of the PUSCH transmission, then the gNB can compute the number of OS in the PUSCH transmission until the end of the slot or mini-slot or NR-AUL resource from the location of the DMRS.

Alternatively, if the DMRS location is not an indicator of the start of the PUSCH transmission, the gNB may blindly detect NR-AUL-UCI on the set $S_L$ of possible lengths (which are the hypotheses for blind detection) for the transmission. The NR-AUL-UCI location and mapping are dependent on the PUSCH resources, especially starting location of the PUSCH and the number of resources for the PUSCH (which depends on the length of the PUSCH). If $S_L$ is restricted to a few values, complexity of blind decoding is small.

Explicit indication of PUSCH length through NR-AUL-UCI

UEs are given the autonomy to transmit shorter PUSCH to align with slot/mini-slot boundary or transmit full-length PUSCH or adjust the length as per the COT or available NR-AUL resources. We propose herein to include timeDomainAllocation information (in terms of either number of OFDM symbols or absolute time units) about the PUSCH transmission length in the NR-AUL-UCI.

The PUSCH may be of Type A or Type B as defined in NR; the location of first DMRS of the PUSCH can be on OS #2 or OS #3 for Type A and the location of first DMRS is at the start of the PUSCH for Type B PUSCH. UE may be configured for Type A or Type B NR-AUL PUSCH transmission through RRC. Alternatively, it may be configured for Type-A and Type-B NR-AUl PUSCH transmission with each type used under certain conditions such as starting symbol of PUSCH transmission, duration of PUSCH transmission, etc. The UE may indicate the type using one bit in the NR-AUL-UCI.

NR-AUL-UCI Resources on PUSCH for Variable Length PUSCH

Currently in NR and LTE for UCI mapping on PUSCH, the UE computes the resources for the UCI based on the total number of PUSCH symbols. If this approach is used, the NR-AUL-UCI will have different resources based on the length of PUSCH. The gNB has to perform blind decoding of possible UCI locations and resources (corresponding to the PUSCH length).

To limit the amount of NR-AUL-UCI decoding at gNB, we also propose herein to use the same number of resources for NR-AUL-UCI on PUSCH for every possible PUSCH length so that the UCI may be detected regardless of the length of the PUSCH and that the gNB is not required to perform blind decoding.

We also propose herein to map NR-AUL-UCI for different PUSCH types/lengths such that the gNB has minimal blind decoding. As gNB detects the DMRS to identify UE activity, the NR-AUL-UCI may be mapped in relation to the location of the DMRS—for example, the mapping may begin on the symbol following the first DMRS OS, so that gNB can detect NR-AUL-UCI on both Type A and Type B transmissions the same way.

Alternatively, we may support a limited set of NR-AUL-UCI mapping locations, e.g., a set of starting symbols relative to the first DMRS of the PUSCH as different lengths and Types (AB) of PUSCH transmission may ensure that there are enough resources for the NR-AUL-UCI. The gNB blindly decodes for these NR-AUL-UCI depending on where it finds the DMRS.

Figure 13:
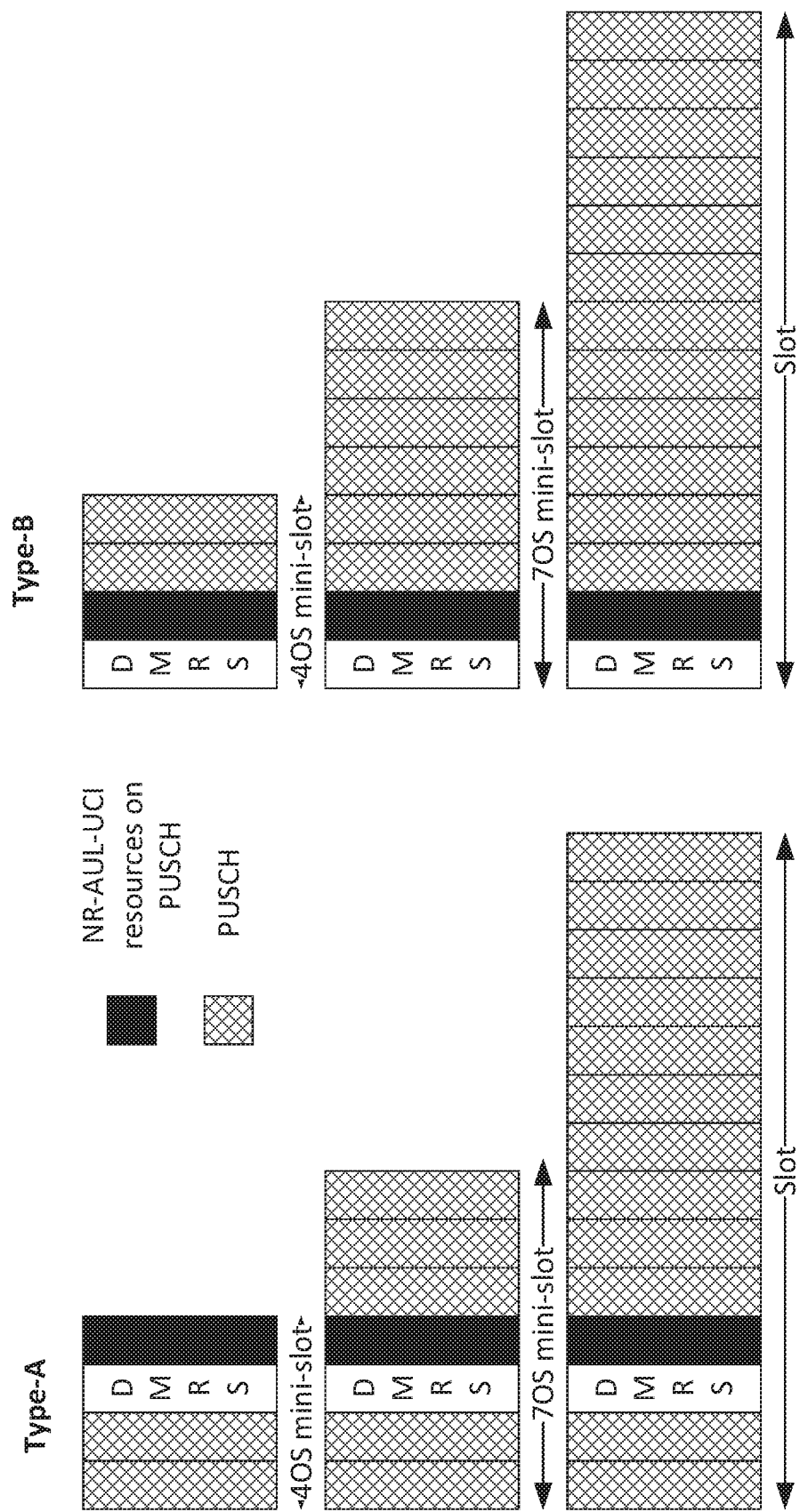
FIG. 13 is a timing diagram of an example of the use of the same NR-UCI resources and mapping for all PUSCH transmission lengths.

The concept is shown in FIG. 13 where the 4OS, 7OS and full-slot PUSCH transmissions have the same mapping and number of UCI resources for PUSCH. If DMRS indicates the starting OS of the PUSCH, the gNB detects the DMRS and obtains the beginning of the PUSCH using which it detects the NR-AUL-UCI resources.

The gNB decodes the UCI and if successful, it obtains the timeDomainAllocation. Then it acquires the length of the PUSCH transmission and proceeds to decode the data.

The field timeDomainAllocation may include one or more of the following:

the starting symbol location of the PUSCH
the length of the PUSCH
Modulation type for NR-AUL-UCI may be RRC configured to the UE or the UE may use a fixed modulation type such as QPSK or BPSK or π/2-BPSK. Similar to UCI transmission for ACK/NACK or CSI transmission on PUSCH, a $\beta_{offset}^{NR-AUL-UCI}$ value may be RRC configured to the UE and is used to compute the resources for the NR-AUL-UCI. The number of coded modulation symbols per layer for HARQ-ACK transmission, denoted as $Q'_{NR-AUL-UCI}$, may be determined as follows.

$$Q'_{NR-AUL-UCI} =$$

$$\left\{ \min \left[ \frac{(O_{NR-AUL-UCI} + L_{NR-AUL-UCI}) \cdot \beta_{offset}^{NR-AUL-UCI} \cdot \sum_{l=0}^{N_{symb,f}^{PUSCH}-1} M_{sc}^{UCI}(l)}{\sum_{r=0}^{C_{UL-SCH}-1} K_r} \right], \right.$$

$$\left. \left[ \alpha \cdot \sum_{l=l_0}^{N_{symb,P}^{PUSCH}-1} M_{sc}^{UCI}(l) \right] \right\}$$

where $O_{NR-AUL-UCI}$ is the number of NR-AUL-UCI bits;

$L_{NR-AUL-UCI}$ is the number of CRC bits for HARQ-ACK;

$\beta_{offset}^{PUSCH} = \beta_{offset}^{NR-AUL-UCI}$ $C_{UL-SCH}$ is the number of code blocks for UL-SCH of the PUSCH transmission;

if the DCI format scheduling the PUSCH transmission includes a CBGTI field indicating that the UE shall not transmit the rth code block, $K_r=0$; otherwise, $K_r$ is the rth code block size for UL-SCH of the PUSCH transmission;

$M_{sc}^{PUSCH}$ is the scheduled bandwidth of the PUSCH transmission, expressed as a number of subcarriers;

$M_{sc}^{PT-Rs}(l)$ is the number of subcarriers in OFDM symbol l that carries PTRS, in the PUSCH transmission;

$M_{sc}^{UCI}(l)$ is the number of resource elements that can be used for transmission of UCI in OFDM symbol l, in the PUSCH transmission $N_{symb,f}^{PUSCH}$ is the total number of OFDM symbols of the full-length PUSCH transmission configured to the UE, including all OFDM symbols used for DMRS;

$N_{symb,p}^{PUSCH}$ is the total number of OFDM symbols of the shortest PUSCH transmission configured to the UE, including all OFDM symbols used for DMRS; here, $p \leq f$.

for any OFDM symbol that carries DMRS of the PUSCH, $M_{sc}^{UCI}(l)=0$;

for any OFDM symbol that does not carry DMRS of the PUSCH, $M_{sc}^{UCI}(l)=M_{sc}^{PUSCH}-M_{sc}^{UCI}(l)$;

$\alpha \in \{0.5, 0.65, 0.8, 1\}$ is configured by higher layer parameter uci-on-pusch-scaling;

$l_0$ is the symbol index of the first OFDM symbol that does not carry DMRS of the PUSCH, after the first DMRS symbol(s), in the PUSCH transmission.

Figure 14:
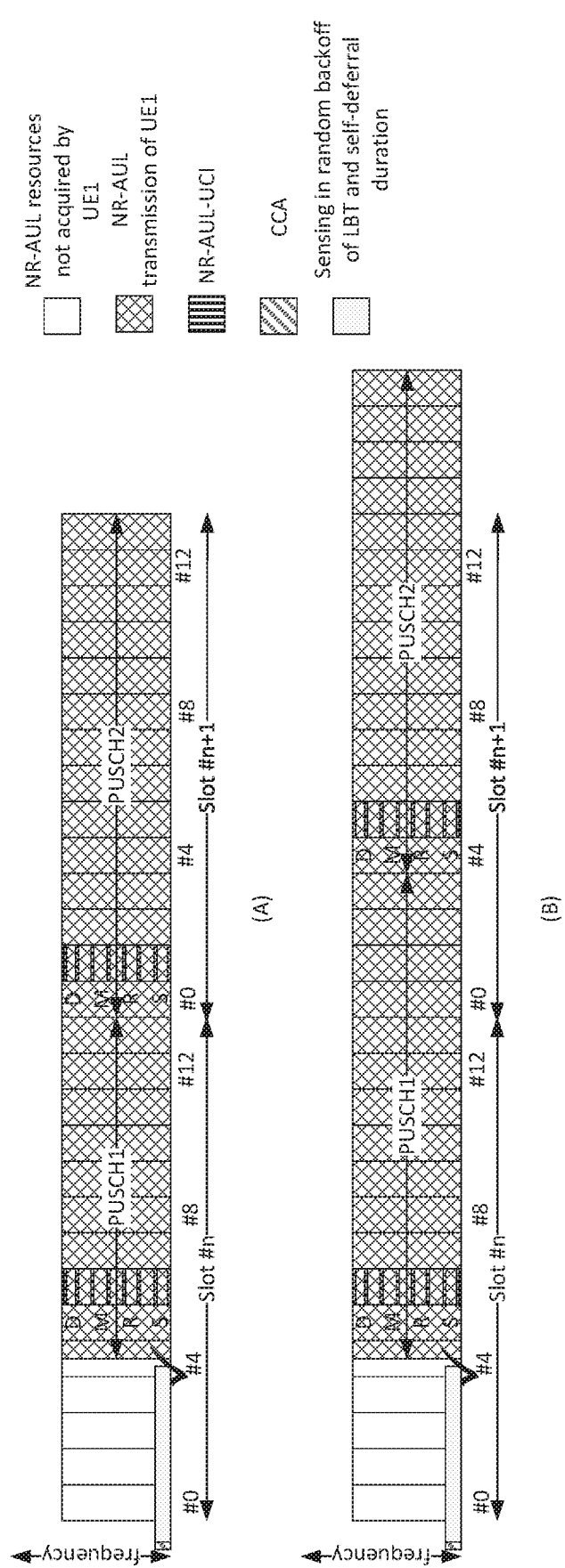
FIG. 14 is a timing diagram of an example concept of NR-AUL-UCI on PUSCH.

FIG. 14 illustrates the concept of NR-AUL-UCI on PUSCH.

If the PUSCH also carries other UCI such as ACK/NACK and CSI, the NR-AUL-UCI may be mapped first in a frequency-first manner. ACK/NACK and CSI may are mapped in their respective locations as currently defined in NR, but they do not overwrite the NR-AUL-UCI resources; so they slip the locations of NR-AUL-UCI.

Scrambling for NR-AUL-UCI

In NR and LTE, the UCI is mapped to its resources on PUSCH and the PUSCH is scrambled by a sequence which is initialized with a cell ID or UE-specific ID. However, if scrambled with UE-specific ID, the gNB has to decode the NR-AUL-UCI for every possible UE that may correspond to the detected DMRS. On the other hand, using cell ID based scrambling sequence will enable gNB to decode the NR-AUL-UCI regardless of the UE but the data on PUSCH is also scrambled by the cell ID based sequence, which makes it less robust compared to UE-specific sequence.

We propose herein to handle NR-AUL-UCI scrambling in the following ways to solve this problem.

Even if UE is configured with UE-specific scrambling ID for PUSCH, the UE uses only the cell ID or an aulID configured by the gNB. The same aulID is configured for multiple UEs so that NR-AUL-UCI of all these UEs will use the same aulID for scrambling. The gNB decodes NR-AUL-UCI for possible configured aulID; on decoding, the UE-ID (such as C-RNTI) is obtained from the payload of NR-AUL-UCI.

NR-AUL-UCI alone is scrambled by the cell ID or aulID. The remaining resources on PUSCH are scrambled by the UE-specific ID. Once the gNB detects the UE ID, it knows the UE-specific ID to use for descrambling when processing the data.

Multiple NR-AUL Grants for Flexibility in Timing

As an alternative to configuring self-deferral on multiple OSs for a UE, the gNB may configure multiple NR-AUL grants for the UE, where each grant has a different timing offset. This allows the UE to start transmission on one resource if the previous one is not available due to LBT failure. The time offset may be in terms of slot offset, symbol offset, or mini-slots. The grants may be Type-1 or Type-2.

Figure 15:
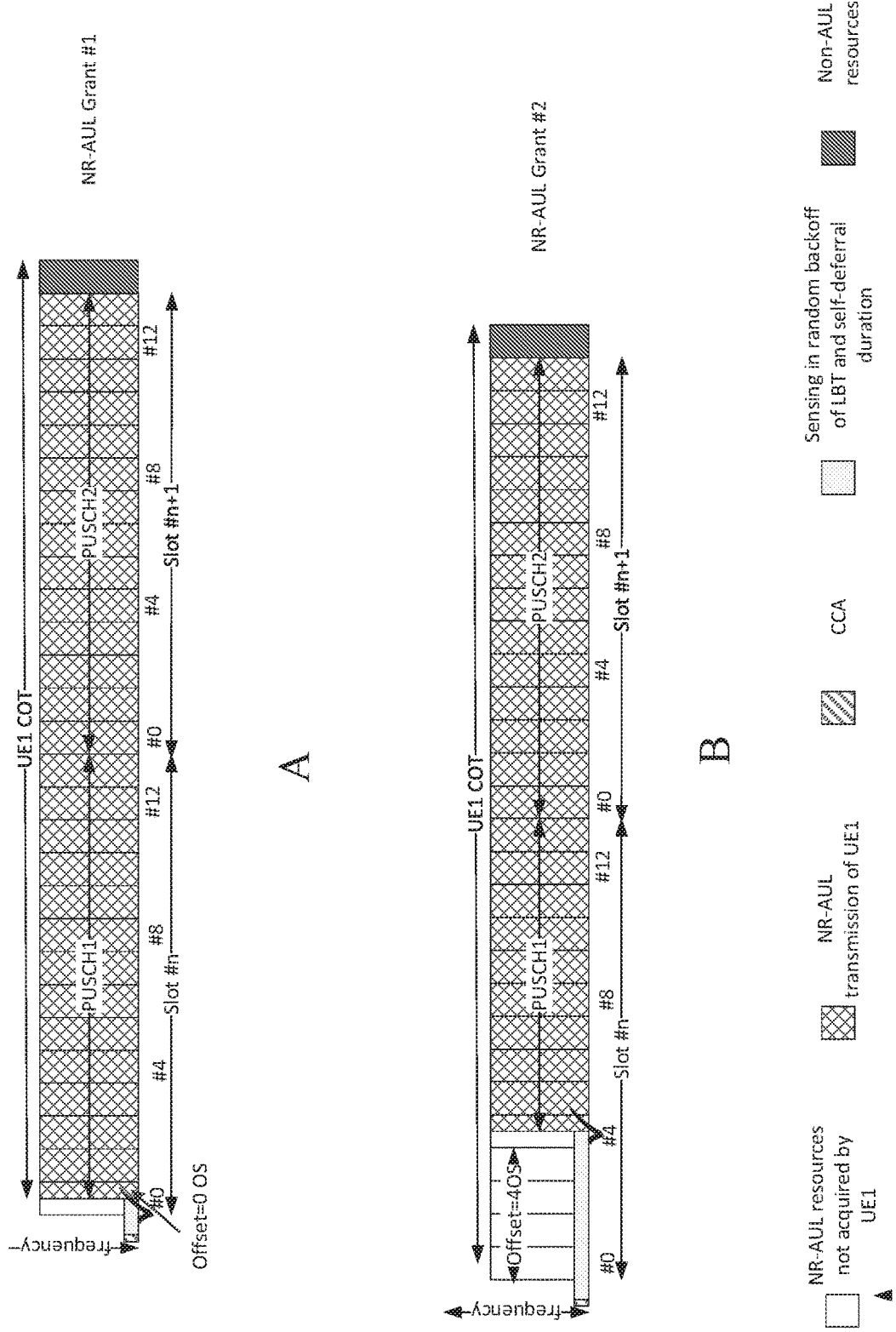
FIG. 15A and FIG. 15B show examples of multiple NR-AUL grants with different time offsets.

The concept is shown in FIG. 15A and FIG. 15B, with multiple NR-AUL grants with different time offsets. Here two NR-AUL grants are available to the UE, each with a different time offset within a slot. Grant #1 has an offset of 0 OS while grant #2 has an offset of 4 OS. The UE performs LBT to gain access to grant #1 resource. If available, UE transmits PUSCH1 as shown in FIG. 15A. If the LBT fails, the UE attempts to access the grant #2. If LBT is successful, the UE transmits PUSCH1 on grant #2 as shown in Figure B. Here, the PUSCH1 transmission is slot boundary aligned. In general, it may also cross the slot boundary as shown in FIG. 12B.

The UE may generate the self-deferral value in the following ways to access the channel.

Single self-deferral value is generated for access to any of the grants. The UE may select a value randomly from a possible list of random values provided to it by the gNB or predefined in the specification. The same value is applied to access grant #1 or grant #2 in FIG. 15.

Separate self-deferral values are generated for access to each grant. They may be generated randomly, from a list of random values configured by the gNB or predefined in the specification. This has the advantage that if a UE loses access to one grant due to large self-deferral value, it may still have a good chance to get a resource on another grant as the self-deferral value for that access is independently generated.

As the time and frequency resources may be the same or similar across multiple grants, the gNB must be able to identify the grant used by the UE. We propose herein that the DMRS of the NR-AUL PUSCH be used to identify the grant; so, each grant is RRC configured to have a unique DMRS sequence initialization or unique DMRS port.

The UE may access its NR-AUL grant resources in the following ways.

In each channel access, e.g. acquired COT, the UE may use only resources from a single grant. If the UE starts transmission on grant #1, it continues to use only resources of grant #1 until it releases the channel. This simplifies the processing at the gNB which relies on the DMRS hypotheses to detect the UE ID and the resource.

Figure 16:
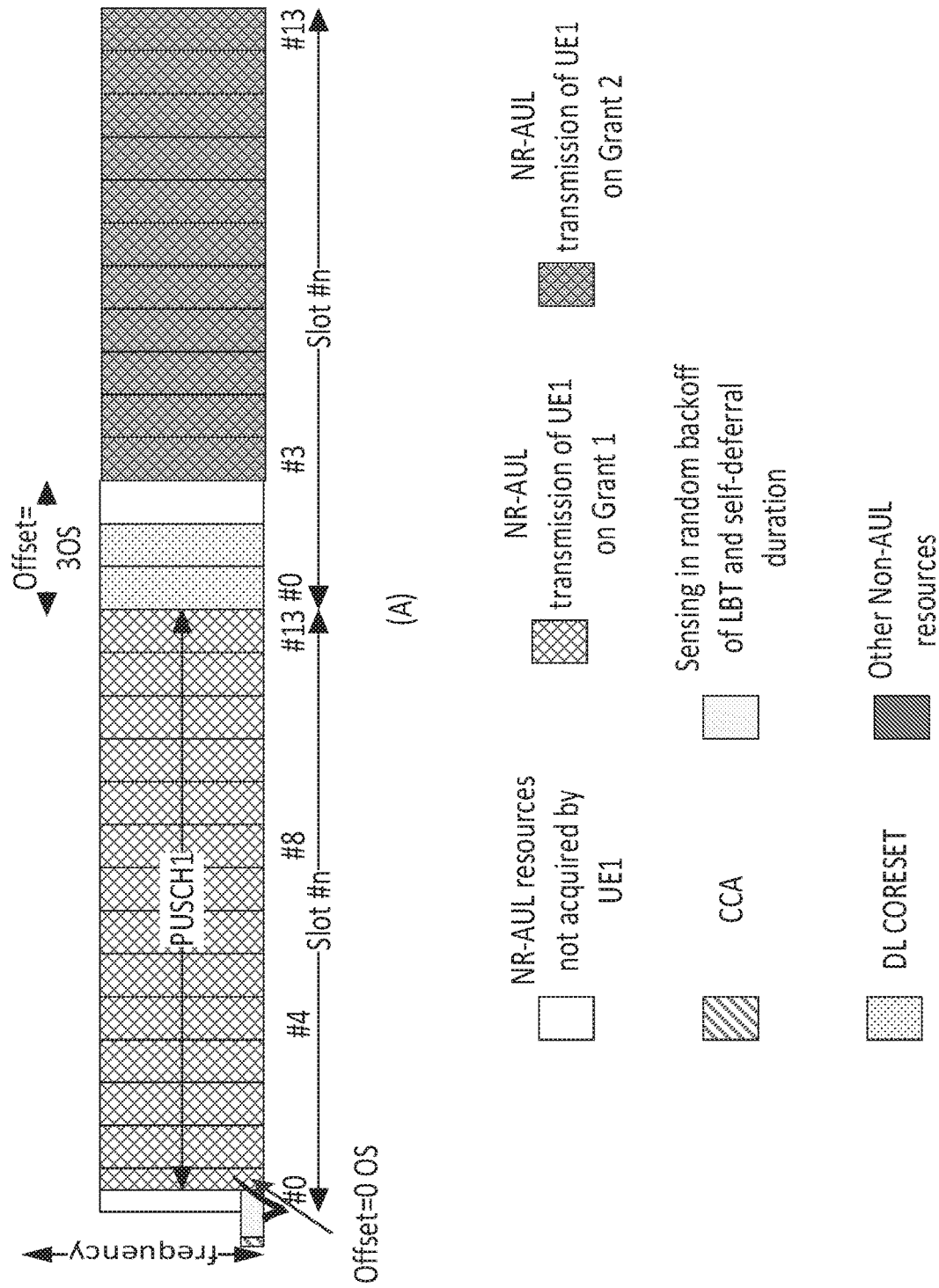
FIG. 16 shows an example of CG switching after COT-sharing with gNB.

The UE may use resources from multiple grants within a COT. This may especially be used during UE-COT sharing with gNB as shown in FIG. 16. Here the UE uses grant #1 prior to COT sharing and uses grant #2 after the gNB's symbols. Grant #2 is configured to start on OS #3. Here the PUSCH transmission crosses the slot boundary.

We also propose herein to indicate the autonomously selected NR-AUL grant in the NR-AUL UCI. This increases the robustness in detecting the autonomous UE. For example, the RNTI used to scramble the UCI may be a function of the grant ID or the grant ID may be carried in the UCI payload.

PUSCH Repetition

We propose herein that autonomous transmission should support repetition of NR-AUL transmissions. This can be beneficial especially for mMTC and URLLC as it allows multiple transmissions in time for increased reliability and reduced power consumption (as a burst of repetitions can be completed in one shot). CG in NR supports a bundle of consecutive repetitions of a HARQ process. In feLAA AUL, the AulTransmissionTimer is triggered on the first transmission of a HARQ process; the UE may repeat the HARQ process if it does not receive feedback from gNB about the HARQ process.

AUL-UCI for Repetition

We propose herein to support autonomous repetition of TB in NR-AUL. We refer to retransmissions of a HARQ process within time period $t_{bundle}$ as a bundle of repetitions. The gNB configures $t_{bundle}$ to the UE through RRC signaling. The maximum number of repetitions repK may also be configured to the UE through RRC signaling. The UE may repeat a transmission up to repK times with duration $t_{repeat}=\min(t_{bundle}, COT)$.

As asynchronous HARQ may be supported for NR-AUL, the repetitions need not be consecutive.

Figure 17:
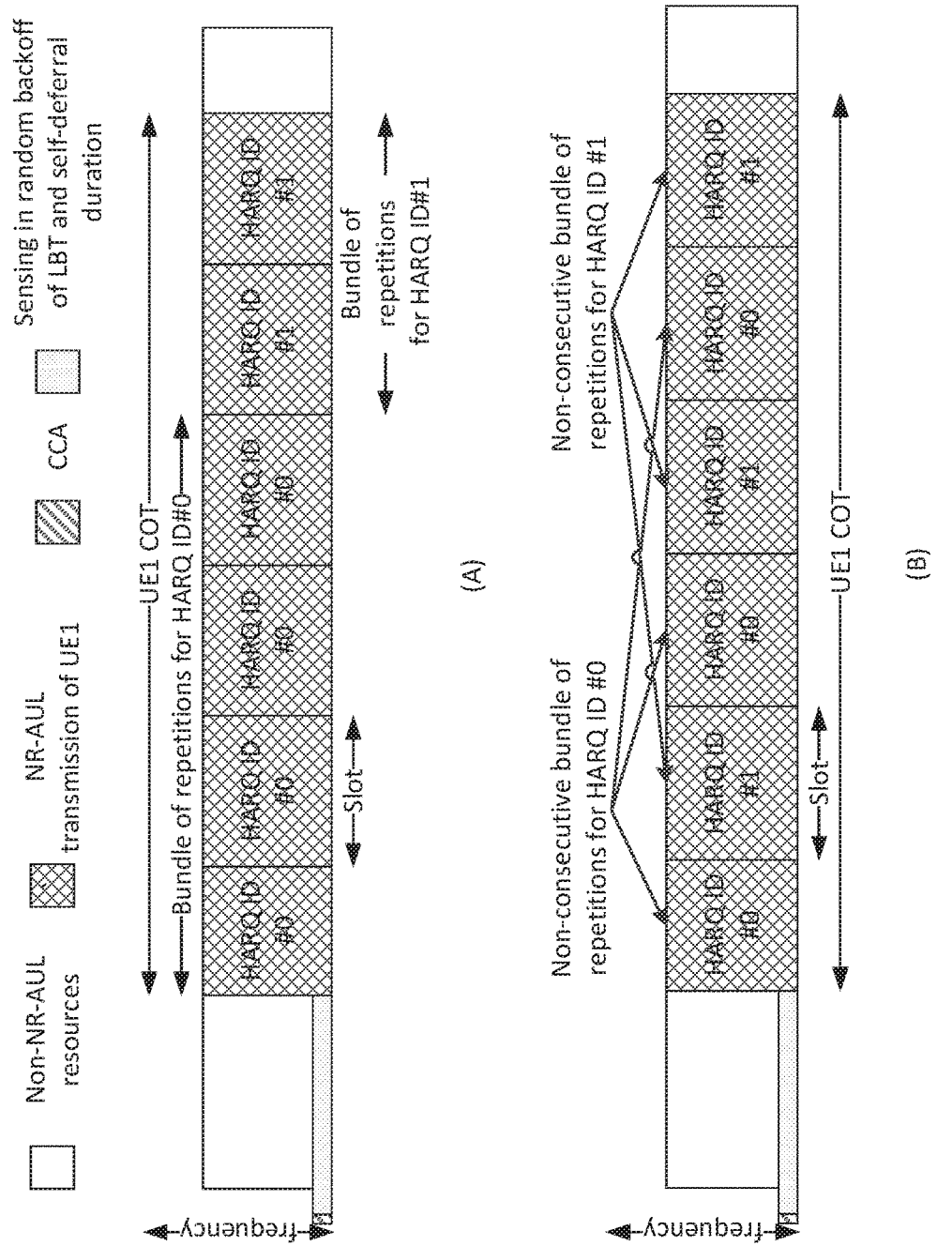
FIG. 17A is a timing diagram of an example of Repetition of NR-AUL PUSCH in a bundle with consecutive retransmissions.
FIG. 17B is a timing diagram of an example of Repetition of NR-AUL PUSCH in a bundle with non-consecutive retransmissions.

For example, if the UE has two HARQ processes to transmit and has repK=4, it may either transmit the repetitions consecutively as shown in FIG. 17A or it may alternate the HARQ processes as shown in FIG. 17B so that it can transmit both processes within the MCOT, without waiting for one process' bundle of repetitions to complete; as a result, the UE may be transmit fewer than repK times for each HARQ process.

The NR-AUL-UCI on the first PUSCH transmission in the COT may indicate one or more of following information to the gNB Number of HARQ processes that will be transmitted
Type of repetition (consecutive or alternate between the processes or other aperiodic pattern)
UE may autonomously select certain transmission parameters in common to all the NR-AUL transmissions in the COT, such as, for example: MCS; RV; HARQ process ID; and UE-ID.

We propose herein to provide the UE ability to indicate the common parameters only on certain transmissions and not on the other transmission to minimize the NR-AUL-UCI overhead.

Figure 18:
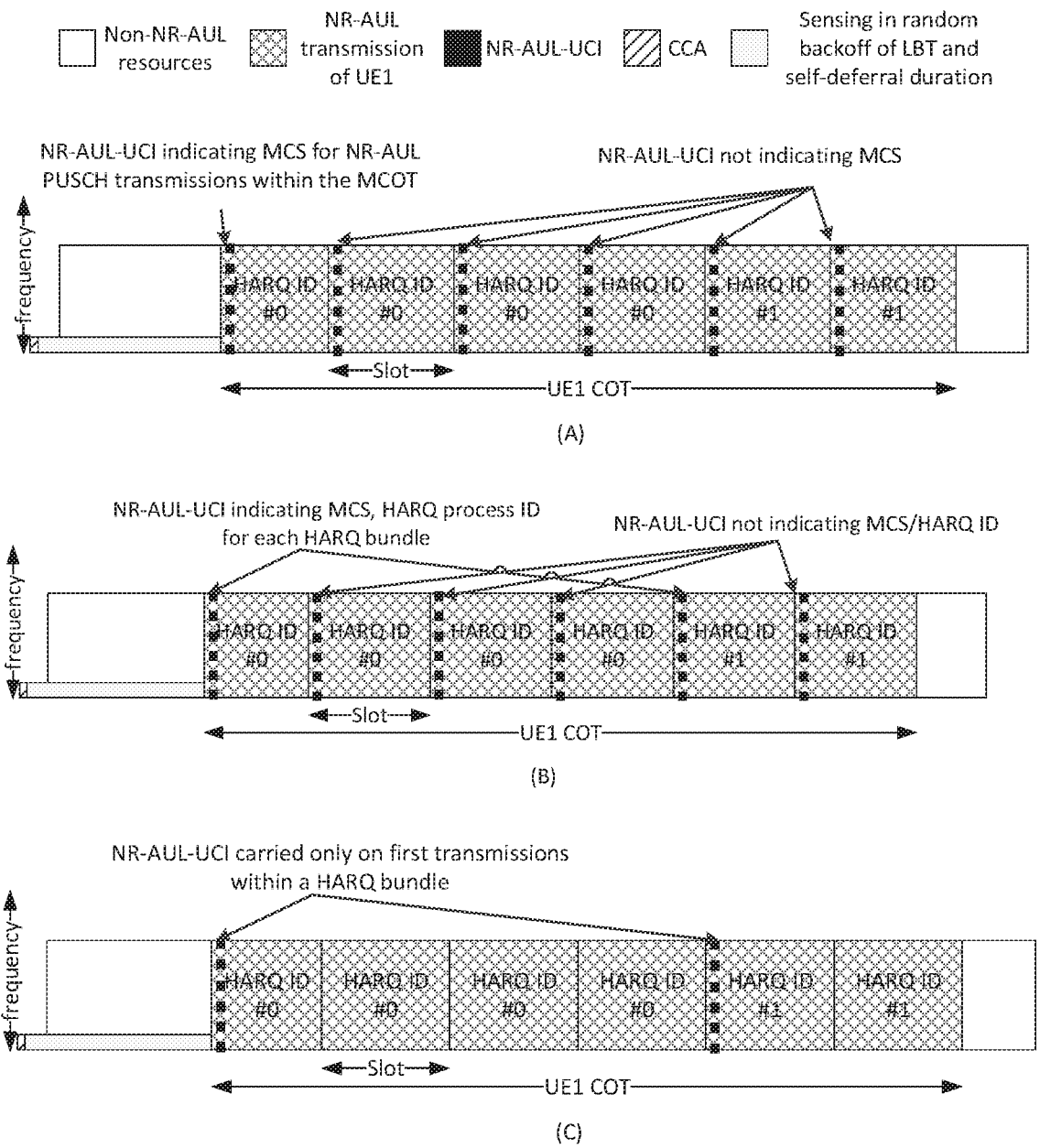
FIG. 18A is a timing diagram of an example NR-AUL-UCI in a bundle where a first NR-AUL PSUCH transmission in COT carries MCS for all following transmissions.
FIG. 18B is a timing diagram of an example NR-AUL-UCI in a bundle where a first NR-AUL PSUCH transmission in a bundle indicates the MCS and HARQ ID of the repetitions.
FIG. 18C is a timing diagram of an example NR-AUL-UCI in a bundle, where repetitions in a bundle do not carry NR-AUL-UCI.

For example, the UE may indicate MCS only in the first NR-AUL PUSCH transmission of a COT as shown in FIG. 18A. The NR-AUL-UCI on other PUSCH transmissions may not carry the field for MCS.

In another example, the UE may transmit repetitions in a bundle and indicate the MCS and HARQ process ID (and RV of the repetitions) in the first PUSCH transmission of the HARQ process in that COT, as shown in FIG. 18B. The NR-AUL-UCI on other PUSCH transmissions in the bundle may not carry the field for MCS and HARQ process ID.

In FIG. 18C, we have an example where the repetitions of a HARQ process in a bundle do not carry NR-AUL-UCI. The first transmission of that HARQ process in the bundle carries information on the RVs of the repetitions.

NRAulTransmissionTimer

A UE may transmit repetitions autonomously within a COT so the repetitions of the bundle may not occur consecutively, as shown in the example in FIG. 17B.

Figure 19:
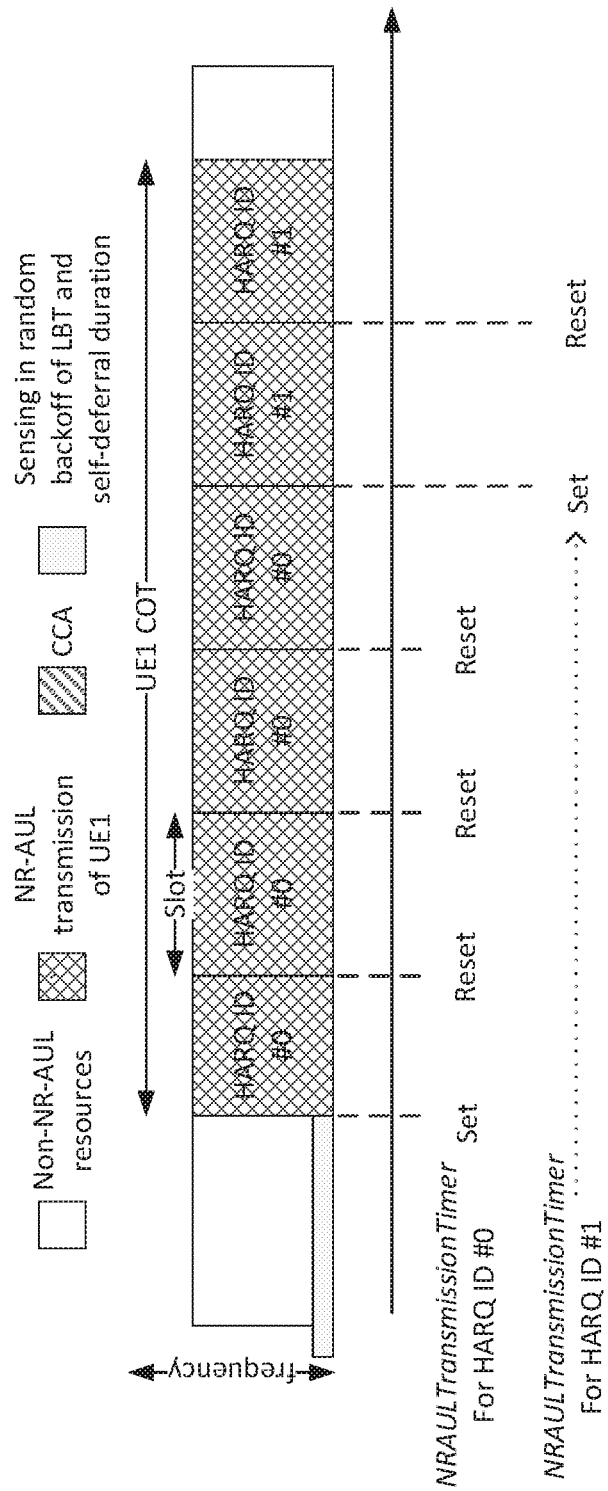
FIG. 19 is a timing diagram of an example of NRAulTransmissionTimer operation for a repetition bundle.

An NRAulTransmissionTimer may be defined for each HARQ process configured for NR-AUL transmission. The NRAulTransmissionTimer may be set on the last transmission of the HARQ process in the bundle. The NRAulTransmissionTimer decrements over time; when it expires, the UE may retransmit the HARQ process on NR-AUL resources. In practice, the UE may set the NRAulTransmissionTimer each time the HARQ process is transmitted within the COT to an RRC configured value; effectively this sets the timer on the last transmission of the HARQ process. The concept is shown in FIG. 19.

Note that this is different from the configuredGrantTimer in NR and AulTransmissionTimer in feLAA where the first PUSCH transmission of a HARQ process causes the timer to start.

Interlaces in HARQ Repetitions

Figure 20:
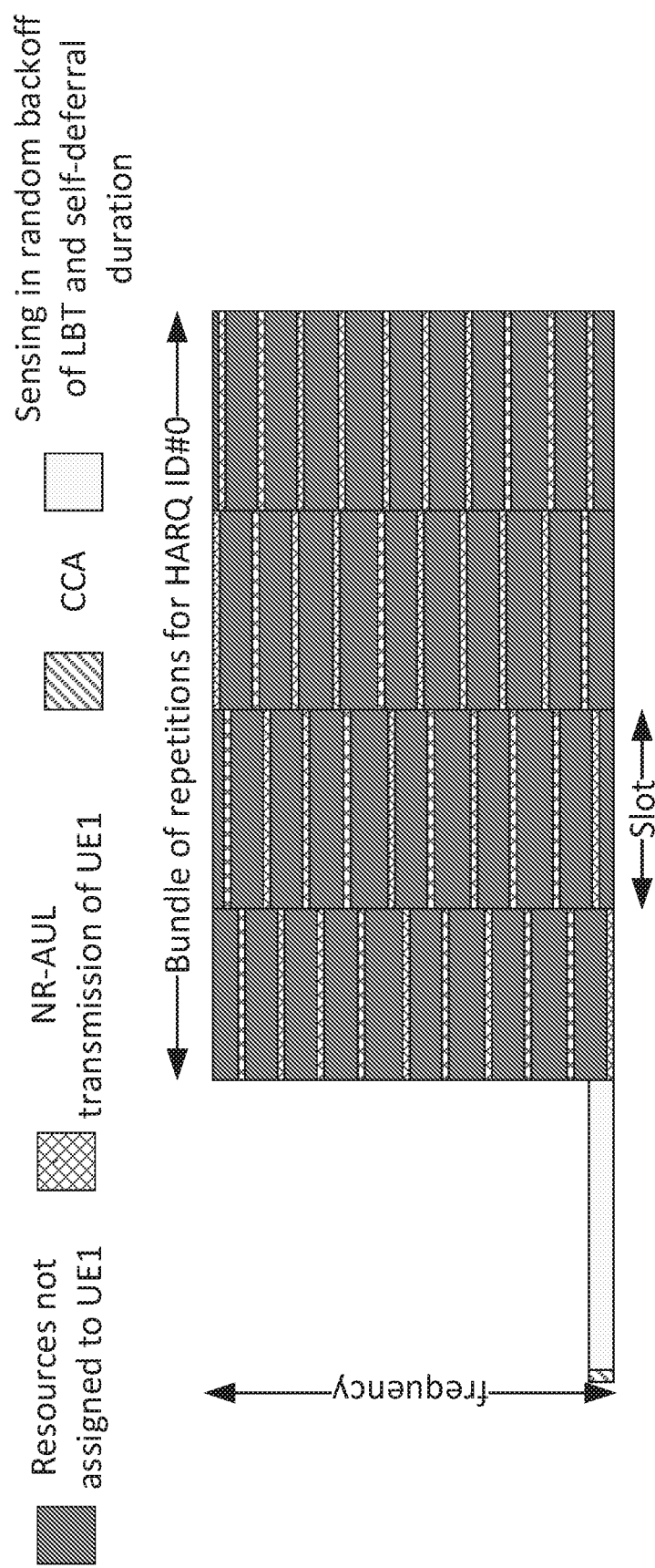
FIG. 20 shows an example of different interlaces in repetitions of the HARQ process.

PUSCH transmissions for NR-U may use some form of block interlaced FDMA (BI-FDMA) similar to eLAA. We propose herein that repetitions of the HARQ process may use different interlaces to exploit frequency diversity as shown in FIG. 20.

The interlace for the HARQ process and its repetitions may be configured either through RRC (for example, in Type-1 NR-AUL grants) or through the activation DCI (for example, in Type-2 NR-AUL grants).

Alternatively, the interlace for the first transmission in the bundle may be configured either through RRC (for example, in Type-1 NR-AUL grants) or through the activation DCI (for example, in Type-2 NR-AUL grants) and the interlaces for the repetitions may be derived as an offset from the interlaces of the first transmission in the bundle. The offset is a function of one or more of the following factors.

Figure 21:
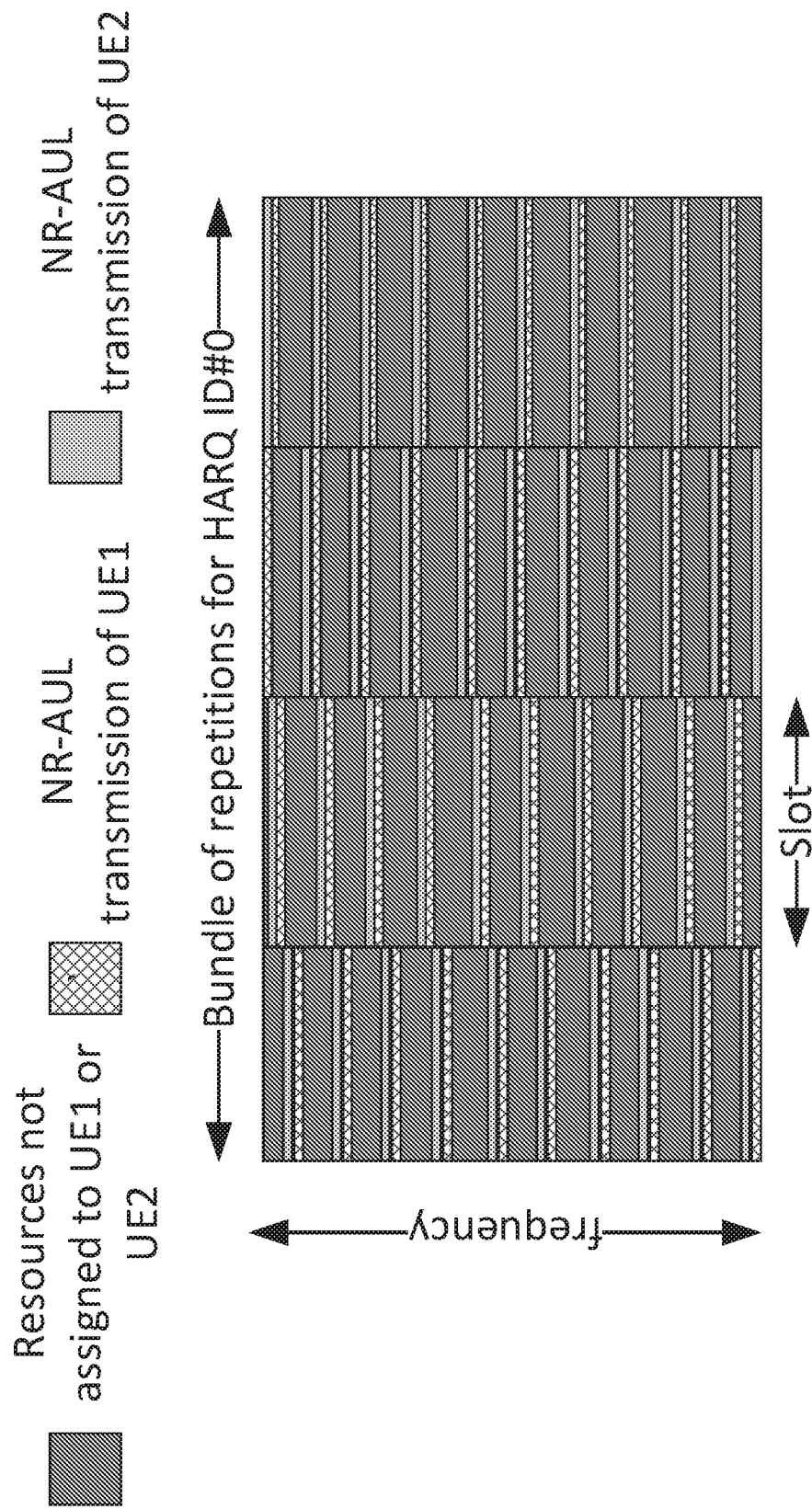
FIG. 21 shows an example of the use of the same offset in the repetitions to avoid UE collision.

$k^{th}$ Repetition in the bundle
HARQ process ID
RV of the HARQ process
UE-ID such as NR-AUL-RNTI or C-RNTI
Slot number in the frame If multiple UEs are interlaces, collision may be avoided by allocating the same offset to the UEs. This is shown in FIG. 21. Here UE1 and UE2 have same offset in each repetition, so they do not collide.

Figure 22:
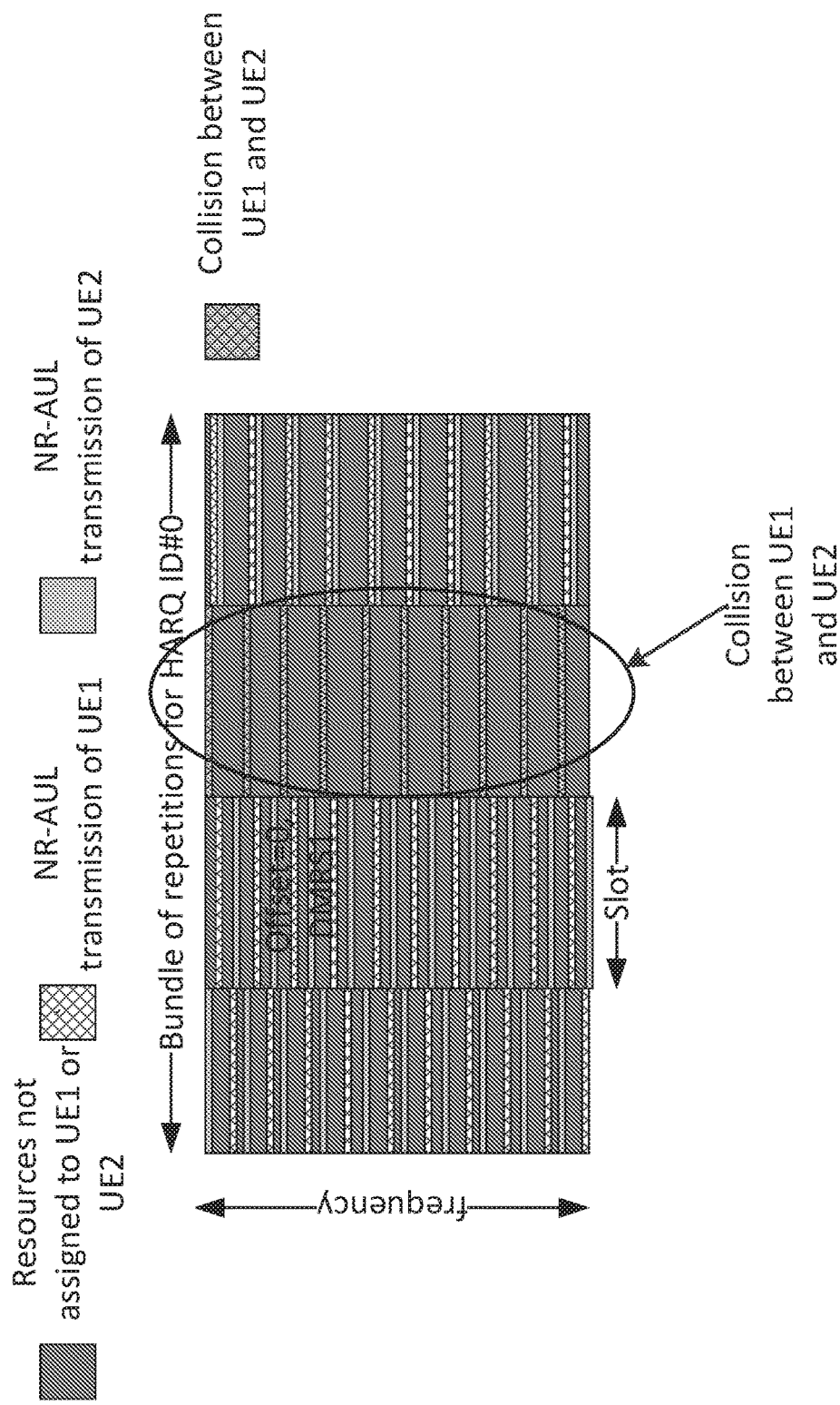
FIG. 22 shows an example of pseudo random offset for each UE, which minimizes chance of collision. Some repetitions may collide while others do not.

In practice, if there is significant traffic, the gNB may allocate the resources to multiple UEs and a collision may be fully avoided. In this case, each UE may have offsets independently configured for their repetitions; so, some repetitions may not collide. This is shown in FIG. 22.

UE-COT Sharing with gNB

In AUL feLAA, UE may share COT with eNB and UL-DL switching is supported with DL transmitting up to two OS for control signaling.

Figure 23:
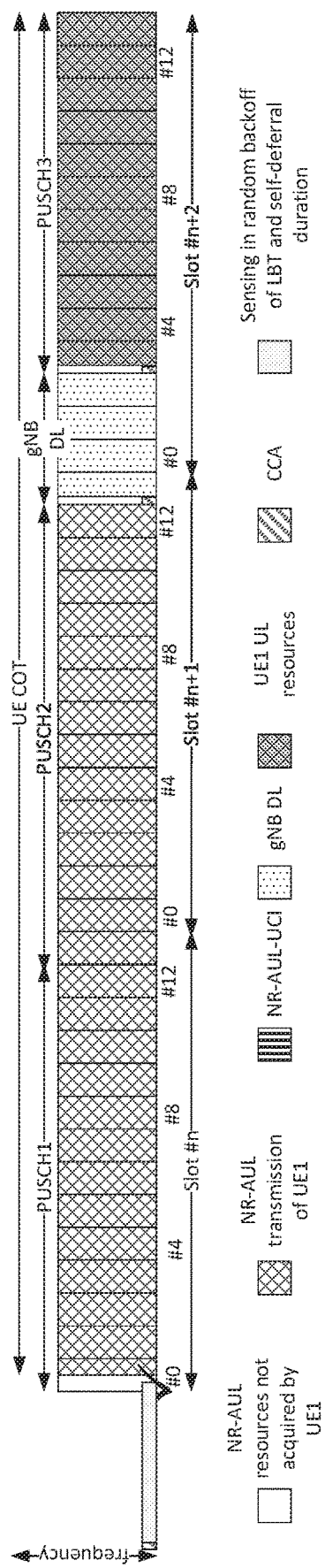
FIG. 23 is a timing diagram of an example of a UE COT sharing with gNB in U-DL-UL manner.

We propose herein to enhance this COT sharing mechanism for NR-AUL. We propose herein that the NR-AUL support at least UL-DL-UL switch and potentially multiple UL-DL switches within the shared COT so that the UE can regain channel access within its COT following the gNB's channel usage. In FIG. 23, the UE1 transmits PUSCH1 and PUSCH2 after which it shares the channel with the gNB. The last symbol of PUSCH2 may be used to switch to DL. The gNB uses D OS for DL transmission, especially DL control information such NR-AUL-DFI carrying ACK/NACK to at least the COT sharing UE for NR-AUL and scheduled grants.

After this, the eNB returns the channel to UE1 which may transmit UL within its remaining COT—this transmission may be NR-AUL or S-UL transmission.

The OS following the DL may provide either 16 µs switching time to go back to UL transmission or a 25 µs time for UE to perform LBT and regain access to the channel within its original COT.

FIG. 23 also provides another example where, due to COT-sharing, the UE's PUSCH transmission length is variable, as seen in transmission of PUSCH3. If the PUSCH length can be indicated through the NR-AUL-UCI, more flexibility can be provided in provisioning the CORESET.

Triggered S-UL Grants in Shared COT

In eLAA, as it takes 4 ms to process an UL grant, triggered grant was introduced. Here, the eNB gives an UL grant to the UE with a flexible timing resource. On receiving the grant, the UE prepares the TB. Later, the eNB sends a trigger via C-PDCCH (common-PDCCH) depending on channel availability. On receiving the trigger, the UE transmits PUSCH with minimal latency. The timing between the grant and the trigger is flexible.

Figure 24:
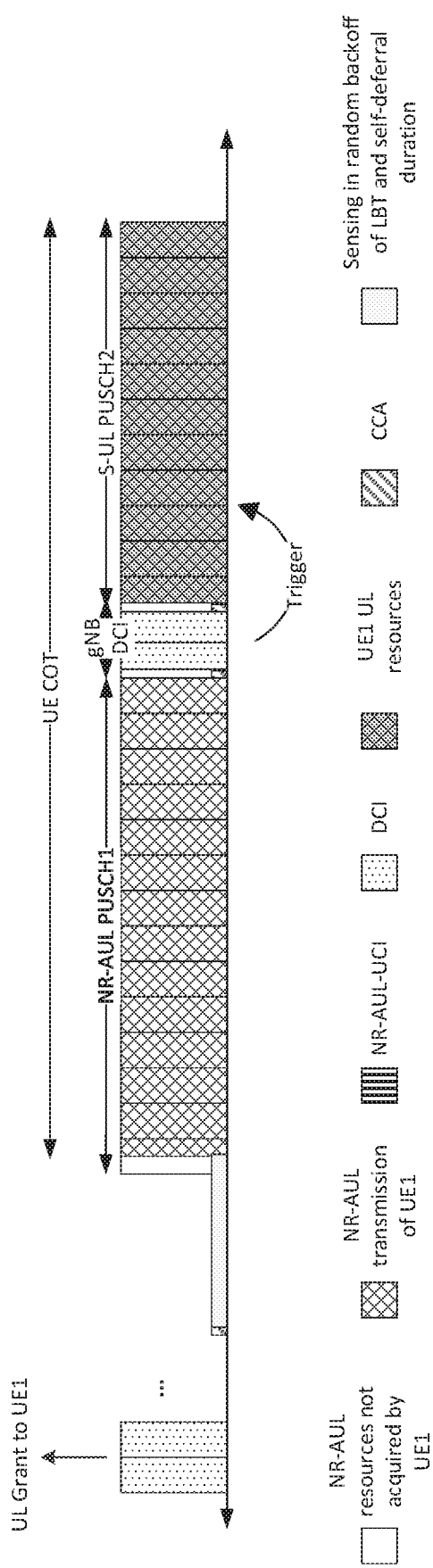
FIG. 24 is a timing diagram of an example of a DCI-based trigger for S-UL during shred COT.

In NR-U, we propose herein to enable gNB's triggering through DCI during the shared COT so that UE1 can transmit an S-UL on the NR-AUL resources within its MCOT after the gNB returns the channel to UE1 as shown in FIG. 24. The UL grant may be given through a DCI. The trigger may occur through a GC-PDCCH. S-UL grants may also be provided to UEs other than the one that shared its COT.

This mechanism may be used to trigger multiple S-UL grants within the remaining MCOT. However, the gNB must have knowledge of the duration of the remaining COT of the UE to schedule the timing resources within the remaining COT. Therefore, we propose herein to introduce an indication of the remaining COT through NR-AUL-UCI in one of the following ways.

A field 'remainingCOT' is transmitted in the NR-AUL-UCI to indicate the offset to the symbol or slot up to which the UE has COT. The UE may be required to transmit a valid value for remainingCOT only in the NR-AUL-UCI which trigger the COT sharing.

A CRC-mask which is a function of the offset is used to mask the CRC of NR-AUL-UCI. The gNB decodes the NR-AUL-UCI and selects the CRC-mask that enables successful CRC check; this CRC-mask provides the remaining COT information to the gNB.

RTS-CTS Handshaking Through COT Sharing

Figure 25:
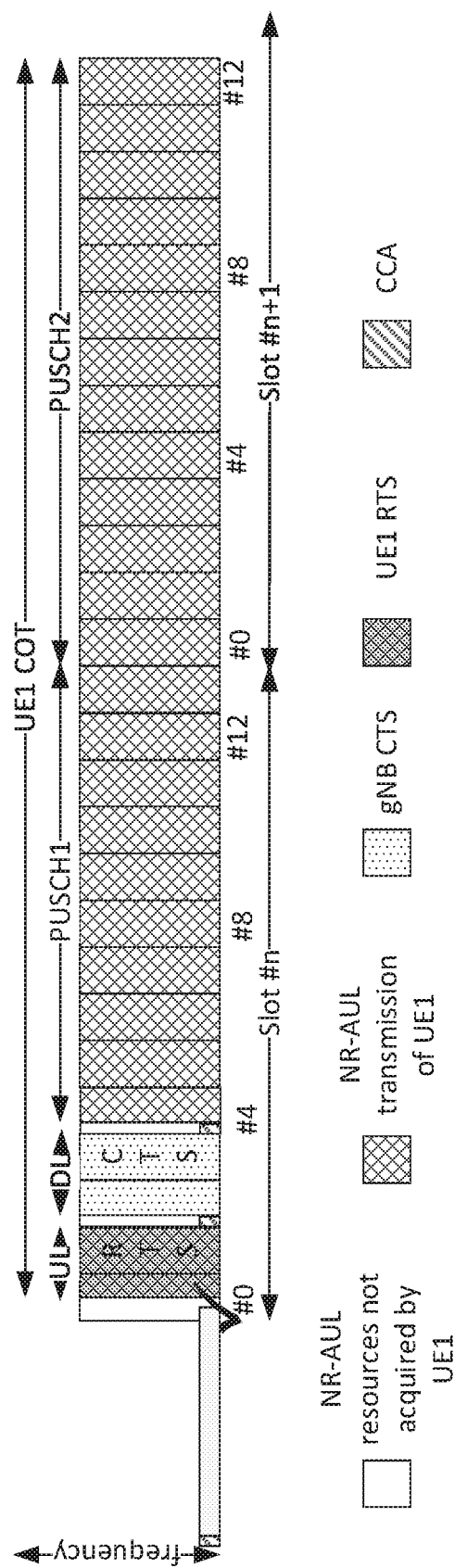
FIG. 25 is a timing diagram of an example RTS-CTS transmission in NR-AUL resources, where RTS is transmitted by UE in the form of NR-AUL-UCI only on PUSCH.

We propose herein to support a mode in NR-U where the UE and gNB handshake to ensure that the channel is clear at both ends and there is no obstruction due to hidden nodes. In this case, the UE may transmit only NR-AUL-UCI using UCI only on PUSCH in a few OS and turn over the channel to the gNB as shown in FIG. 25. If the gNB receives the UE's transmission, it transmits a CTS signal which may be in the form of one of the following.

GC-PDCCH. A GC-PDCCH based acknowledgement may be sent to one or more UEs on a CORESET in the shared COT UE-specific RS which is configured similar to a CSI-RS NR-AUL-DFI scrambled with NR-AUL-RNTI. The NR-AUL-DFI may be set to a special value to indicate to the UE that the NR-AUL-UCI was decoded. Thus, the UCI is acknowledged although no specific HARQ process is present.

When the UE receives it, the handshake is complete, and the UE takes over the COT and begins data transmission on NR-AUL resources in the remaining COT. In general, multiple UL and DL switching can be supported in NR-AUL although it comes at the cost of providing switching gaps.

DL CORESET in Shared COT

In AUL feLAA, the DL symbols of shared COT occurred at the start of partial ending subframes, following the end of an AUL subframe. PDCCH is always configured to occur at the starting OS of the LTE subframes and all UEs monitor DCI in every subframe. Therefore, the UE sharing the COT can monitor the shared DL OS for AUL-DFI or other control signaling.

But in NR, the UE is configured with CORESETs and associated search spaces with certain monitoring periodicity. Moreover, due to the flexible nature of start and stop positions of a PUSCH transmission, the opportunity for DL OS may occur anywhere in a slot but the UE may not be configured for a CORESET and search space set in those symbols. To ensure that a CORESET can be provided for the UE sharing the COT, we propose the following solutions.

Flexible Time Resources for AUL-Search-Space Set

As one solution, we propose to configure an 'AUL search-space set' in NR-U to enable reception of DL control signaling during UE COT sharing. The UE monitors the AUL-search-space set which has one or more of the following features.

It is not periodic, unlike the search space sets currently configured in NR; UE monitors it only when it shares it COT with gNB and does not monitor it otherwise.

It has a flexible offset within the slot; it occurs in the OS following the LBT gap after the last symbol of the PUSCH transmission. Therefore, its time resources can be flexibly allocated following a mini-slot or a slot. Channel access and COT-sharing requirements dynamically trigger the time resource for the AUL-search-space-set.

It may occur only on AUL symbols with flexible transmission direction; e.g., 'X' in SFI It is associated with a CORESET that provides the frequency resources, QCL information and mapping type, similar to the CORESET of periodic search space sets.

Figure 26:
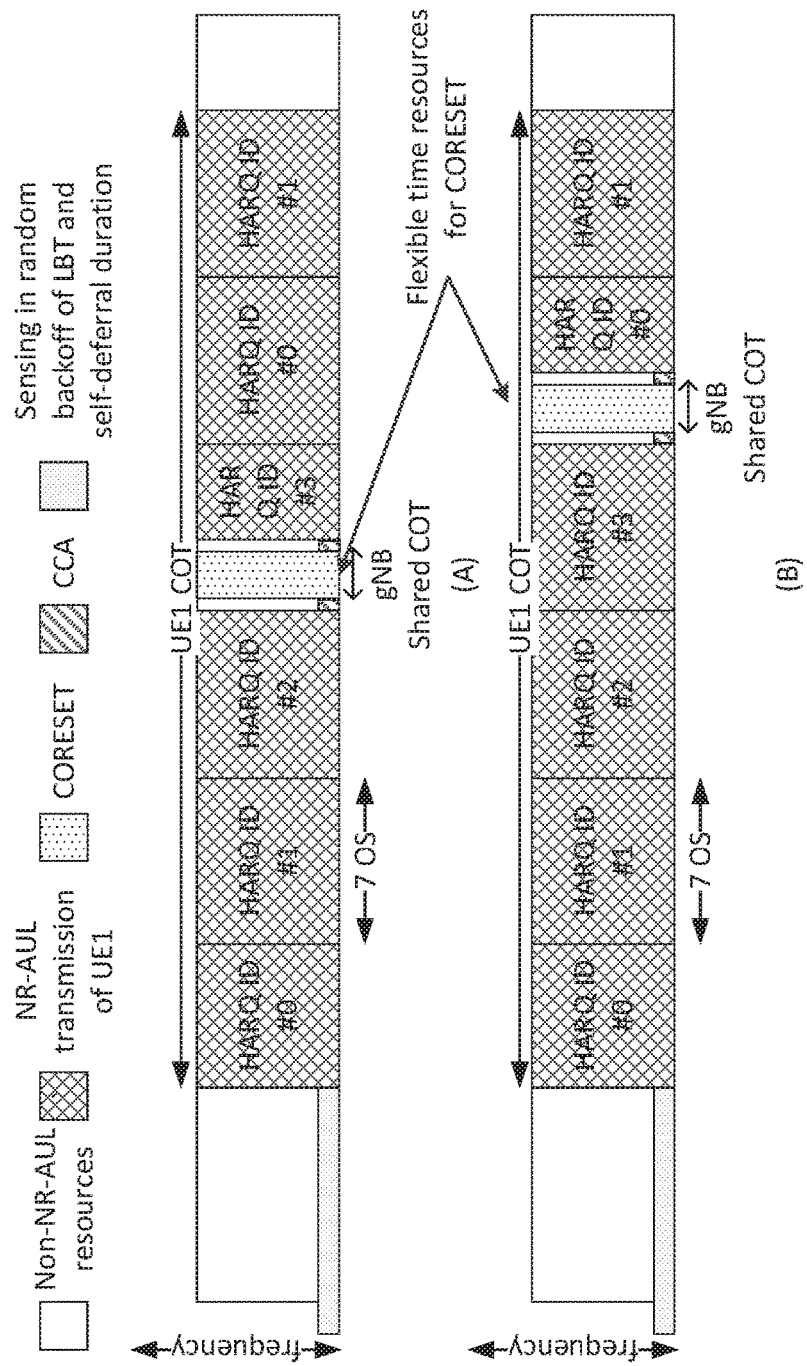
FIG. 26A is a timing diagram of an example flexible CORESET allocation following COT sharing with a CORESET resource after three PUSCH transmissions.
FIG. 26B is a timing diagram of an example flexible CORESET allocation following COT sharing with a CORESET allocation after four PUSCH transmissions.

The concept is shown in FIG. 26A and FIG. 26B where the CORESET resources are provided immediately following the COT sharing.

If the UE has been configured for a regular (non-flexible) search space set that begins at the starting location of the shared COT's DL OS, then it assumes that the AUL-search-space set need not be monitored in that COT. Instead the UE monitors the non-AUL search space set for its DL control information.

The duration of the CORESET associated with this AUL search-space (through the controlResourceSetId) determines the duration of the DL region in the shared COT.

The UE may be configured with multiple AUL search-space sets which may be associated with different CORESETs; for example, the CORESETs may have different duration (1 or 2 or 3 OS). Depending on the OS where the DL part begins, a CORESET with a certain duration may be used. Therefore, the starting symbol of the DL may be associated with a CORESET ID through RRC configuration.

Using Configured CORESETs

A UE may have NR-AUL resources assigned in OS with flexible scheduling 'X' but CORESETs may also be assigned for monitoring over the OS configured or scheduled as 'X'. If a UE shares the COT with the gNB, it terminates its NR-AUL-PUSCH prior to the CORESET so that the gNB can perform a 25 µs LBT and transmit DL control signaling on the CORESET.

Figure 27:
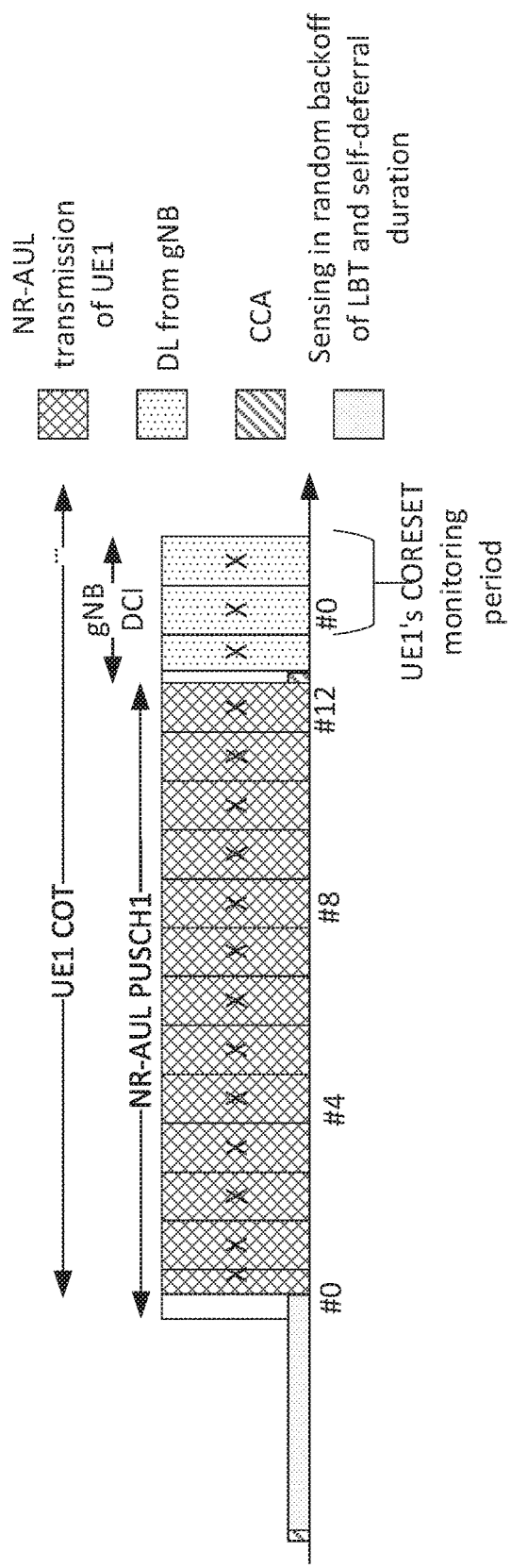
FIG. 27 is a timing diagram of an example where a UE shares COT such that gNB can transmit on a configured CORESET that is periodically monitored by the UE.

FIG. 27 illustrates an example where a UE shares COT such that gNB can transmit on a configured CORESET that is periodically monitored by the UE.

The UE may indicate the CORESET on shared COT in one of the following ways.

Figure 28:
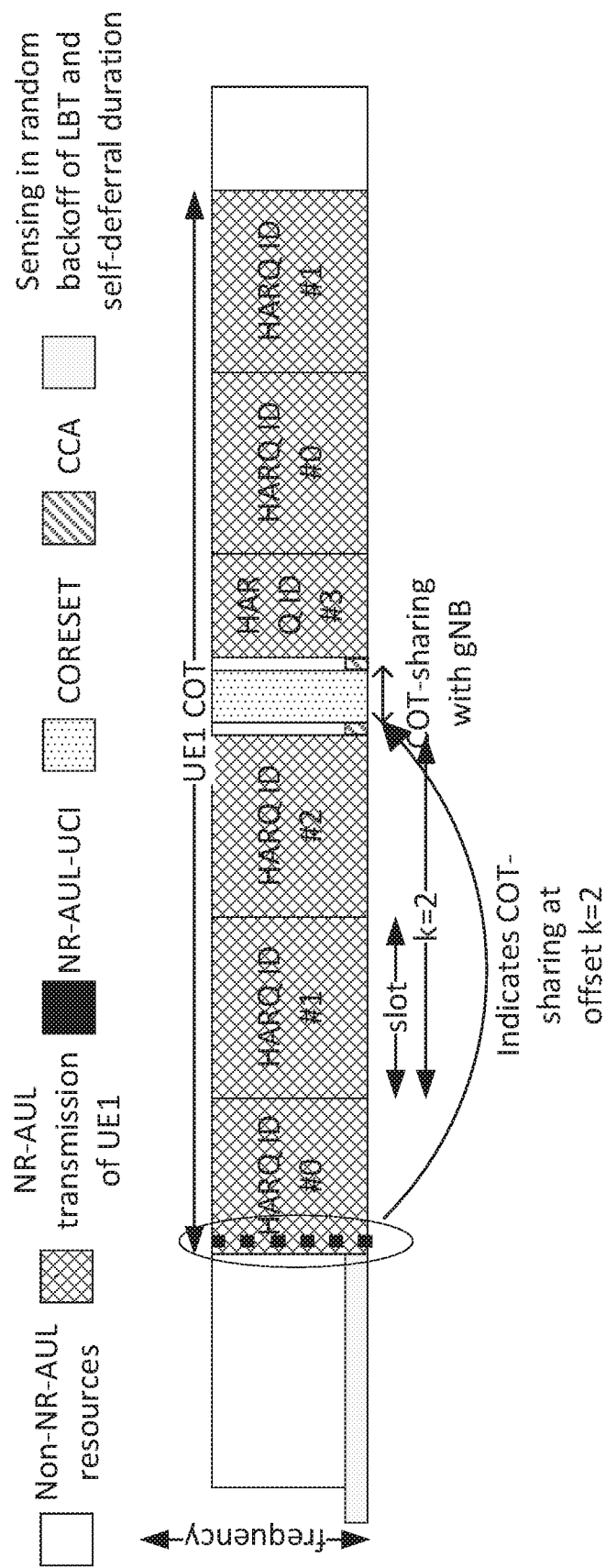
FIG. 28 is a timing diagram of an example where NR-AUL-UCI indicates the offset of shared COT resources from current PUSCH transmission.

- The UE may signal 1-bit on NR-AUL-UCI of a PUSCH transmission in slot #n to indicate the $(n+k)^{th}$ slot in which the CORESET occurs as shown in FIG. 28; k is RRC configured to the UE.

Figure 29:
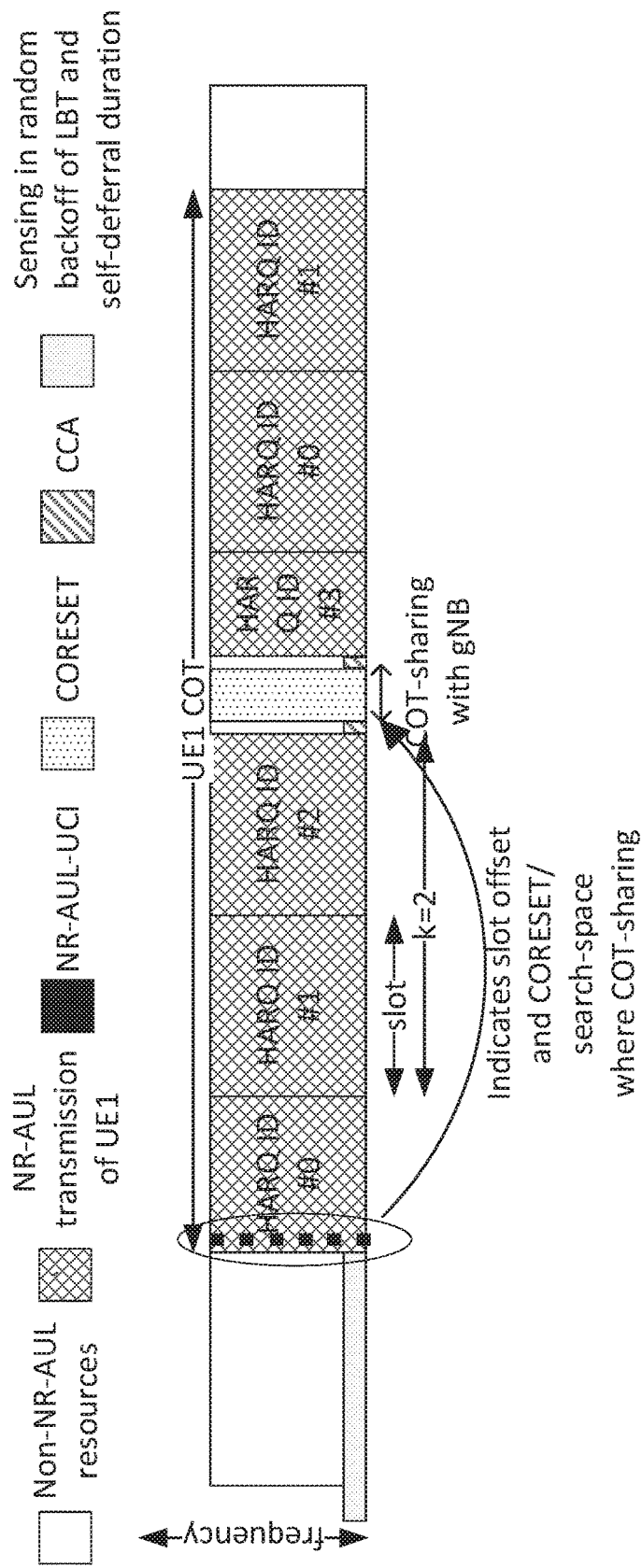
FIG. 29 is a timing diagram of an example indication of CORESET/Space-set ID in addition to slot offset, which identifies the OS for COT-sharing if the slot is configured for multiple CORESETs/search spaces.
Figure 30:
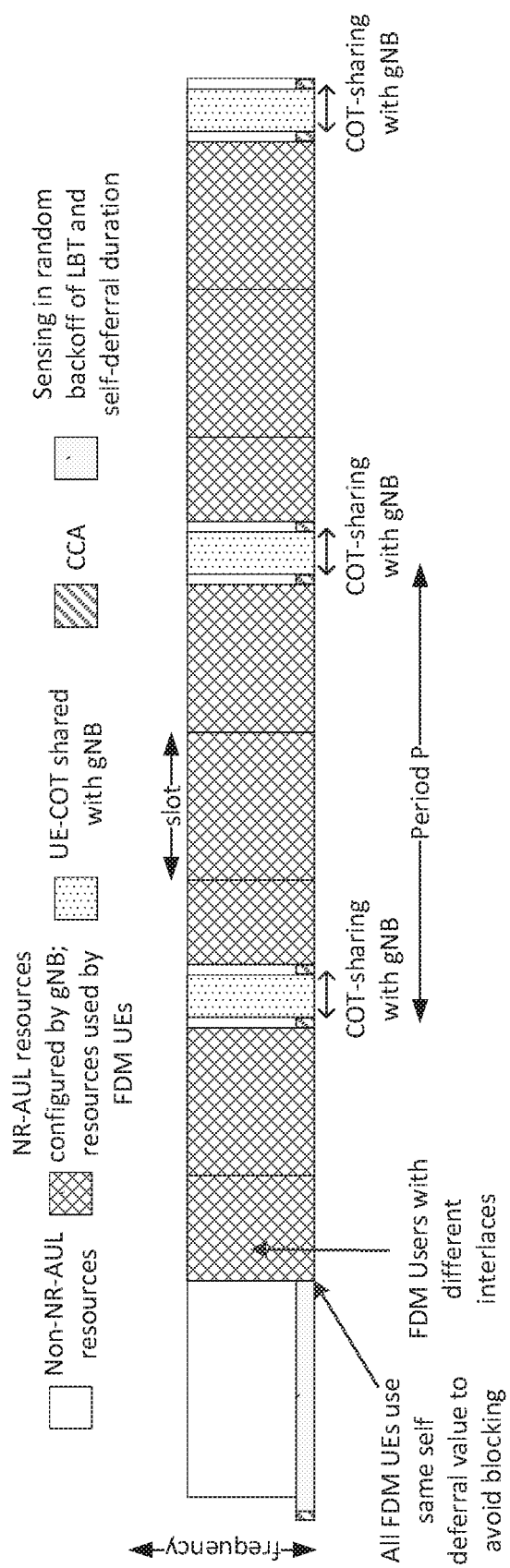
FIG. 30 is a timing diagram of an example of shared COT resources in case of FDM UEs occurs periodically so that all FDM UEs will share the COT with gNB at the same time.

If only one CORESET/search space is configured for monitoring on this slot, there is no ambiguity for the gNB to recognize it, e.g., its duration and its time location. But if multiple CORESETs can occur in the slot or multiple search space sets may occur with different offsets or periodicity within a slot, the gNB may not know where the COT sharing begins. To solve this problem, the UE may indicate one of the following.
- the length of the last PUSCH transmission prior to switching to DL through NR-AUL-UCI.
- An ID of the CORESET such as controlResourceSetId which is RRC configured for each CORESET configured to the UE. The ID indicates number of CORESET symbols, frequency domain resources, DMRS sequence, QCL with respect to an RS, etc. As a CORESET can be associated with multiple search space sets, the gNB may use the timing resource of the search space(s) that occurs first in the indicated slot.
- An ID of a search space such as searchSpaceId which is RRC configured to the UE. The indication comes through the NR-AUL-UCI. On receiving this, the gNB knows the timing resources, e.g. periodicity and slot offset for the PDCCH resources. Currently in NR, RRC also configures the association between the searchSpaceId and controlResourceSetId. Therefore, knowledge of searchSpaceId provides all the information to the gNB about the resources being referred to for sharing within the COT. The concept is shown in FIG. 29.

COT Sharing with gNB in FDM Scenario

For low latency applications and mMTC applications, FDM of users can provide low latency, and power savings. The gNB may provide different frequency interlaces to different UEs so that they can transmit on the same NR-AUL resource. To ensure that one UE does not block another UE, the gNB may configure all UEs to use a common self-deferral value when accessing a resource. The self-deferral value is configured to the UEs through RRC signaling or activation DCI.

COT sharing with gNB is desirable in FDM scenario as well but the problem is that accessing UEs may have different COTs, different COT expirations and cannot synchronously share the same resources with gNB.

We propose herein to support periodic COT sharing with gNB in the duration of NR-AUL resource. The period P and number of OS is configured by gNB to the UEs through RRC. The gNB may commonly configure the set of UEs with a CORESET and search space that they must monitor even during their own COT. So UEs terminate their NR-AUL PUSCH transmission 1 OS prior to the resource indicated by this CORESET and search space and allow the gNB to gain access through a 25 µs LBT as shown in FIG. 25.

When the gNB gets the shared COT, it may transmit a new LBT threshold to the FDM UEs to indicate that the channel is occupied by FDM UEs and other UEs (with FDMed interlaces) may also transmit on their resources. This would enable other NR-AUL UEs them to FDM onto the NR-AUL resources. In the absence of the threshold, the UEs would have been blocked by the UEs that acquired COT. The threshold may be transmitted through a GC-PDCCH.

Referring to FIG. 25, if FDM is used to multiplex UEs for RTS signaling, the gNB may receive RTS from multiple UEs and respond back to all of them during the shared COT.

Autonomous Frequency Resource Selection in NR-AUL

Prior solutions focused on enabling UE to autonomously select the time resource and HARQ parameters (such as ID and RV) for PUSCH transmission. While autonomous selection of time resource improves efficiency and flexibility, more resource efficiency and latency reduction can be obtained by also allowing autonomous selection of frequency resources. If multiple frequency resources are available to the UE, the likelihood of getting channel access increases.

As NR is designed to work with large spectrum, we propose herein that the NR-U UE be configured with multiple frequency resources and be allowed to autonomously transmit PUSCH on a frequency resource for which the UE's LBT is successful and channel access is obtained.

Figure 31:
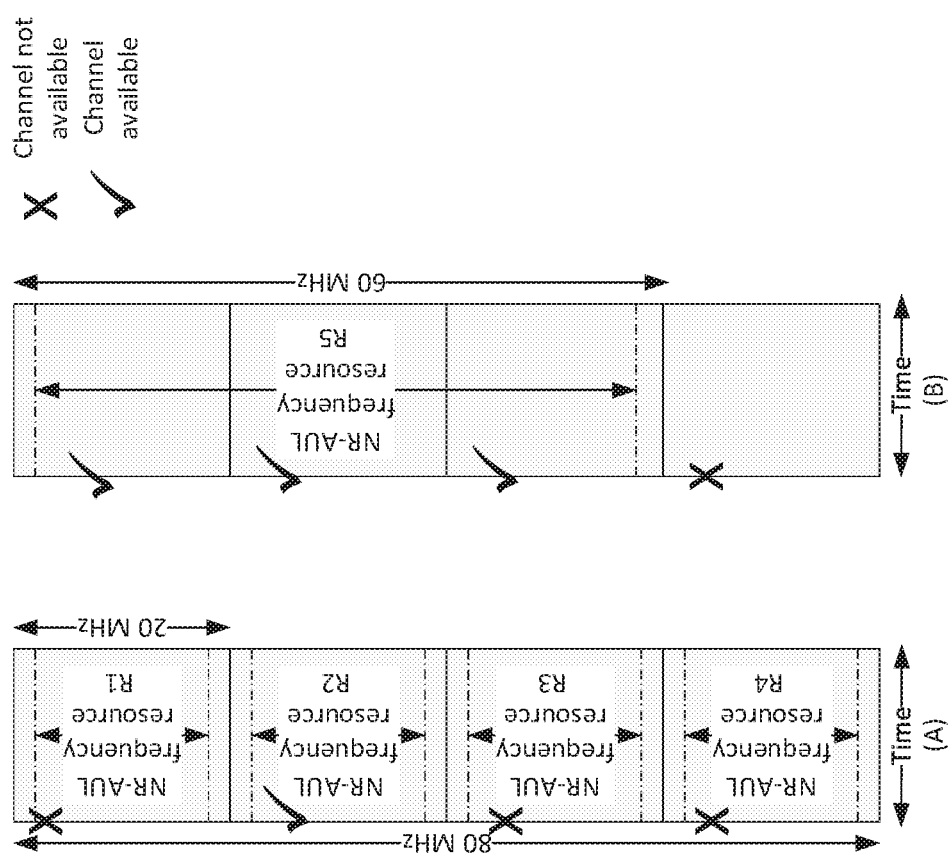
FIG. 31A is a timing diagram of an example selection of a frequency resource for NR-AUL 20 MHz sub-band selection.
FIG. 31B illustrates an example selection of a frequency resource for NR-AUL 60 MHz sub-band selection.

For example, as shown in FIG. 31A and FIG. 31B, in a wideband spectrum of 80 MHz, each 20 MHz sub-band may provide one frequency resource to the UE. The UE is configured with frequency resources R1, R2, R3, R4, and R5. The UE may autonomously select one of these for NR-AUL transmission.

The UE may select one 20 MHz sub-band for transmission for which its LBT succeeds. In FIG. 31A, the UE selects the NR-AUL frequency resource R2 for transmission as it obtains channel access to the corresponding sub-band.

Alternatively, the UE may select a frequency resource that may span multiple adjacent sub-bands if the LBT is successful for all of those sub-bands; this allows the UE to utilize larger amount of frequency resources thus reducing latency and improving capacity in the network. In FIG. 31B, the UE selects the NR-AUL frequency resource R5 for transmission as it obtains channel access to the three corresponding sub-bands.

NR-AUL Frequency Resource on Each BWP

For NR-U, we propose herein to configure the UE with an NR-AUL frequency resources on more than one BWP; the UE has a list of candidate BWPs for AUL transmission. The UE performs LBT across each candidate BWP and autonomously selects a BWP with successful LBT.

Note that in NR Rel-15, a UE can be configured with up to four BWPs but can have only one active BWP at a time for receiving and transmitting PDSCH and PUSCH. The gNB schedules BWP switching through PDCCH. Additionally, the UE runs a BWPInactivityTimer that counts the period of inactivity on a BWP; the UE switches to a default BWP on expiration of its BWPInactivtyTimer. There is no concept of autonomous selection of a BWP in NR Rel-15.

Figure 32:
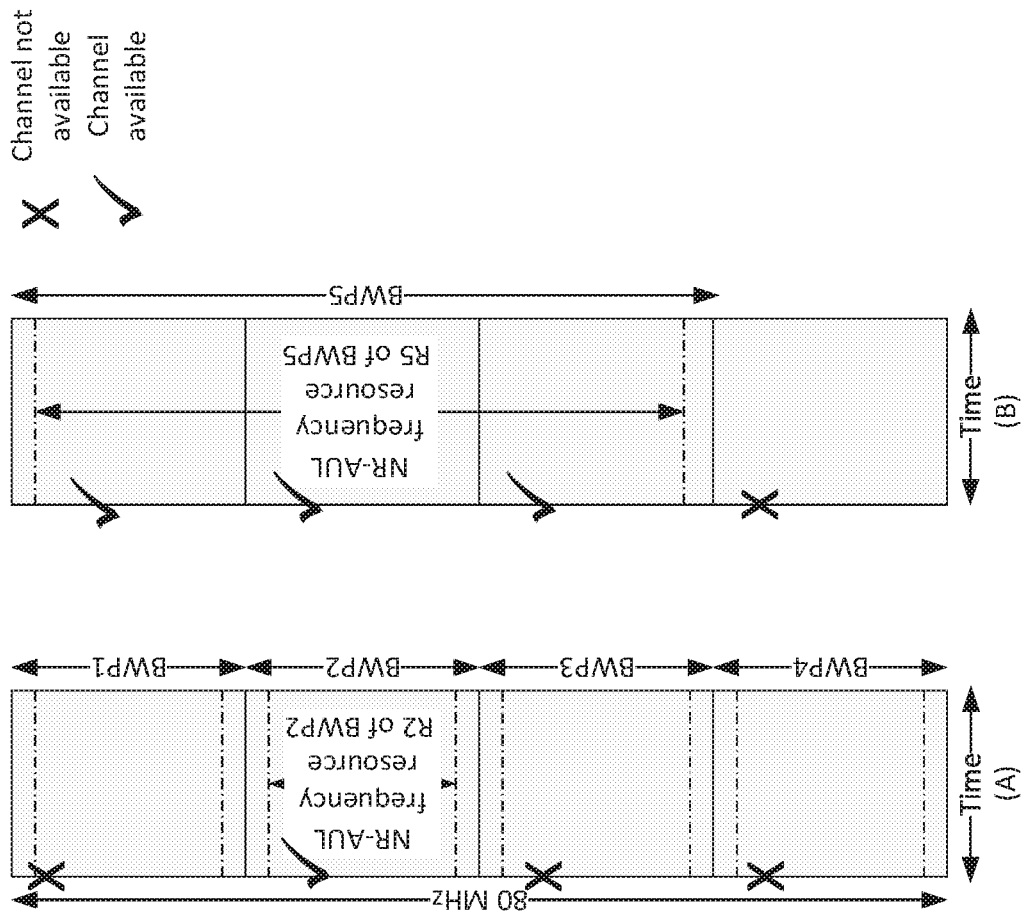
FIG. 32A is a timing diagram of an example selection of a BWP for NR-AUL.
FIG. 32B is a timing diagram of an example selection of a BWP for nested candidate BWPs.

FIG. 32A and FIG. 32B show examples of BWP based frequency resources. The UE is configured with BWP1, BWP2, BWP3, BWP4, and BWP5. Each of the BWPs has an NR-AUL resource. In FIG. 32A, the UE gets channel access to BWP2 and uses the NR-AUL resources in BWP2 for NR-AUL PUSCH transmission.

In FIG. 32B, the UE gets channel access to BWP5 (in which BWP1, BWP2, and BWP3 are nested) and uses the NR-AUL resources in BWP5 for NR-AUL PUSCH transmission.

Autonomous Selection in Type-1 NR-AUL Transmission

Figure 33:
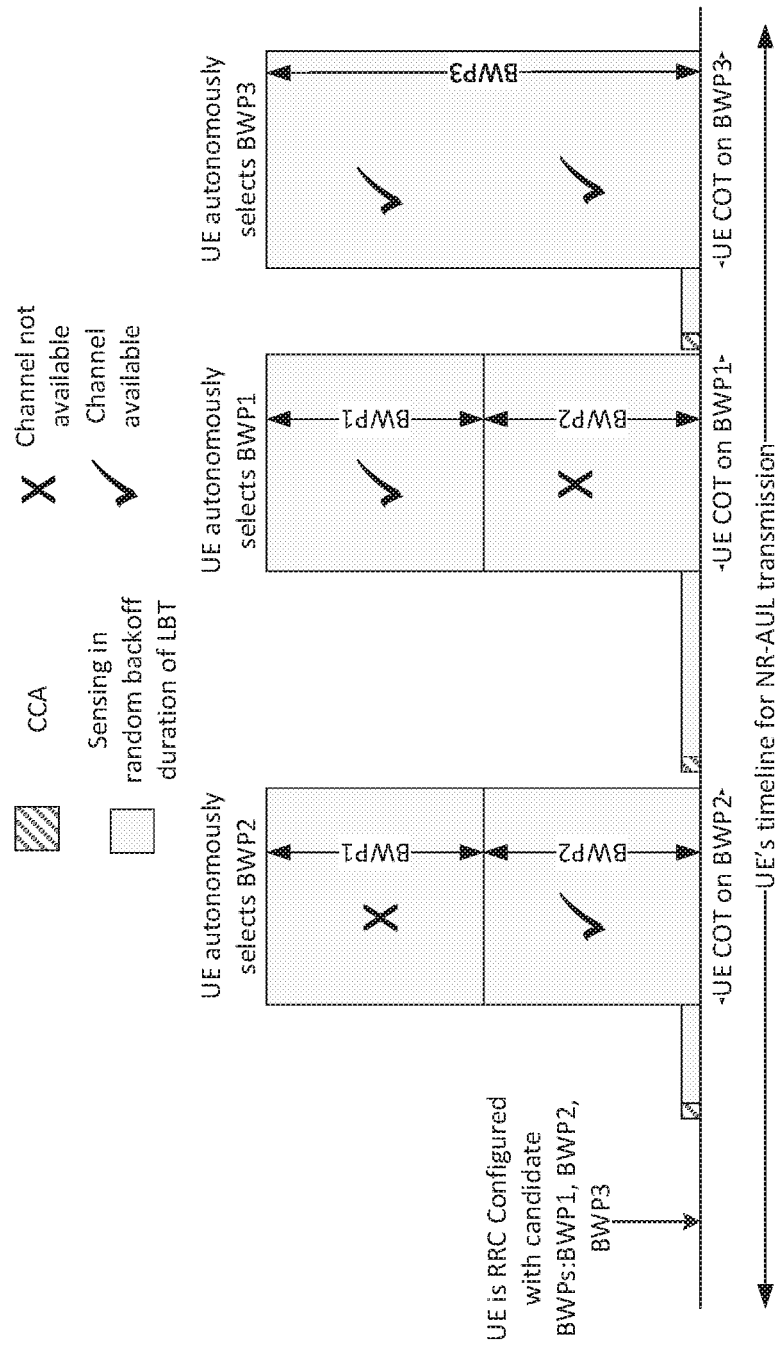
FIG. 33 is a timing diagram of an example autonomous selection of NR-AUL resource for Type-1 configuration.

If the NR-AUL resource in the BWP with channel access is of Type-1, as the UE is RRC configured with the AUL grant, it can begin NR-AUL PUSCH transmission on its resource after channel access. The gNB identifies that the UE has autonomously selected the resource upon receiving it DMRS or obtains UE's identity through the NR-AUL-UCI. FIG. 33 shows an example where Type-1 resource is configured in BWP1, BWP2 and BWP3 for the UE. The UE selects BWP2, BWP1, and BWP3 on different occasions based on channel availability after LBT.

In unpaired spectrum, as the UL and DL BWPs are the same, the gNB must switch the DL-BWP to the UE's autonomously chosen UL-BWP so that COT sharing may occur on that spectrum, e.g. DL-BWP=UL-BWP.

As an example, the procedure for BWP access and switching is given below for unpaired spectrum.
1. UE gains channel access to BWP1.
2. UE transmits NR-AUL PUSCH. UE sets the timer BWPInactivityTimer when it transmits an NR-AUL PUSCH on BWP1 in that COT.
3. gNB detects UE's DMRS or UE ID on NR-AUL-UCI and switches to BWP1 on DL for the UE.
4. gNB transmits NR-AUL-DFI to the UE on BWP1; this may occur during COT sharing on BWP.
5. gNB may schedule DL and UL transmissions for the UE on BWP1.
6. After the UE's COT expires, if the UE has NR-AUL data to transmit, it may seek channel access to one of BWPs in the list of candidate BWPs. Say, UE get channel access to BWP2. Otherwise, the UE may attempt channel access on BWP1 again.
7. UE and gNB repeat steps 2-6 for BWP2.

Figure 34:
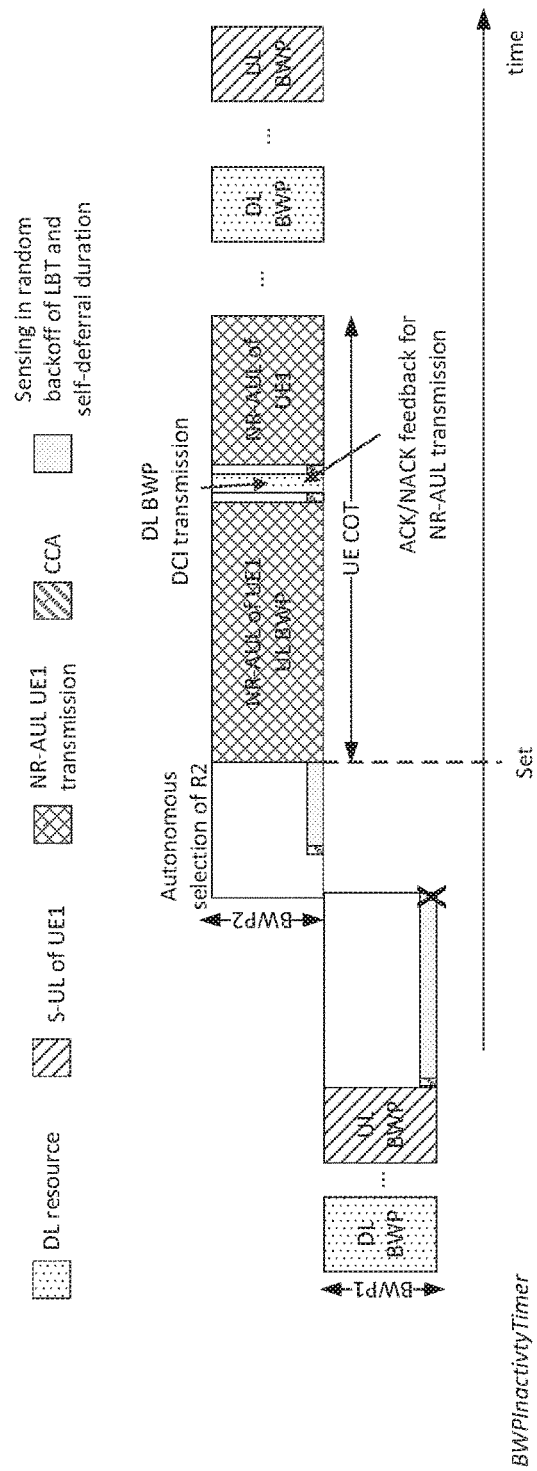
FIG. 34 is a timing diagram of an example autonomous BWP switching procedure, where the UL and DL BWP are switched to B2.

The timeline of events for this procedure is shown in FIG. 34. The UE is initially operating in BWP1. It does not get channel access to NR-AUL resource in BWP1. It autonomously gets channel access to BWP2 and transmits NR-AUL PUSCH and sets the BWPInactivityTimer on getting the NR-AUL grant. The gNB identifies the UE and switches the DL BWP; it transmits NR-AUL-DFI in the UE's COT-shared resource on BWP2.

Figure 35:
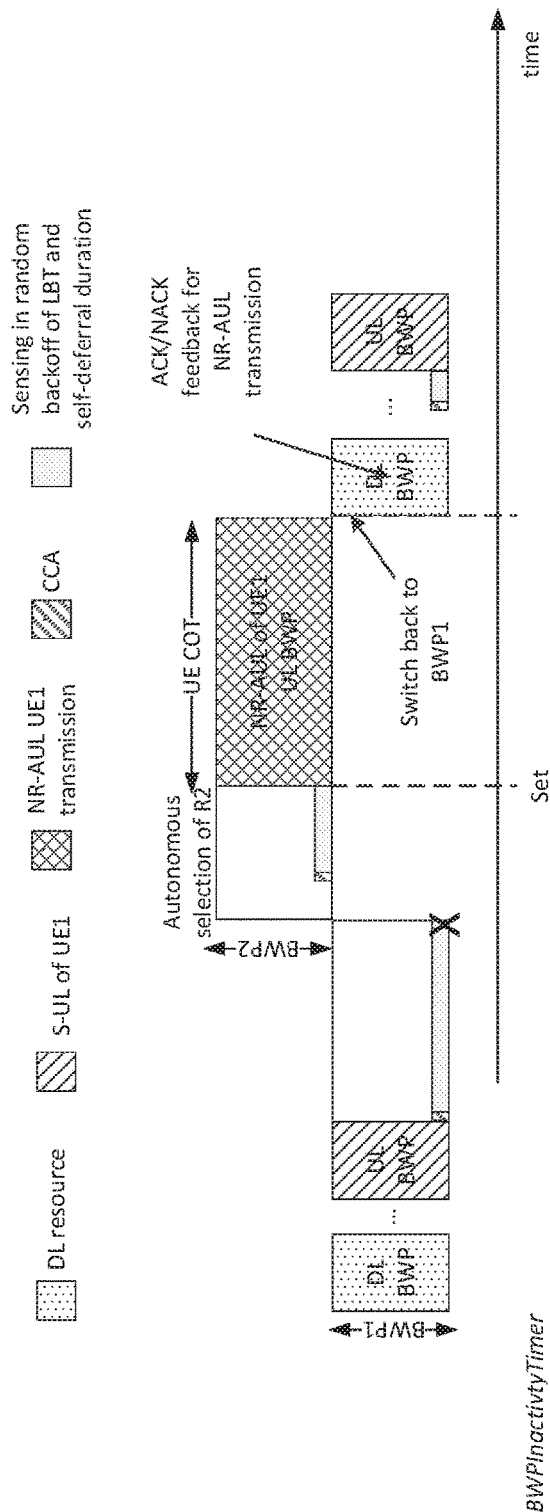
FIG. 35 is a timing diagram of an example autonomous BWP switching procedure, where the UE returns to BWP1 after completing NR-AUL transmission on BWP2.

Another example for the procedure for BWP access and switching is given below for unpaired spectrum. Here the UE does not perform COT sharing with the gNB. It only transmits NR-AUL and releases the channel. In this case, the gNB may not switch the DL-BWP to BWP2. And the UE returns to BWP1 after completing the NR-AUL transmission. It receives ACK/NACK feedback on BWP1 for the NR-AUL transmission.
1. UE's UL and DL active BWP is BWP1.
2. UE needs to transmit NR-AUL PUSCH. But channel access to BWP1 is not available.
3. UE attempts autonomous BWP selection and obtains channel access to BWP2.
4. UE switches to BWP and transmits NR-AUL PUSCH in its COT.
5. UE switches back to BWP1 after the NR-AUL transmission on BWP2 and monitors UL and DL on BWP1
6. the gNB sends ACK/NACK feedback to UE on BWP1 for the NR-AUL transmission that occurred on BWP2.
7. The timeline of events for this procedure is shown in FIG. 35.

In paired spectrum, the DL-BWP does not change when the UE switches autonomously to a different UL-BWP. But if DL and UL BWPs are configured in pairs, e.g. if UL BWP switches, the DL BWP switches, then the operation is similar to that in unpaired spectrum.

Autonomous Selection in Type-2 NR-AUL Transmission

If the NR-AUL resource is of Type-2, the UE can transmit only if the resource is activated to it through the activation DCI. If a UE can operate only a single active BWP at a time, the gNB does not know that the UE has autonomously a particular BWP. Therefore, the gNB cannot activate the resource to the UE. Besides, the activation DCI must be acknowledged by the UE through the MAC CE. This introduces significant latency and may not be completed within a device's COT. Besides, if this process has to occur each time the UE autonomously selects a BWP, the signaling overhead can be high.

This problem may be solved by allowing the UE to be activated on multiple BWPs. The UE maintains the MAC configurations for the candidate BWPs for which it has received the activation DCI. UE then autonomously selects one of the activated BWPs where its LBT is successful and performs NR-AUL transmission. The procedure for BWP access and switching is similar to that of type-1 for unpaired spectrum.

The UE may receive multiple Format 1_1 DCIs for activating the resource on multiple BWPs. Alternatively, one activation DCI transmitted by gNB to the UE on BWP, may activate the NR-AUL resources on multiple BWPs.

Figure 36:
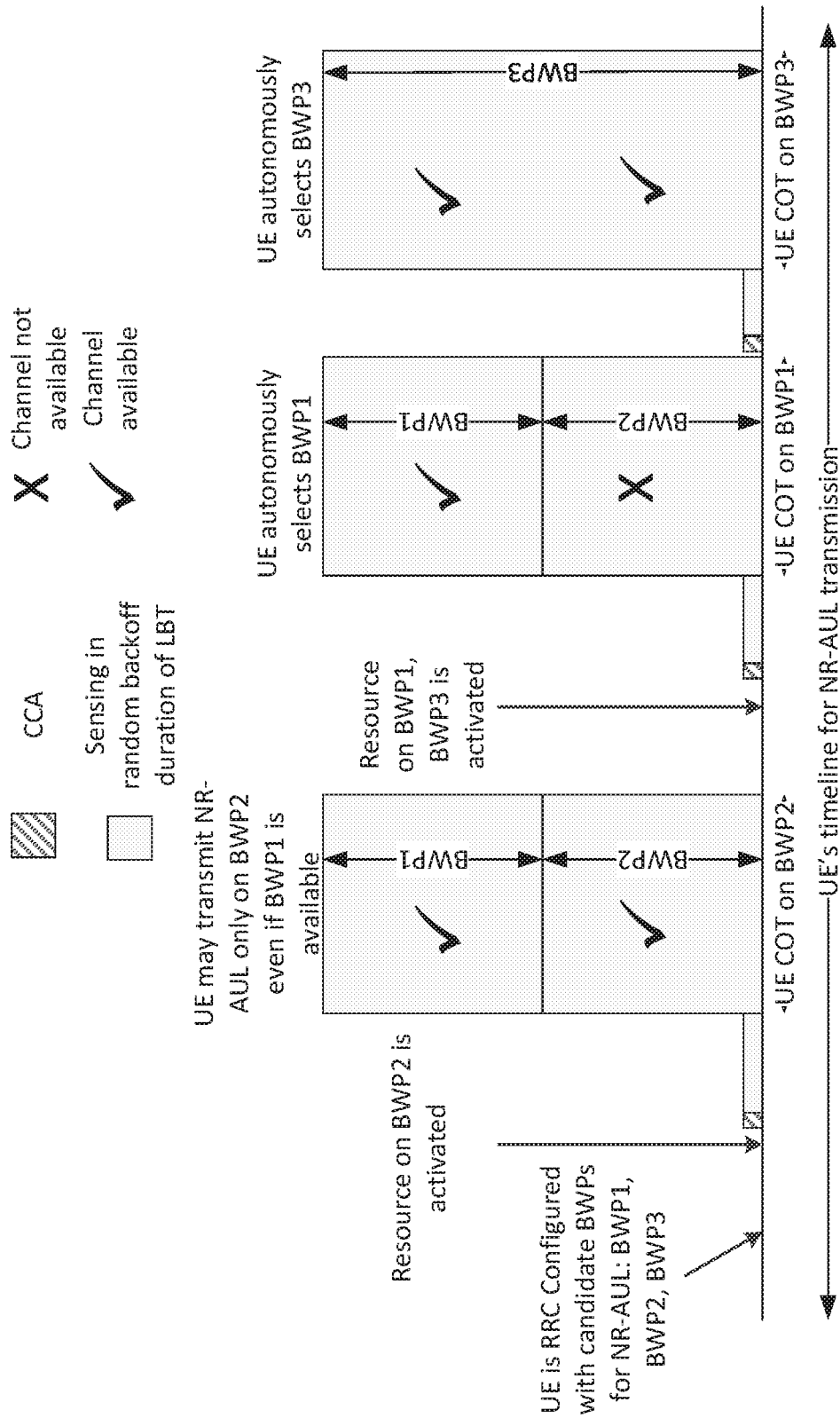
FIG. 36 is a timing diagram of an example of autonomous selection of an activated NR-AUL resource for a Type-2 configuration.

FIG. 36 shows an example where Type-2 resource is configured in BWP1, BWP2, and BWP3 for the UE. The NR-AUL resource for BWP2 is activated initially while resources on BWP1 and BWP3 are not activated; in this case the UE may transmit only on the BWP2's resources upon getting channel access. Subsequently resources on BWP1 and BWP2 are activated; the UE performs LBT across the candidate BWPs with activated resources and selects the one with channel access for NR-AUL transmission.

Multiple NR-AUL Frequency Resources within a BWP

Figure 37:
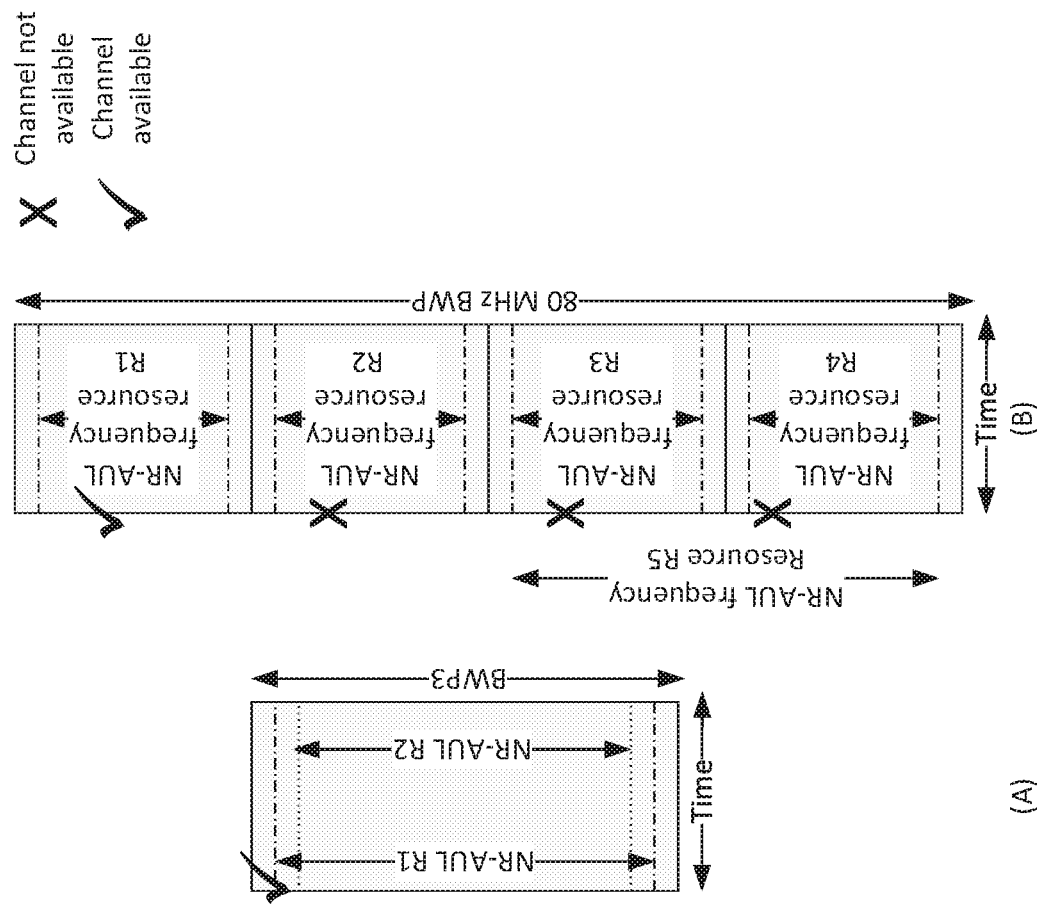
FIG. 37A is a timing diagram of an example configuration of multiple NR-AUL resources with a BWP with overlapping resources.
FIG. 37B is a timing diagram of an example configuration of multiple NR-AUL resources with a BWP with resources in different sub-bands of the BWP.
Figure 38:
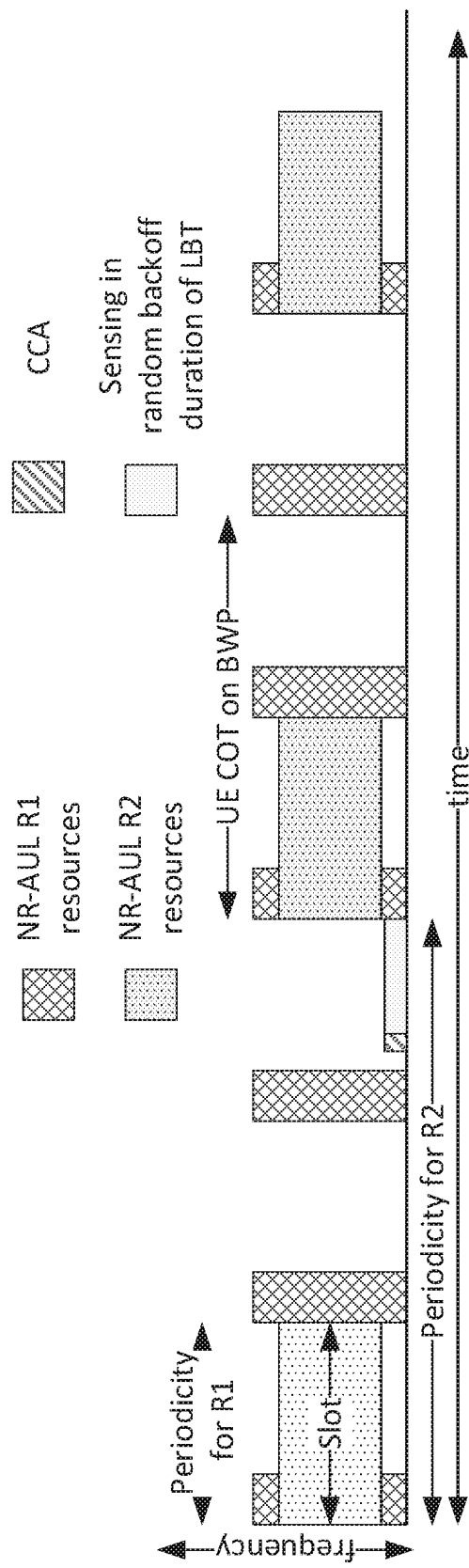
FIG. 38 is a timing diagram of an example of multiple (R1 and R2) NR-AUL resources within a BWP with overlapping frequency resources.

In some scenarios, a single BWP may be configured with multiple frequency resources as shown in FIG. 37A where NR-AUL configuration frequency resources R1 and R2 are seen. Here, when the UE gets access to the BWP, it may use all the associated NR-AUL grants (configured for type-1 or activated for type-2) within its COT. This is shown in FIG. 38 where the UE is configured with NR-AUL resources R1 and R2 each with different periods and PUSCH resource durations. When the UE obtains channel access, it transmits on both R1 and R2 resources within it COT.

In FIG. 37B, a BWP may have wide bandwidth and LBT may be performed across sub-bands within the BWP. One or more sub-bands in the BWP may contain NR-AUL resources. In this example, the UE is configured with resources R1 through R5, where R5 consists of multiple sub-bands with resources of R3 and R4 nested within. The UE can use the NR-AUL grant in the sub-band for which it has successful LBT. If multiple NR-AUL Type-2 grants are activated, the UE can autonomously select between them while operating on a single active BWP, e.g., without requiring to operate on multiple active BWPs at the same time.

The following examples illustrate situations where the configuration in FIG. 37A may apply.

An NR-AUL frequency resource may be associated with a minimum acceptable logical channel priority; the NR-AUL grant may be used only if the priority of the content of PUSCH exceeds the minimum acceptable priority. Different NR-AUL resources may be configured for different priority thresholds. For high priority cases, the periodicity or density of AUL resources in time may be larger.

One NR-AUL resource may provide all the interlaces to the UE allowing it to TDM in the AUL resources while the other frequency resources may provide only a few interlaces to the UE making it operate in FDM with other UEs; each resource may apply to different use cases—the TDM case with all interlaces may support eMBB packets while FDM case with one interlace may be appropriate for mMTC packets.

The number of symbols for PUSCH transmission may be different for each frequency resource; a frequency resource with more frequent AUL resources with fewer PUSCH symbols may be better suited for mMTC or URLLC compared to a frequency resource with PUSCH transmissions of less frequent but large number of symbols.

Criteria for Frequency Resource Selection

The UE may be able to transmit NR-AUL only on one sub-band but if its LBT is successful on multiple sub-bands, it may have multiple frequency resources to choose from. It may select the following resource based on one or more of the following criteria.

Frequency resource where the UE perceives the highest throughput—this may be because of the available bandwidth or channel conditions permitting favorable MCS or both factors Frequency resource which provides transmission opportunity with minimum latency Frequency resource with largest number of AUL time resources.

Frequency resource with minimum contention window size

Random frequency resource to support co-existence and fairness.

The gNB may configure the UE with the criteria for selection of frequency resource. For example, the gNB may configure the IDs of the frequency resources in decreasing order of priority. If the UE has simultaneous access to multiple sub-bands or BWPs, it may select the resource with the lowest index in the priority list.

The criteria may be based on the use case, for example, URLLC UEs may prefer criteria that improve reliability and reduce latency whereas eMBB UEs may choose criteria for enhancing throughput. mMTC UEs may use criteria that minimize the need to switch BWPs to conserve power.

Frequency Resource Switching

When a UE's COT on R1 expires, it may not immediately switch to another sub-band or BWP to resume NR-AUL transmission; it may be scheduled for DL or UL on R1. It may also receive ACK/NACK from the gNB to prior NR-AUL transmissions on R1.

So, we propose herein that the UE maintains a timer aulResourceSwitchTimer which is set under the following conditions:

the UE receives a DL grant on R1
the UE receives an UL grant on R1
the UE transmits S-UL PUSCH on R1
the UE receives NR-AUL-DFI on R1 indicating ACK/NACK for prior NR-AUL or S-UL transmission The timer keeps decrementing and the UE stays on R1 until the following occurs.

aulResourceSwitchTimer expires. UE starts autonomous selection of BWP even if it has remaining COT on R1.
aulResourceSwitchTimer expires. UE starts autonomous selection of BWP after it completes its remaining COT on R1.

Upon expiration, the UE performs LBT to identify a new NR-AUL resource. It may switch to R2 if it gets channel access.

Figure 39:
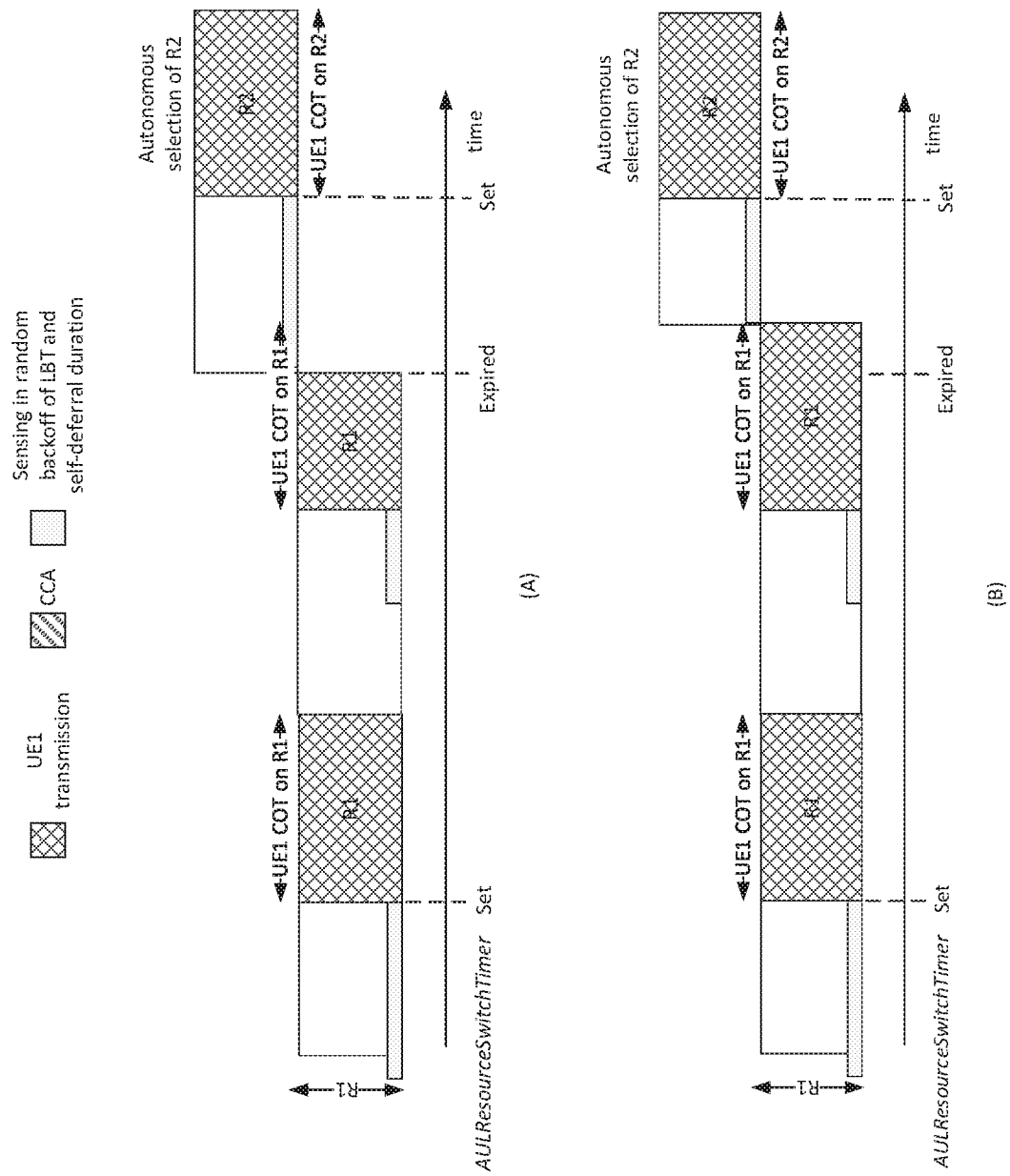
FIG. 39A is a timing diagram of an example of autonomous selection of a new frequency resource when aulResourceSwitchTimer expires where LBT for new resource begins after aulResourceSwitchTimer expires.
FIG. 39B is a timing diagram of an example of autonomous selection of a new frequency resource when aulResourceSwitchTimer expires where LBT for new resource begins after UE1's COT on R1 expires.

FIG. 39A illustrates an example of autonomous selection of new frequency resources when aulResourceSwitchTimer expires for LBT for new resource begins after aulResourceSwitchTimer expires. FIG. 39A illustrates an example for LBT for new resource begins after UE1's COT on R1 expires.

Frequency Resource Identification at the gNB

If frequency resources for autonomous selection overlap, the gNB may not be able to identify the frequency resource on which the UE is transmitting autonomously. This can happen if UE is configured with nested BWPs or multiple resources within a BWP, the frequency resources may collide. Currently for CG in NR, the DMRS of the PUSCH is used to identify the UE; the DMRS is UE-specifically RRC configured but is common across BWPs—such a design causes ambiguity in identifying the autonomously selected frequency resources of the UE.

So, a mechanism is required at the gNB to identify the autonomously selected frequency resource. We propose the following methods to enable frequency resource identification.

Parameter Based Frequency Resource Identification

If each BWP contains only one AUL frequency resource, the frequency resource may be identified by the BWP's ID BWP-Id. If a BWP contains multiple AUL frequency resources, each frequency resource needs to be identified by a frequency resource ID aul-frequency-resource-id within that BWP. So we propose herein that for NR-AUL Type-1, the RRC configuration for the frequency resource should include aul-frequency-resource-id when multiple frequency resources are supported.

This parameter may be transmitted on a PDCCH from the gNB to activate the specific AUL frequency resource in NR-AULType-2.

We propose herein to enable the UE to transmit this ID through NR-AUL-UCI so that the gNB can identify the frequency resource autonomously selected by the UE. The gNB begins by trying to decode the possible hypotheses, e.g., NR-AUL-UCI for possible frequency resources, when it detects the DMRS. It can decode only one hypothesis successfully; it identifies the frequency resource from the ID in the NR-AUL-UCI.

We also propose herein that the UE may scramble the NR-AUL-UCI with RNTI that is frequency resource specific. The RNTI may be RRC configured to the UE in a frequency resource specific manner or may be implicitly derived by the UE from the aul-frequency-resource-id or BWP-Id. Such a frequency resource specific scrambling randomizes co-channel interference on the AUL resources.

DMRS Enhancements

The DMRS sequence for CG in NR may be enhanced for NR-AUL by introducing frequency resource-specific configurations. For example, the initialization may be a function of the aul-frequency-resource-id. This ensures that detection of the DMRS also enables detection of the autonomous frequency resource and overcomes the problem of ambiguity when the frequency resources are nested or partially overlapped.

Switching Between Multiple NR-AUL Resources Retransmissions on Different Frequency Resources Similar to AUL feLAA, when an NR-AUL HARQ process is received with error at the gNB, the NR UE may receive a scheduled grant for retransmission of that HARQ process, in which case, it retransmits on the scheduled resource. Alternatively, the UE may receive a NACK as HARQ feedback for the AUL transmission via AUL-DFI in which case, the UE may autonomously retransmit.

Similar to the aul-retransmission Timer in AUL feLAA, an nr-aul-retransmission Timer may be configured for each HARQ process that is transmitted on an NR-AUL resource. The nr-aul-retransmission Timer is set upon initial transmission of a HARQ process and decremented thereafter. If the UE does not receive ACK/NACK feedback from the gNB for this HARQ process, it may attempt retransmission of the HARQ process on an AUL resource if the nr-aul-retransmission Timer has expired.

We propose herein that the UE may autonomously select the frequency resource for retransmission perform a transmission. It may initially transmit on one type of NR-AUL resource (Type-1 or Type-2) but send a retransmission on the same or different type of NR-AUL-resource after the expiry of nr-aul-retransmissionTimer. The UE may select the new resource autonomously or the gNB may switch the UE to a different resource through activation/deactivation or switching BWP.

Figure 40:
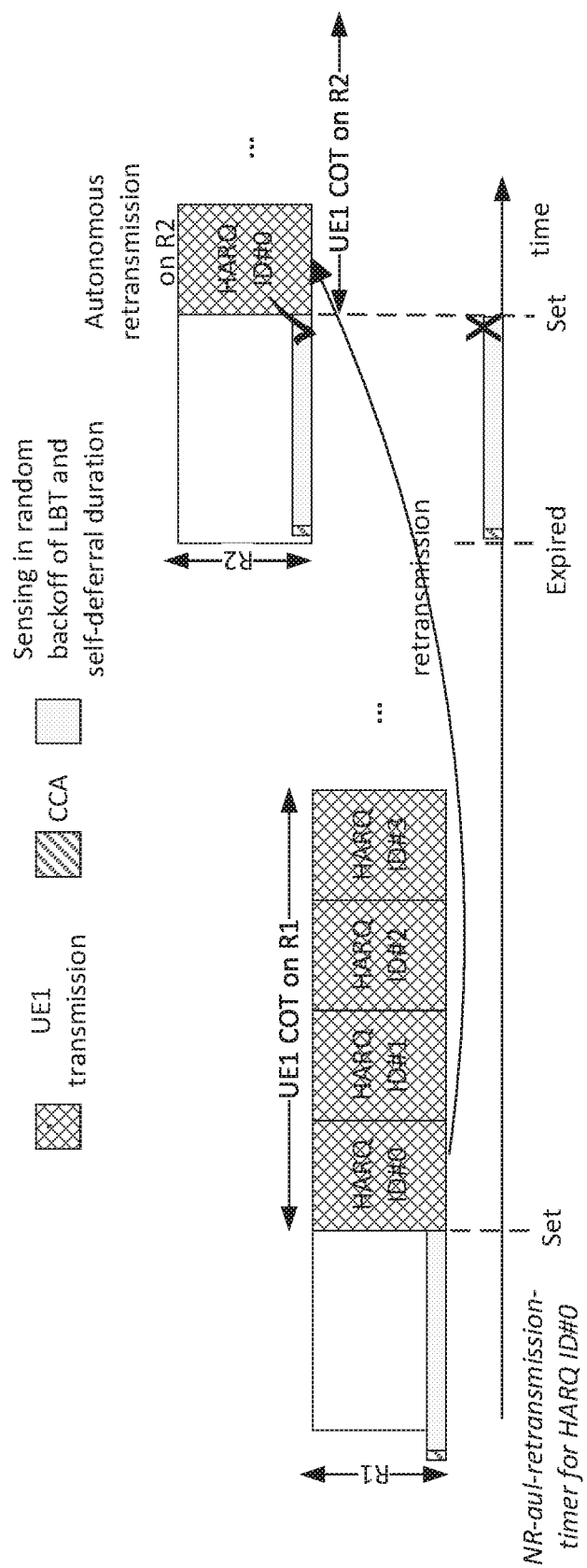
FIG. 40 is a timing diagram of an example retransmission on an autonomously selected resource.

FIG. 40 shows an example for retransmission upon expiry of nr-aul-retransmission Timer for HARQ ID #0. The UE makes the first transmission on R1 but does not get channel access on R1 for retransmission. However, it gets channel access on R2 and send the retransmission on that frequency resource.

Retransmission of S-UL HARQ Processes

Figure 41A:
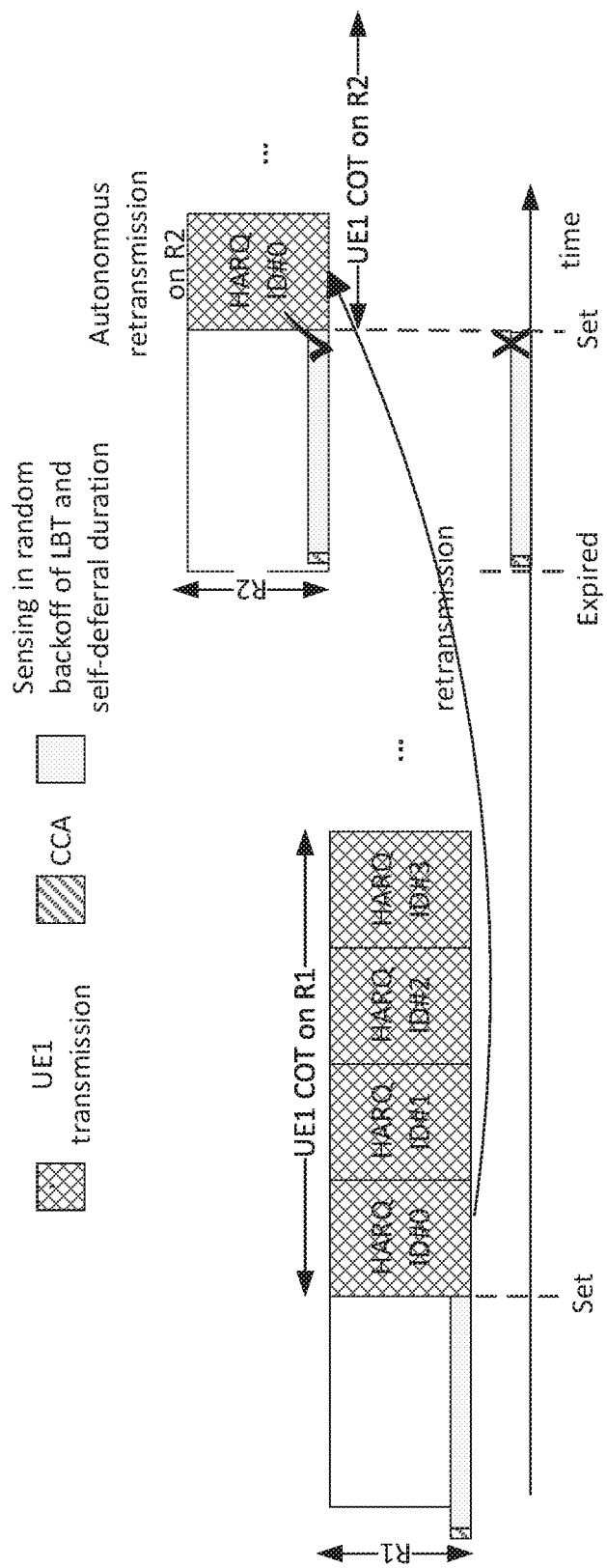
FIG. 41A illustrates an example S-UL retransmission in an NR-AUL resource.

It is possible that the resources R1 and R2 may have different configurations for the HARQ IDs that can be supported in NR-AUL. For example, R1 may support HARQ ID #0,1 for NR-AUL whereas R2 may support HARQ IDs #0,1,2,3. In this case, if a UE performed an S-UL transmission for HARQ ID #2 on R1 and subsequently gets access to R2, we propose herein that the UE may retransmit HARQ ID #2 on NR-AUL resource on R2. This is because, the gNB has to identify the new resource autonomously selected by the UE before it transmits the ACK/NACK for HARQ ID #2 or reschedules the HARQ ID #2 as an S-UL grant. Instead, we allow retransmission on NR-AUL resource of R2, so latency in identifying the new resource or BWP can be reduced. The concept is shown in FIG. 41A.

Figure 41B:
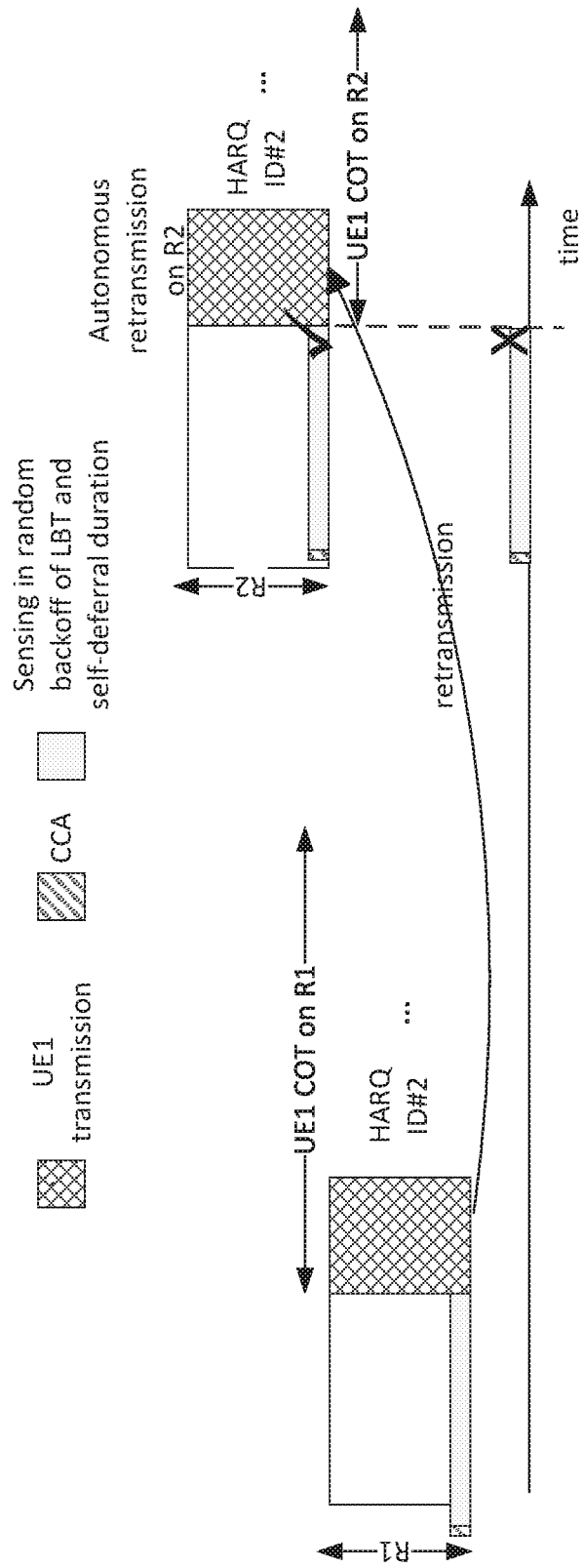
FIG. 41B shows an example of S-UL retransmission in NR-AUL resource.

FIG. 41B shows an example of the retransmission of the HARQ ID #2 due to a switch in BWP.

Enhancements to Configured Grants

For synchronous HARQ transmission in configured grants such as that in Rel. 15, the gNB identifies the UE from the DMRS and the HARQ ID and RV from the timing of the PUSCH transmission. In Rel. 15, the CG resources were assigned at periodicity P and repetition factor K for a HARQ process. Below, we consider enhancements to configured grant to enable low latency transmission and efficient UE multiplexing for good capacity in the cell. The solution may apply to synchronous or asynchronous HARQ transmissions.

Low Latency Transmissions and Repetitions

Features such as back-to-back transmission of mini-slot based PUSCH and multiple repetitions in a slot which were not supported in Rel.15 are desired for eURLLC, eV2X and NR-U.

We propose herein some configurations for CG to enhance mini-slot based transmissions. We use the terminology $RP_i$ to denote a repetition of a HARQ process within a bundle. The repetitions may be of the same RV or of different RVs. The RVs for the repetitions may be configured to the UE through RRC. For example, for a repetition K=4, i=0,1,2,3 and following configurations of RV may be used: RP={0,2,3,1}; RP={0,3,0,3}; RP={0,0,0,0}.

FIGS. 42A-D shows various back-to-back PUSCH transmissions in mini-slot: (A) 2OS mini-slots; (B) 4OS mini-slots; (C) & (D) Mixes of 7OS and 4OS mini-slots. In FIGS. 42A-D, 'ID' refers to the HARQ ID of the transmission.

The gNB configures Type-1 or Type-2 grants for the UE with one or more of the following features:

Mini-slots may be repeated back to back in a slot. The concept is shown in FIG. 42. Mini-slot transmissions offer low latency as the gNB may be able to decode the transmission from the first repetition RP0 in some cases.

Figure 42A:
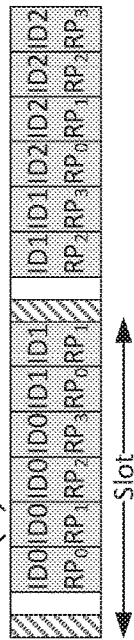
FIGS. 42A-D shows an example of back-to-back PUSCH transmissions in mini-slot.
Figure 42B:
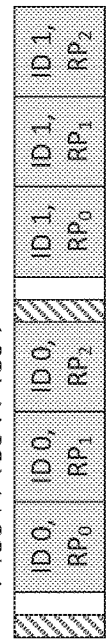

Multiple HARQ processes may be repeated within a slot. FIG. 42A shows an example where HARQ IDs 0 and 1 are repeated in the slot. FIG. 42B shows another example with a 1OS CORESET followed by CG for three 4OS mini-slots within the slot.

Repetitions of a HARQ process may be carried over to the next slot. FIG. 42A shows an example where repetitions of HARQ ID 1 are over two slots.

Figure 42C:
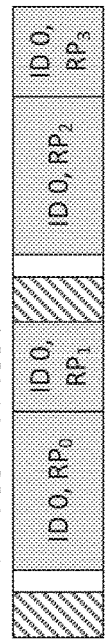
Figure 42D:
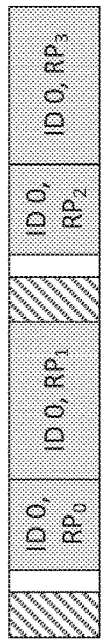

The HARQ process repetitions may have different OS allocations. FIG. 42C and FIG. 42D show examples where a HARQ process is transmitted on 4OS and 7OS mini-slots. These configurations allow for the 1st PUSCH to be decoded with low latency (compared to a transmission occupying the slot). Only if the 1st transmission fails to decode, the repetitions must be chase combined. Also, the variable allocations allow the transmissions to be contained within a slot, which is preferred over transmissions extending over to other slots as that can increase latency, especially if the next slot has a CORESET/DL symbols in the leading part of the slot. Here, that the HARQ process transmitted with different OS will use the same MCS but will be rate matched appropriately depending on the number of available OS for the transmission.

N HARQ processes may be transmitted before the repetitions begin, e.g. the HARQ IDs are interlaced in time prior to repetition. This provides some time for the gNB to decode a HARQ process and provide a feedback to the UE prior to the repetitions. If the UE receives an Ack for a HARQ ID, the UE need not transmit the next repetition, thereby saving resources and power.

Figure 43:
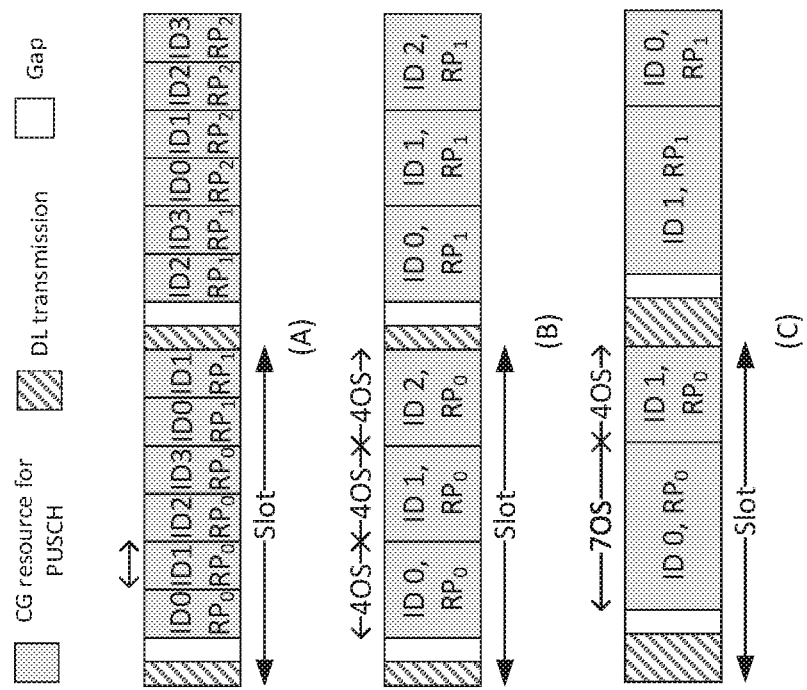
FIGS. 43A-C show examples of interlaced HARQ process IDs, where repetition is not-back-to-back.

FIG. 43A and FIG. 43B show examples where the mini-slots are interlaced for several HARQ IDs and the repetitions follow the interlace.

The mini-slots in a grant may have different durations depending on the slot format. For example, as shown in FIG. 43C, HARQ ID 0 is transmitted in a 7OS mini-slot whereas HARQ ID 1 is transmitted in a 4OS mini-slot in the first slot. But in the next slot, the order is reversed; HARQ ID 1 is transmitted first in a 7OS mini-slot and HARQ ID 0 is transmitted in the following 4OS mini-slot. This ensures that equal resources are available for both the HARQ processes.

Figure 44:
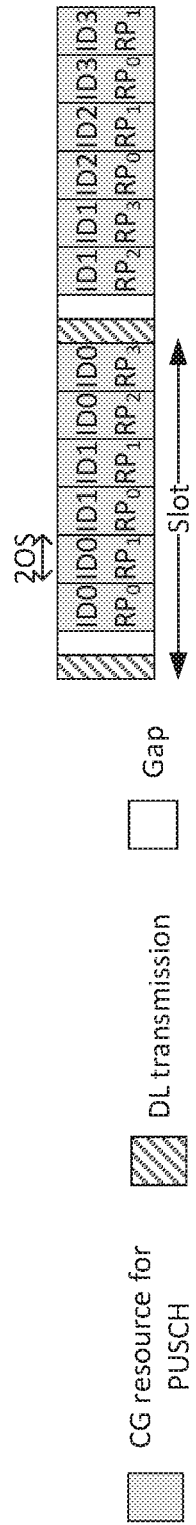
FIG. 44 shows and example where HARQ repetitions are split into groups, with HARQ IDs interlaced between groups of repetitions.

HARQ process repetitions may occur in groups; R of K repetitions of HARQ ID H may occur consecutively following which other HARQ processes are transmitted. Then R of the remaining repetitions may occur for HARQ ID H. The concept is shown in FIG. 44 where the HARQ ID 0 is repeated twice followed by HARQ ID1. Two more repetitions of HARQ ID 0 occur after these HARQ ID 1 (RV0 and RV1) transmissions. This configuration allows gNB some time to respond with implicit or explicit acknowledgement to the UE. The UE may terminate the repetitions of that HARQ process if the transmission is acknowledged from the earlier group of repetitions and those resources may be used for other transmissions.

Figure 45:
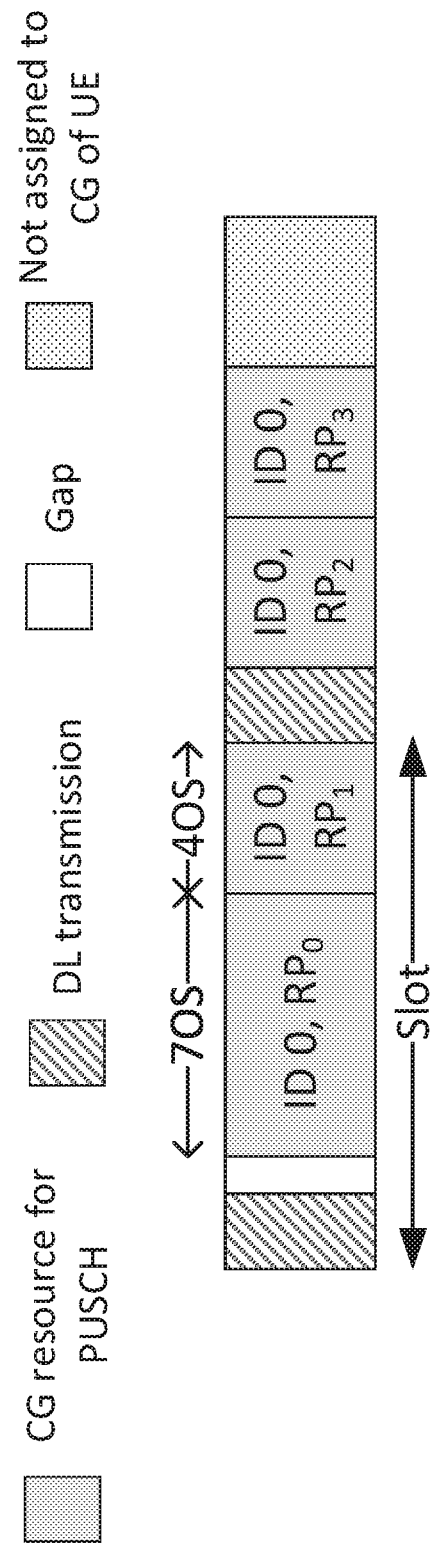
FIG. 45 shows and example where HARQ repetitions have smaller allocation than the first transmission.

The allocation of resources for repetitions may be smaller than that for the first transmission. This allows for minimal extra resources especially if the packet can be successfully decoded in most cases with the $1^{st}$ transmission. The first transmission may be decoded with over 90% success in most cases. FIG. 45 shows an example where the first transmission is 7 OS long and repetitions are 4 OS long.

Figure 46:
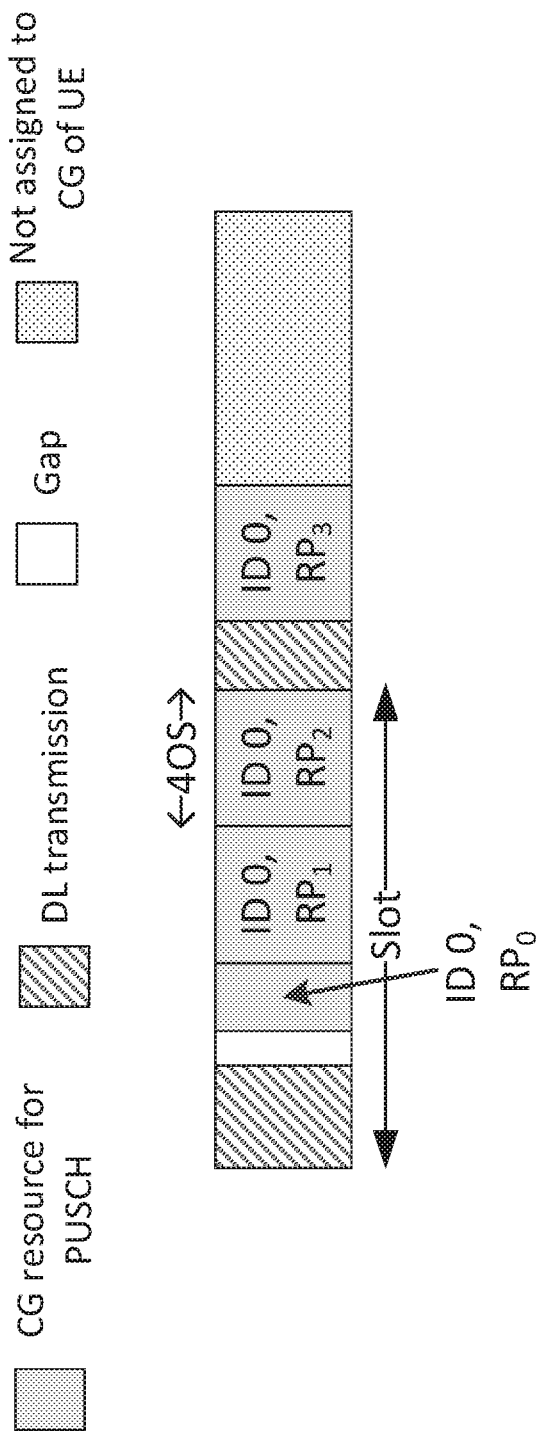
FIG. 46 shows an example where HARQ repetitions have larger allocations than the first transmission.

Alternatively, if SINR conditions are such that the first transmission may fail (such as in cell edge), it is advantageous to allocate more OS to the repetitions. In FIG. 46, the repetitions have longer allocation than the first transmission.

Multiple Configured Grants for a UE

The gNB may configure multiple grants to a UE and the UE may select one of the configured grants for a HARQ process.

In the following descriptions, the HARQ IDs are indicated as a number within each transmission.

The grants may have one of more of the following features.

Figure 47:
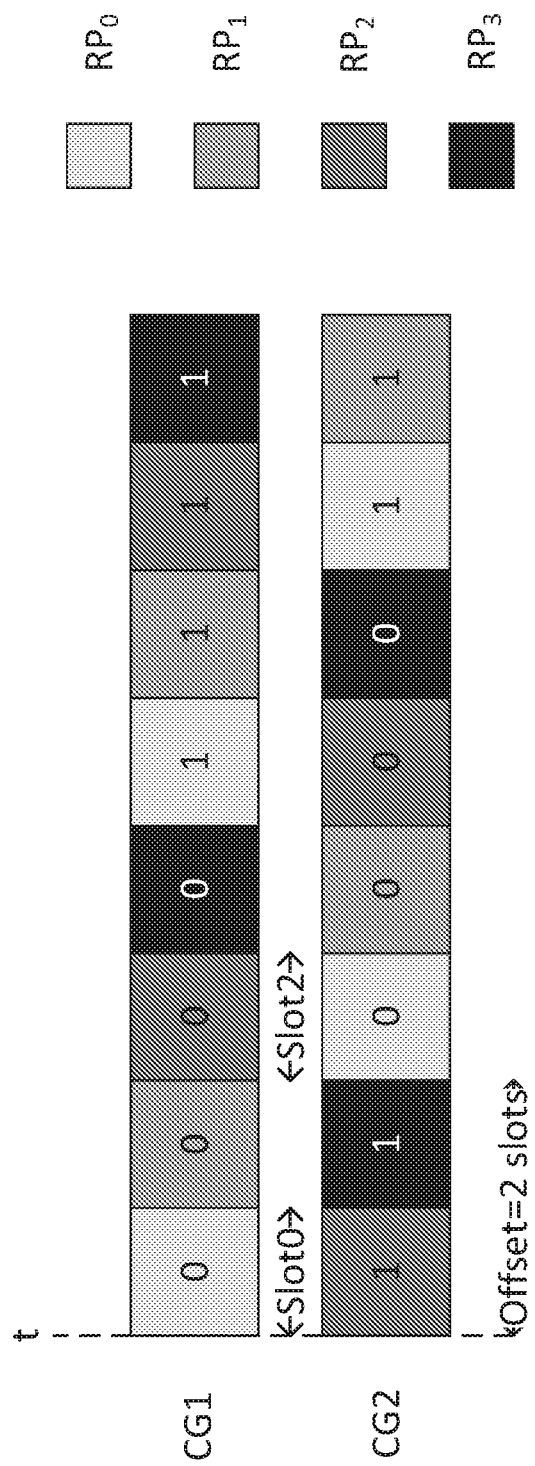
FIG. 47 shows an example of a UE having two configured grants, where CG2 has a relative offset of two slots from CG1.
Figure 48:
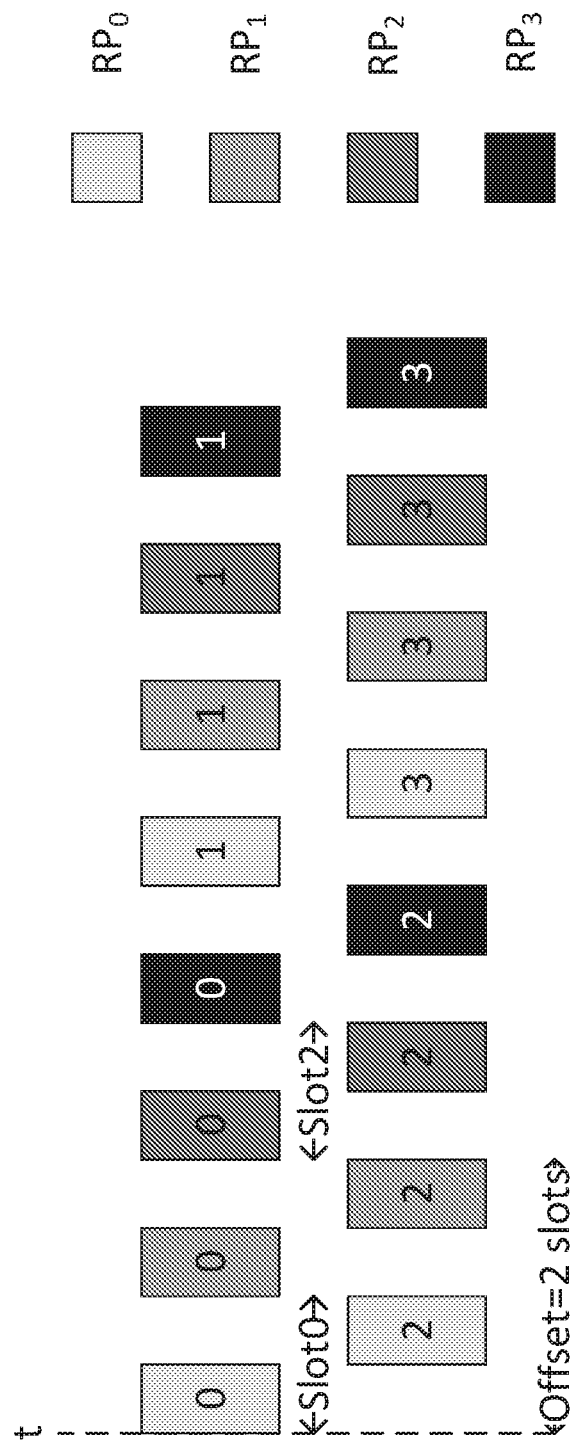
FIG. 48 shows an example of CGs with non-overlapping time resources.
Figure 49:
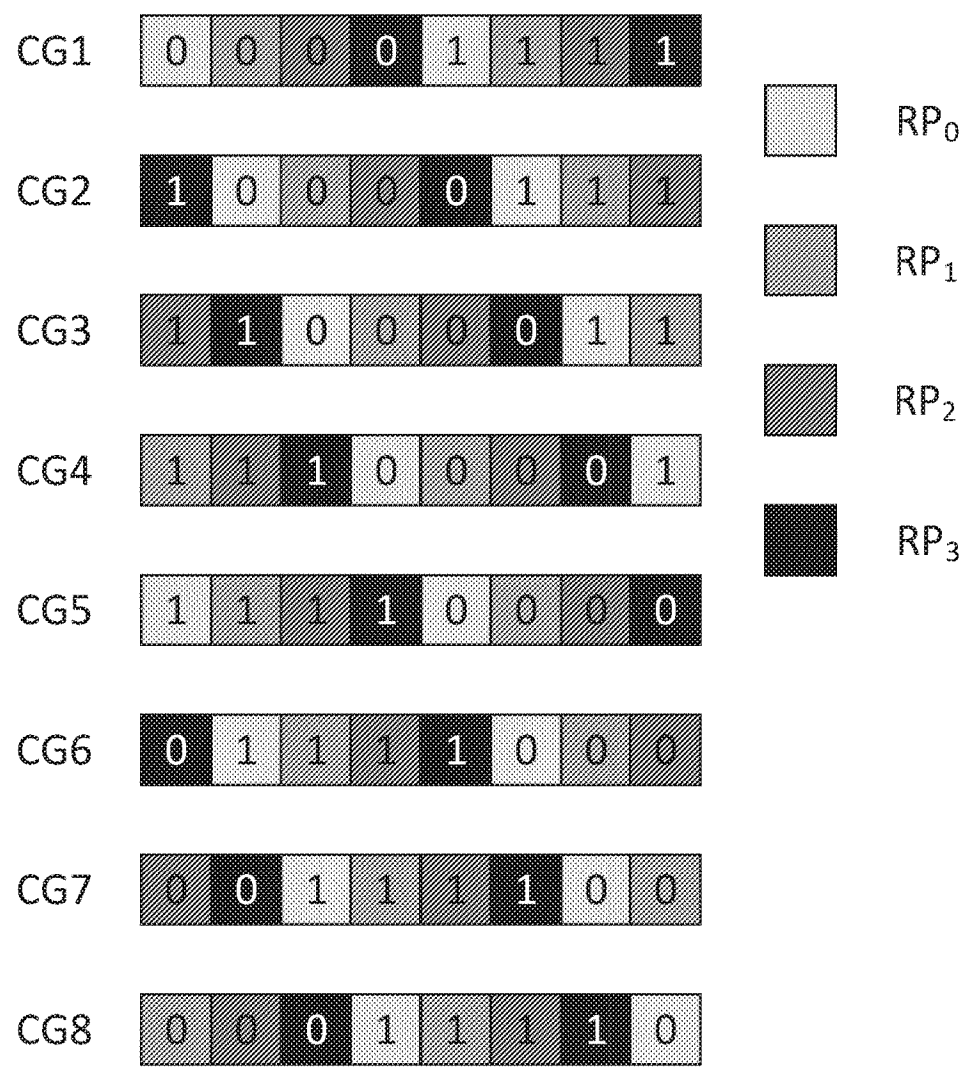

- Grants have different timing offsets for transmitting a given HARQ ID and RV to enable the UE to select the offset that provides the least latency for transmission. In FIG. 47, the gNB configures the UE with two grants—CG1 and CG2. Each grant has two HARQ processes with four repetitions. If the UE's HARQ ID 0 is ready for transmission prior to reference time t, the UE uses CG1. If the HARQ ID 0 is ready for transmission between reference time and two slots, the UE uses CG2 so that all the repetitions can be sent on the grant.
- While this example shows resource allocation in slots, this can be generalized to apply to mini-slots and scenarios wherein only some symbols of the slot are assigned for UL transmission.
- The time resources of the grants may overlap. In FIG. 47, the time resources for CG1 and CG2 fully overlap.
- Alternatively, the time resources of the grants may not overlap. In FIG. 48, the UE is configured with two CGs—CG1 and CG2. CG1's time resources occur in the first half of the slot while CG2's time resources occur in the second half of the slot. The UE may transmit on both CG1 and CG2 within the slot. When it switches from one grant to another, the gNB identifies the DMRS change to identify the grant used by the UE. FIG. 48 CGs with non-overlapping time resources.
- The frequency resources of the grants overlap. The frequency resources may even be identical for the grants.
- For a given transmission time, each grant provides a transmission opportunity for a different repetition of a HARQ ID or different HARQ IDs to allow UE to transmit a process with minimum latency.
- An example is shown in FIG. 49 for a case where the UE is configured for two HARQ IDs 0 and 1 and four RVs. The time resources and frequency resources are the same for the CGs; the time offsets are different for the HARQ ID/RV. Each HARQ ID is repeated four times with a different RV. Eight different configured grants are enough to support transmission of any HARQ ID and RV at a given opportunity. Each transmission may be a slot or a mini-slot.
- If RVs are repeated in the repetition bundle, fewer grants are required to support transmission of a HARQ ID and the RVs.

In practice, the gNB may configure only a subset of the possible CGs to a UE or it may activate only a subset of the CGs at a given time.

Methods for Configuring Multiple CGs

The gNB may configure multiple NR-AUL grants to the UE in one of the following ways.

Figure 50:
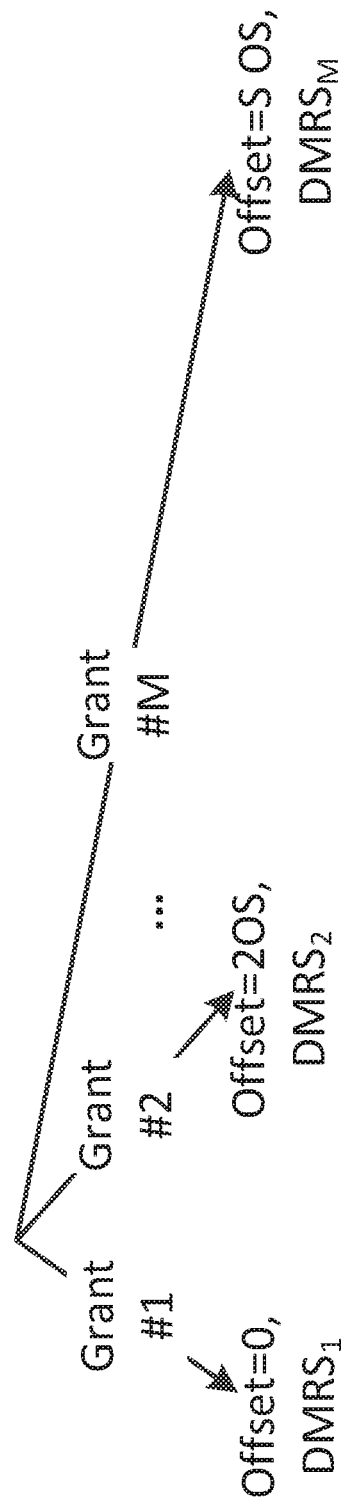
FIG. 50 illustrates an example of grant-group parameter configuration.

- The gNB configures multiple grants explicitly to the UE through RRC, each with an appropriate timing offset and a grant ID. In this case, any configuration change (such as change in the frequency) must be applied to every grant. For Type-2 grants, gNB must activate or deactivate each grant to the UE through DCI and this must be acknowledged by the UE through MAC CE.
- The activation and deactivation DCI may carry the ID of the grant. The grant ID is a few bits and may reuse the bits allocated to HARQ process number and RV, which are set to all 0s in Rel. 15 for activation and release. Multiple activation or deactivation DCI may be transmitted in the same monitoring occasion; so, the UE may monitor for multiple DCIs with CS-RNTI.
- Alternatively, the UE is configured to use a scrambling sequence unique to each configured grant. The CS-RNTI of activation/deactivation DCI of a grant is scrambled with the grant-specific sequence. The UE decodes the PDCCH and checks for every candidate grant sequence that successfully decodes the DCI. The UE identifies the grant based on the detected scrambling sequence.
- gNB configures a "Grant-group" to the UE where the group consists of G grants and all or multiple grants can be changed with a single update. This requires minimal overhead to update the parameters of the grant; for example, the frequency resources can be changed for all the grants within a grant-group using a single update, either through an activation DCI for Type-2, or through RRC/MAC CE for Type-1 grant. The concept of a grant-group is shown in FIG. 50. Here there are M grants in grant-group #M where the offset and DMRS are different between the different grants. Each grant may also carry an ID. All the other parameters may be the same across the grants.
- A group-grant is Type-1 if all the grants in it are of Type-1. A group-grant is Type-2 if all the grants in it are of Type-2.

The gNB provides the offsets to the UE through one of the following ways.

- The timing offsets given by RRC parameter timeDomainOffset are RRC configured for type-1 grant-group. For a grant-group that has grants mainly differing in the offset, the grant-group may be RRC configured as one information element providing multiple grants to the UE. Lists of length-G for DMRS configuration, grant ID, and timing offset (timeDomainOffset) are provided to the UE indicating that the group-grant contains G grants. An example of the grant-group RRC configuration is shown in Example 1 of the Appendix. The IE GrantGroupConfig is used to configure a grant-group of uplink configured grant transmissions of type1 and type2.
- Alternatively, grants with different parameters may be grouped together in a grant-group; here the frequency resources, MCS, etc. could be different between the grants. Therefore, the grants may be configured separately but they may be grouped into a grant-group for each of managing the grants. For example, for type-2 group-grant, power control may be applied commonly to all grants in the group-grant.

The gNB may provide the following grant-group CE consisting of the grant-group ID and a list of grant IDs belonging to this group for type-1 grants, as shown in Example 2 of the Appendix.

Depending on the traffic and load in the system the gNB can have more flexibility if it allows a grant to be part of more than one group-grant. Therefore, a grant (child) can have multiple group-grants (parent). So a grant is updated if an update is applied to any one of its parent; the grant is updated according to the most recent update to a parent group-grant.

For Type-2 grants, all the grants in the grant-group may be activated/deactivated together; the activation and deactivation DCI have a field for indicating the impacted grants in one of the following ways.

- This field is a grant ID field; when the grant ID of one of the grants is indicated in this field, the DCI applies to all the grants in the grant-group.
- The field is a grant-group ID; when the group field is present, the DCI applies to all the grants in the grant-group with the indicated ID. The grant-group ID is useful when a UE can have multiple grant-groups.

As the grant ID is configured through RRC, the activation DCI may provide only the timing offsets for the grants. This is done through the Time domain resource assignment field that exists in a format 0_1 DCI. This field is an index into a table of multiple rows of indices where each index provides the time domain resource allocation for each grant. Here the parameters such as S and L may be the same for the grants but the offset $K_2$ is different for each grant. An example is given in Table 2 of the Appendix where the group-grant has four grants. The index provides a starting symbol and length allocation for the PUSCH and the $K_2$ value provides the offset for each grant.

Figure 51:
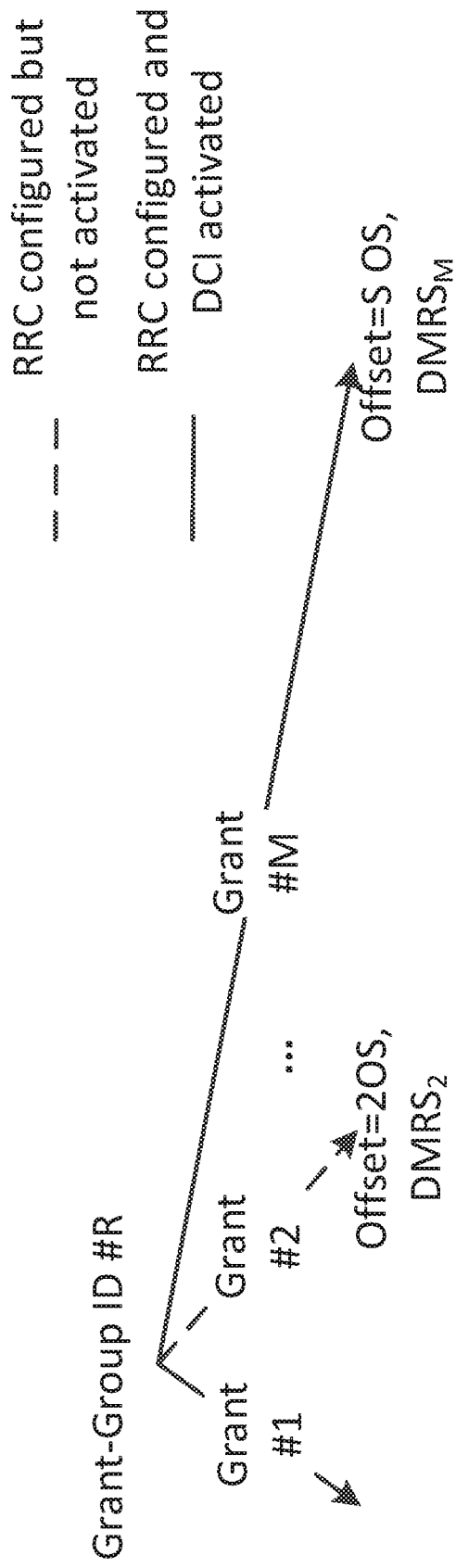
FIG. 51 illustrates an example of RRC configuration of offsets, with activation of a subset of grants through DCI.

Alternatively, for a Type-2 group-grant, the activation DCI activates only a subset of grants by indicating those specific grants and those offsets. The concept is shown in FIG. 51.

A table similar to Table 2 may be used and the index is indicated in the activation DCI. The table consists of multiple rows, where a row may indicate one or more grants as shown in the example in Table 3 of the Appendix. In Table 3, indices 1-8 show activation of only two grants (grant-1 and grant-2 only) while the remaining indices show activation of all four grants in the group-grant.

Alternatively, for a type-2 grant, the RRC configuration may provide a list of offsets for the grants but the activation DCI activates only certain grants by indicating a subset of the offsets.

A Group-grant may also contain a mix of type-1 and type-2 grants. The advantage of this configuration is that it can adapt quickly to traffic requirements. The UE may have a type-1 grant; but if more grants are required to support latency and data rate, the gNB may allocate additional grants through type-2 grants that may be part of the same group-grant. Therefore, a UE may switch from type-1 to type-2 grant or from type-2 to type-1 grant to retransmit a HARQ process or to send repetitions.

Managing Group-Grant Resources Across Different Frequency Regions

Figures 52A, 52B:
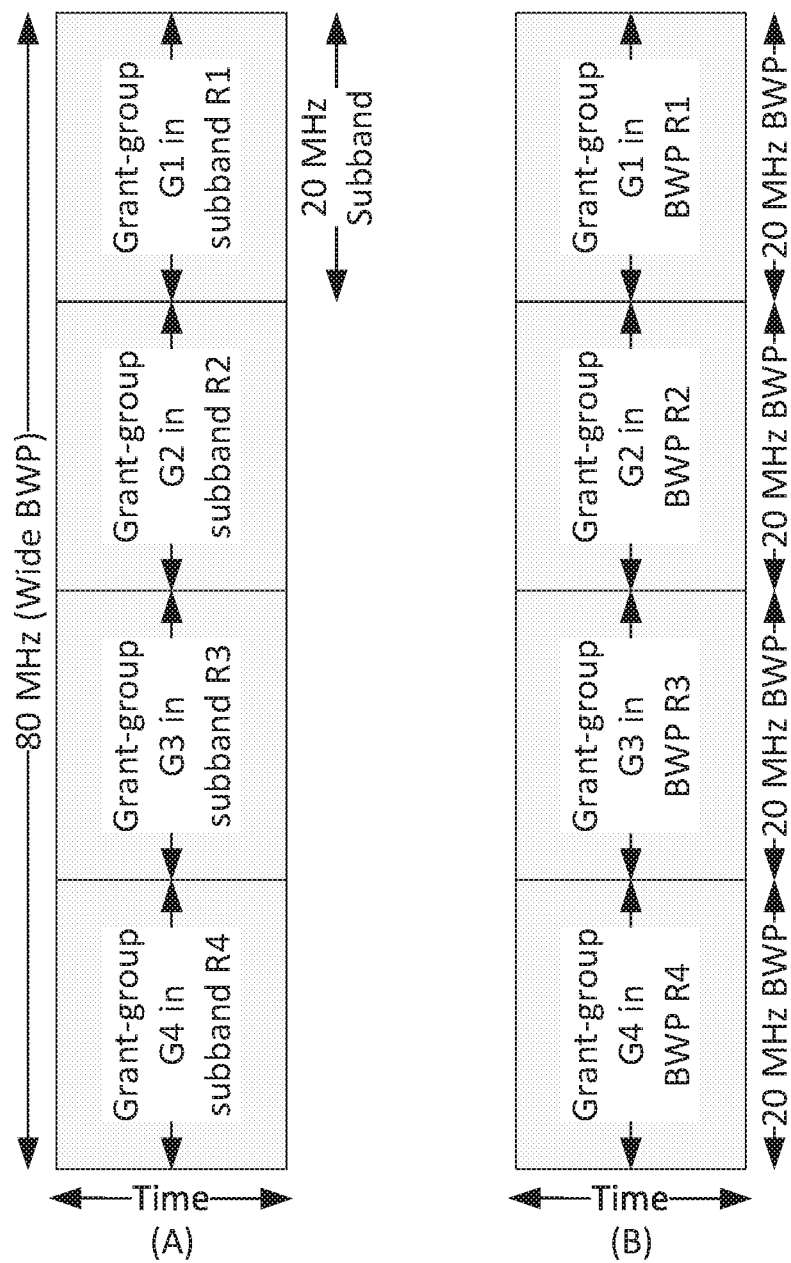
FIG. 52A shows an example grant-group configuration across multiple frequency regions with subband configurations within a wideband BWP.
FIG. 52B shows an example grant-group configuration across multiple frequency regions in multiple BWPs.

Group-grants may be configured in multiple frequency regions where the frequency regions are subbands within a wideband BWP (FIG. 52A) or the frequency regions are separate BWPs (FIG. 52B).

The following example is discussed in the context of NR-U but may apply to eURLLC and eV2X. There may be scenarios where the gNB may receive interference in some frequency regions due to another node but the UE may not hear the interference. If the UE autonomously transmits on those bands, the gNB may not be able to receive the UE's transmissions. We propose herein to enable the gNB to dynamically suspend grants in such resources. The gNB may indicate the suspension through a 'suspend-DO'. The suspension temporarily deactivates a Type-1 or Type-2 grant. This DCI may carry one of the following fields.

- A group-grant ID field that indicates which group-grant must be suspended
- A grant ID field that indicates which grant is suspended. Additionally, if one grant is suspended, other grants in its grant-group may also be suspended.
- A BWP-ID or subband-ID. All grants that have frequency resources overlapping with the indicated BWP-ID or subband-ID are suspended.

The suspended state may end in one of the following ways.

- A UE timer is set to a RRC configured value when the suspend-DCI is received for a grant. The timer is decremented over time. When it expires, the UE may resume using that grant.
- A resume-DCI is transmitted to indicate that transmission may resume on that grant. The resume-DCI may use the same RNTI as the suspend-DCI and may have the same length and format as the resume-DCI. A one-bit field in the DCI may indicate the 'suspend' or 'resume' states.
- The suspend-DCI carries a field indicating the duration for which the UE may not access the grant.

Figure 53A:
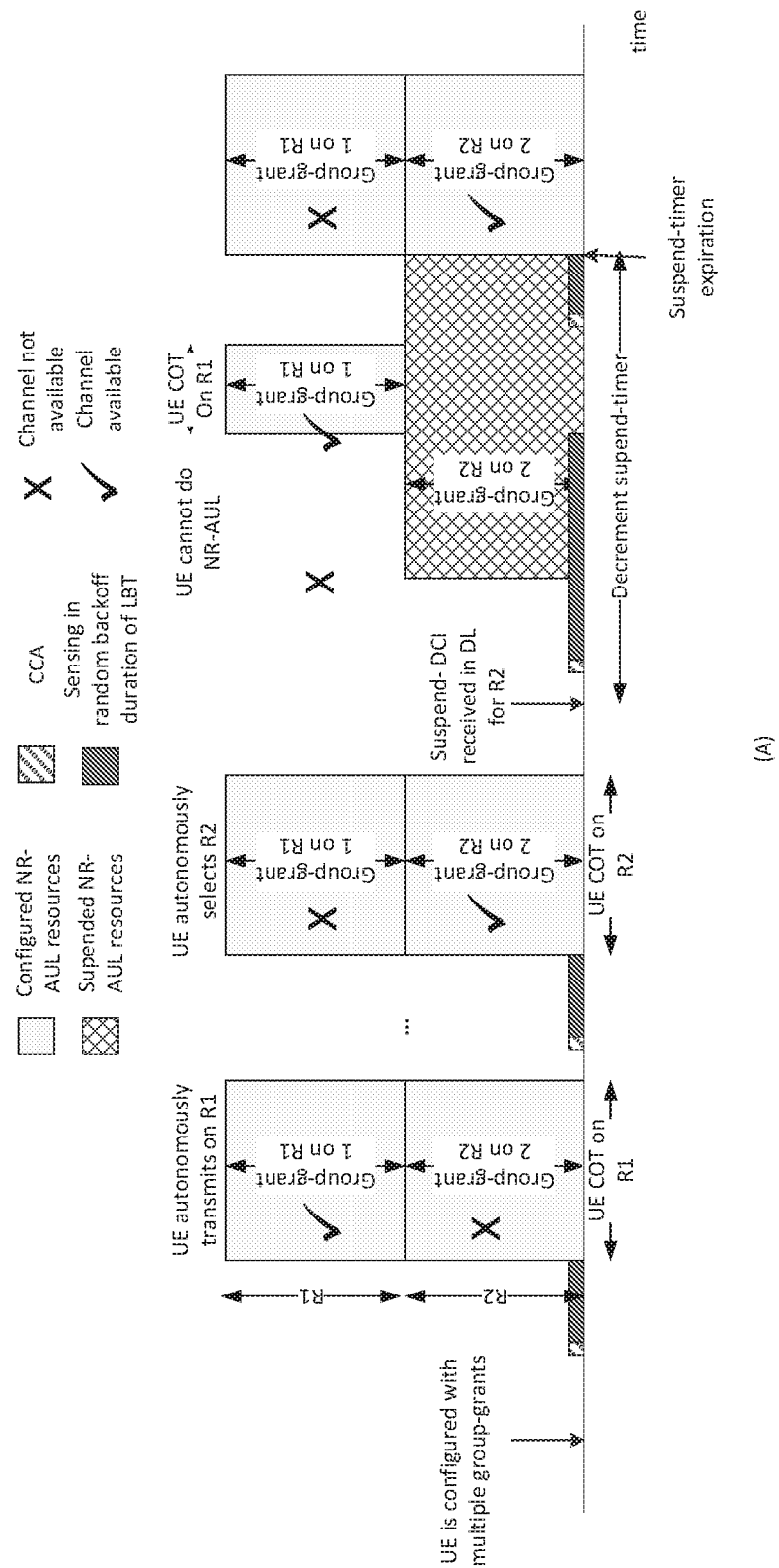
FIG. 53A illustrates an example of suspending and resuming NR-AUL transmission on a grant using a timer.
Figure 53B:
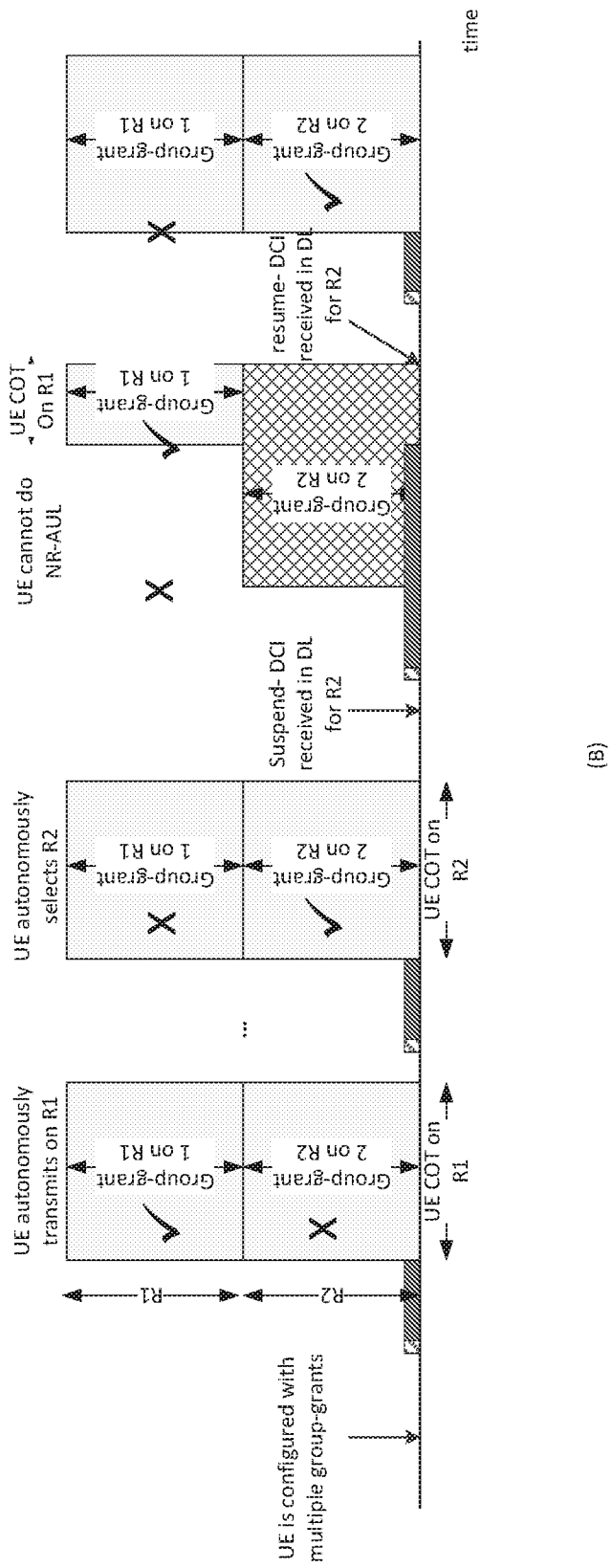
FIG. 53B illustrates an example of suspending and resuming NR-AUL transmission on a grant using Resume-DCI.

FIG. 53A illustrates suspending and resuming NR-AUL transmission on a grant using a timer. FIG. 53B illustrates using a resume-DCI.

Figures 54A, 54B:
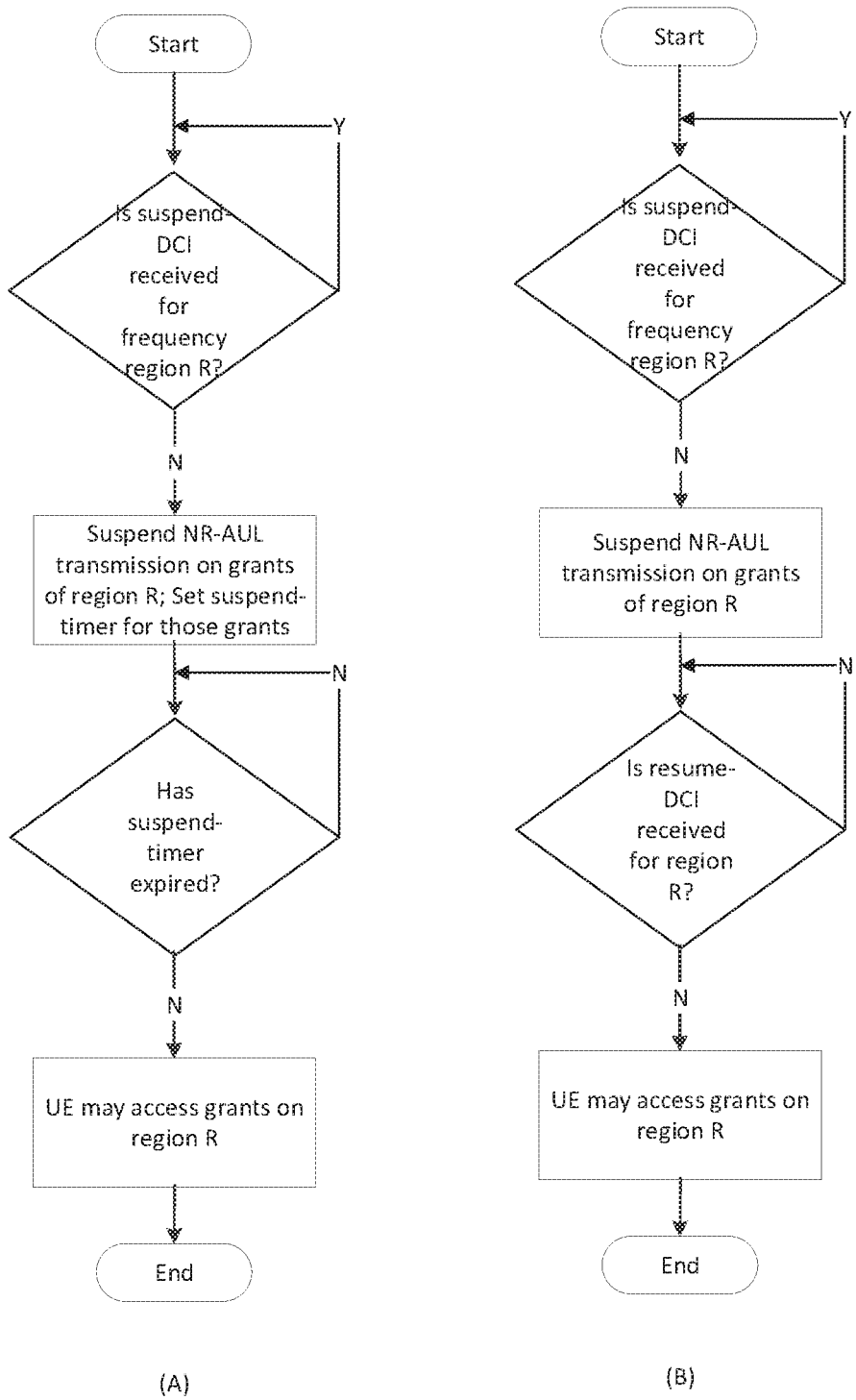
FIG. 54A illustrates an example method of suspending NR-AUL on a grant using a timer.
FIG. 54B illustrates an example method of suspending NR-AUL on a grant using a resume DCI.

FIG. 54 Procedure to suspend NR-AUL on a grant (A) using Timer (B) using Resume-DCI A UE may be already using a grant when the gNB sends the suspend-DCI for that grant. Note that the suspend-DCI may be received by the UE in a different BWP or subband in TDD or on a different frequency band in FDD. In that case, the UE may perform one of the following actions.

- UE immediately stops transmitting on the suspended grant and releases the channel.
- UE transmits for a predetermined duration such as until the next slot boundary and then suspends the transmission.
- UE completes the transmission of the current NR-AUL PUSCH HARQ process and then releases the channel. UE may not transmit configured repetitions for that HARQ process even though it acquired the COT.

If the UE suspends an ongoing HARQ process, it may reset its nr-aul-retransmissionTimer timer for that HARQ process and may retransmit that process on another grant without waiting for NR-AUL timer expiry or NR-AUL-DFI.

The UE needs to perform LBT to regain channel access and resume transmission on a grant that was suspended.

Figure 55A:
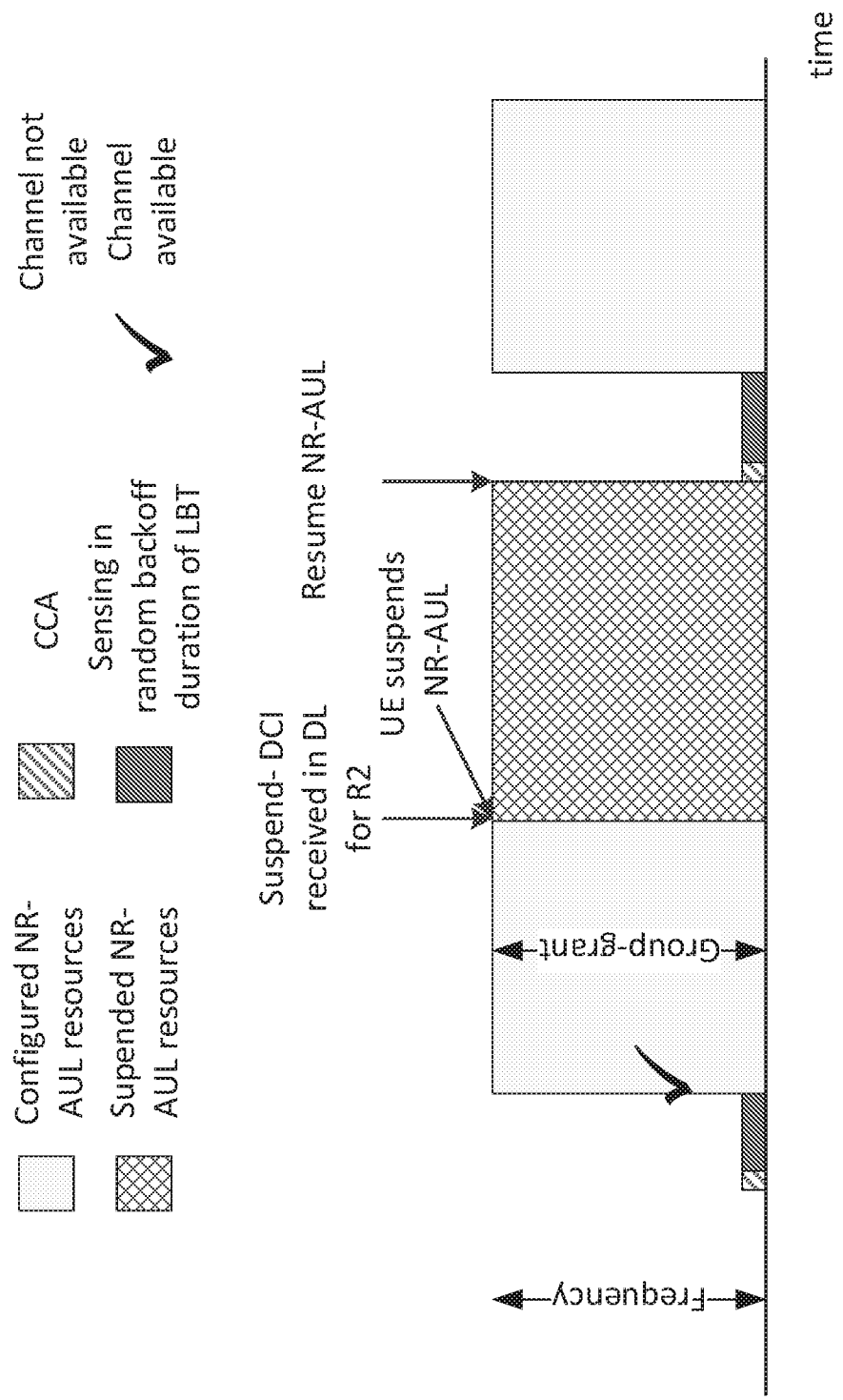
FIG. 55A illustrates an example of suspension during ongoing NR-AUL transmission on receiving the suspend, where DCI Transmission is discontinued immediately
Figure 55B:
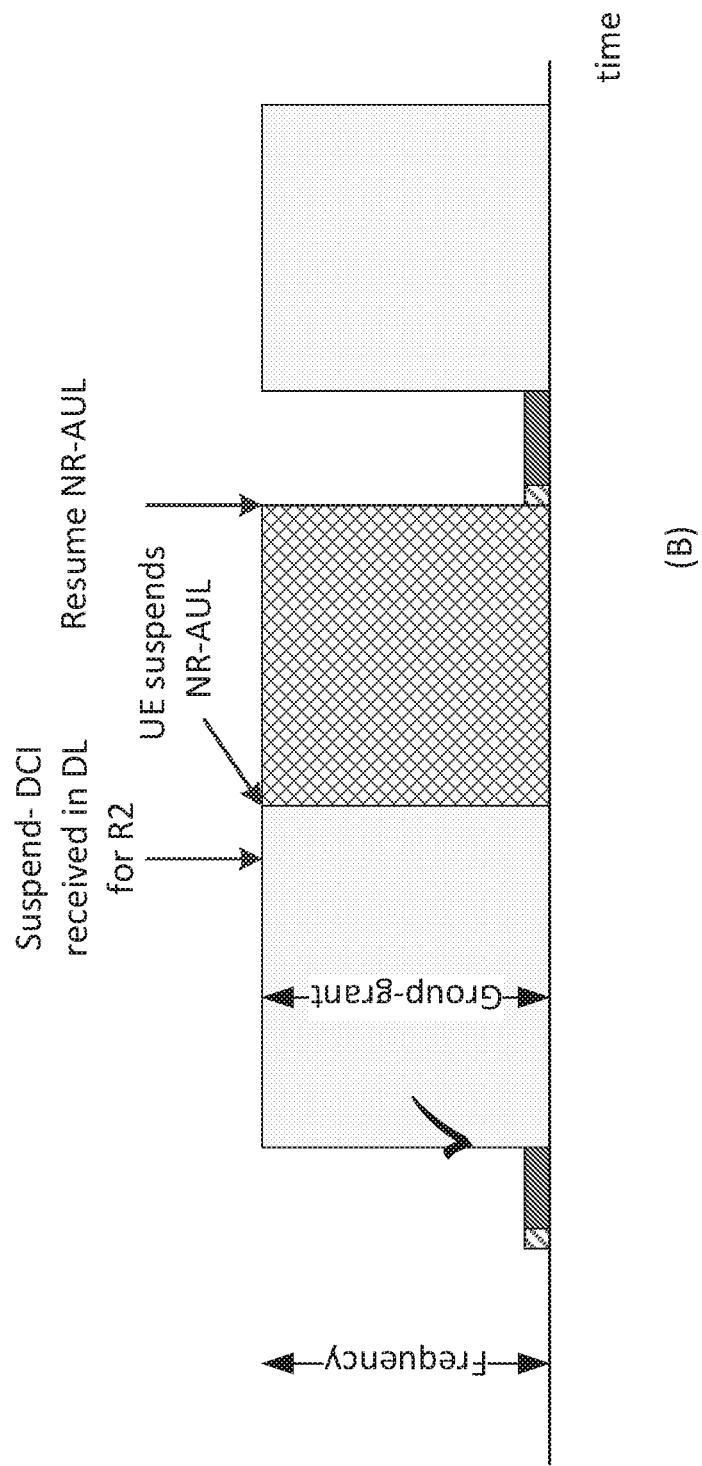
FIG. 55B illustrates an example of suspension during ongoing NR-AUL transmission on receiving the suspend, where DCI transmission is discontinued at the slot boundary.

FIG. 55A illustrates suspension during ongoing NR-AUL transmission on receiving the suspend-DCI where transmission is discontinued immediately. FIG. 55B illustrates where transmission is discontinued at the slot boundary The suspension and resume DCIs need not be acknowledged by the UE (unlike the MAC CE based acknowledgement for the activation DCI).

The suspend-DCI may be transmitted in the following ways.

- As a GC-PDCCH so that multiple UEs can be informed at the same time
- As a UE-specific DCI such as one scrambled with NR-AUL-RNTI or CS-RNTI or C-RNTI RNTI for CG PUSCH If a UE can select from multiple CGs and DMRS alone is a way to identify the UE identity and CG of the UE, there can be some performance loss due to false alarm. To increase robustness, we propose herein that the UE use a CG-RNTI specific to the CG to transmit the PUSCH, where the CRC for the PUSCH is scrambled by the CG-RNTI. The gNB may configure a unique RNTI per CG to the UE. For example, the UE may have a CS-RNTI per CG.

Alternatively, the UE may have only one CS-RNTI so that the activation/deactivation, DFI etc. can be received using the CS-RNTI (instead of monitoring multiple CS-RNTI) but may use a mask unique to the CG to scramble the CRC on the PUSCH. The gNB RRC configures this mask for each CG to the UE.

UCI for Synchronous CG

If the DMRS is limited, multiple UEs may be assigned the same DMRS. A candidate use case is the industrial IoT scenario where several hundreds of machine or sensors may be deployed. In this case, the DMRS is not enough to identify the UE. Therefore, the UE may carry UCI on CG with its ID such as CS-RNTI or C-RNTI so that the gNB can identify it by decoding the UCI.

Repetitions Across CGs

For reliable transmission, it is desired to ensure K repetitions for a HARQ process transmission. A UE may not be able to transmit one or more repetitions on a CG due to preemption of the resources, or having scheduled grant in those resources or due to other signals like SSB or DRS in the resource. We propose herein that a missed repetition on CGi may be done on CGj, e.g., the UE may switch the CG from the $i^{th}$ grant to the $j^{th}$ grant to complete the K repetitions.

As seen earlier, in the following descriptions, the numbers in the transmissions within the figures denote the HARQ IQ and RP denotes the repetition within the bundle.

Figure 56:
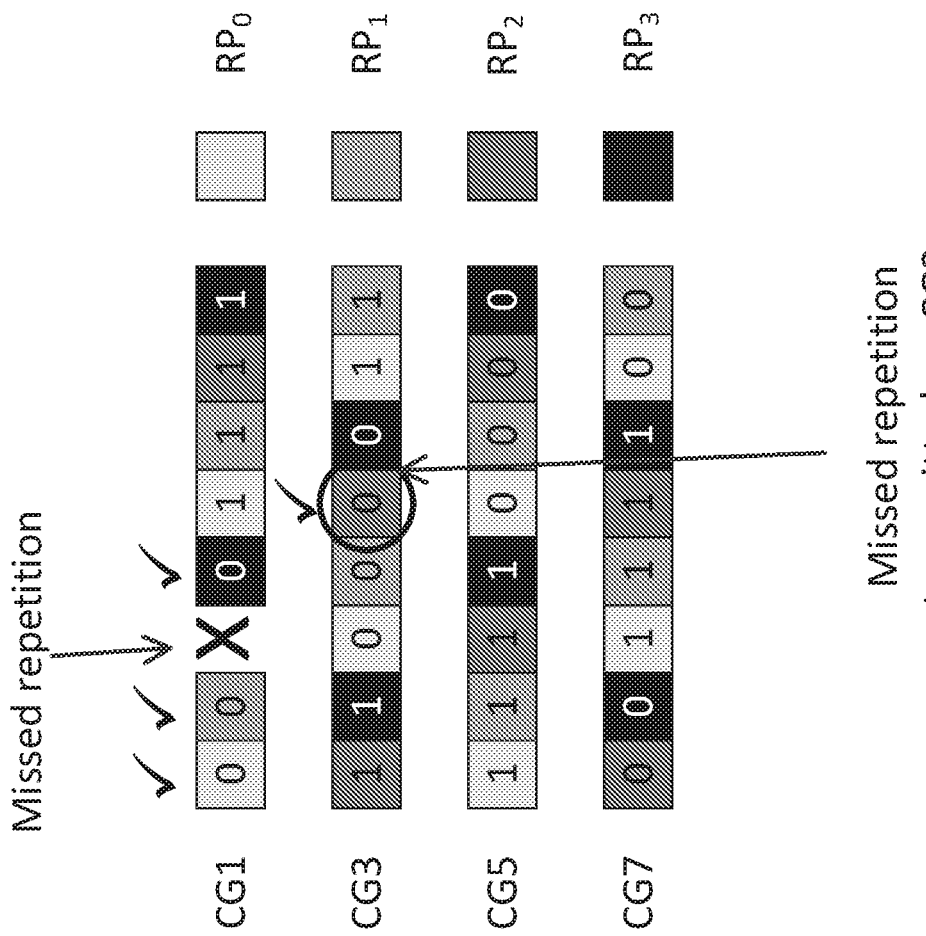
FIG. 56 illustrates an example where a missed repetition is transmitted by switching to a different CG.

For example, say CG1, CG3, CG5, and CG7 are activated to the UE as shown in FIG. 56. The UE starts transmission on CG1 but is not able to transmit RV2 of HARQ ID 0 on CG1, potentially due to DL signals or non-CG resources, however it may transmit RV3 of HARQ ID 0 on CG1. In this case, the UE switches to CG3 and transmits RV2 of HARQ ID 0 immediately after transmitting RV3 as those resources are available to the UE. The tick marks show the transmissions of the UE.

The UE may switch to a grant that provides minimal latency to complete the K repetitions.

Figure 57:
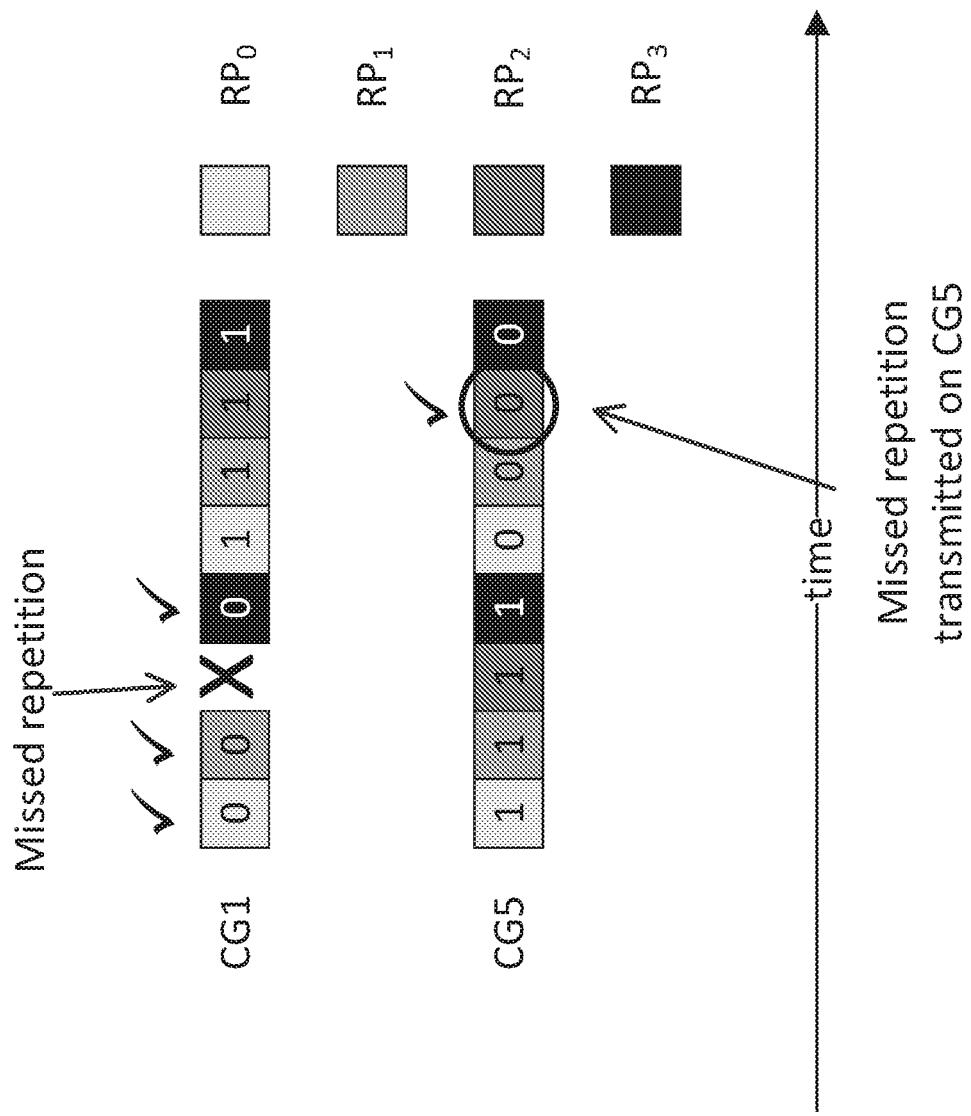
FIG. 57 illustrates an example where a UE does not transmit on CG1 as it waits to complete missed repetition on CG5.

As another example of UE behavior, the UE transmits on it current CG and may not transmit until it switches when the opportunity for the missed transmission occurs on the new CG as shown in FIG. 57. Here the Type-2 grants CG1 and CG5 have been activated to the UE. After transmitting RV3 on CG1, it does not transmit until it gets the opportunity to transmit RV2 on CG5, although there is an interval of no-transmission between the transmissions on the two CGs.

Figure 58:
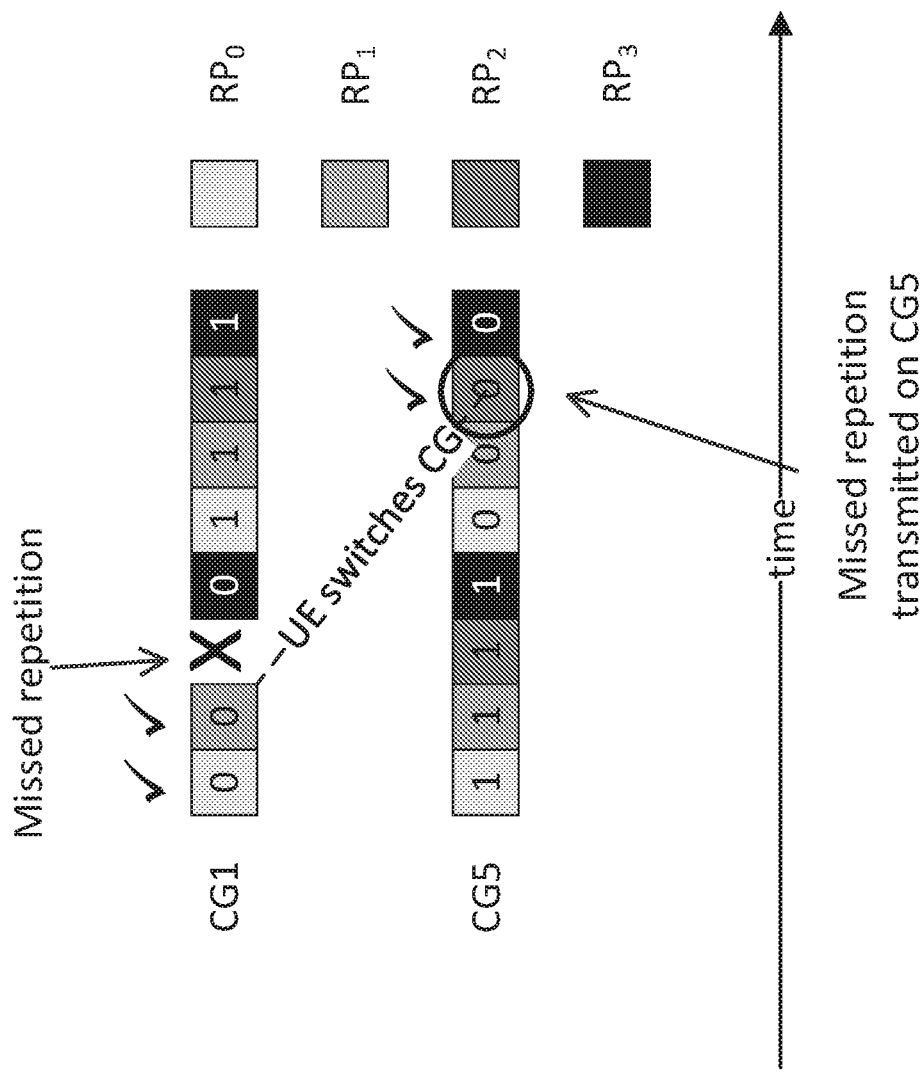
FIG. 58 illustrates an example where a UE switches CG to transmit the missed repetition and the following repetitions.

Alternatively, when a transmission is missed on a grant, the UE immediately exits that grant and finds a grant where it continues the missed transmissions. For example, in FIG. 58 the UE misses RV2 of CG1 for HARQ ID 0. It switches and transmits RV2 and RV3 of HARQ ID 0 on CG5.

The gNB will detect the CG of the UE from the DMRS. Furthermore, if the UE behavior for switching is defined, the gNB has less burden of blindly detecting the new CG.

Figure 59:
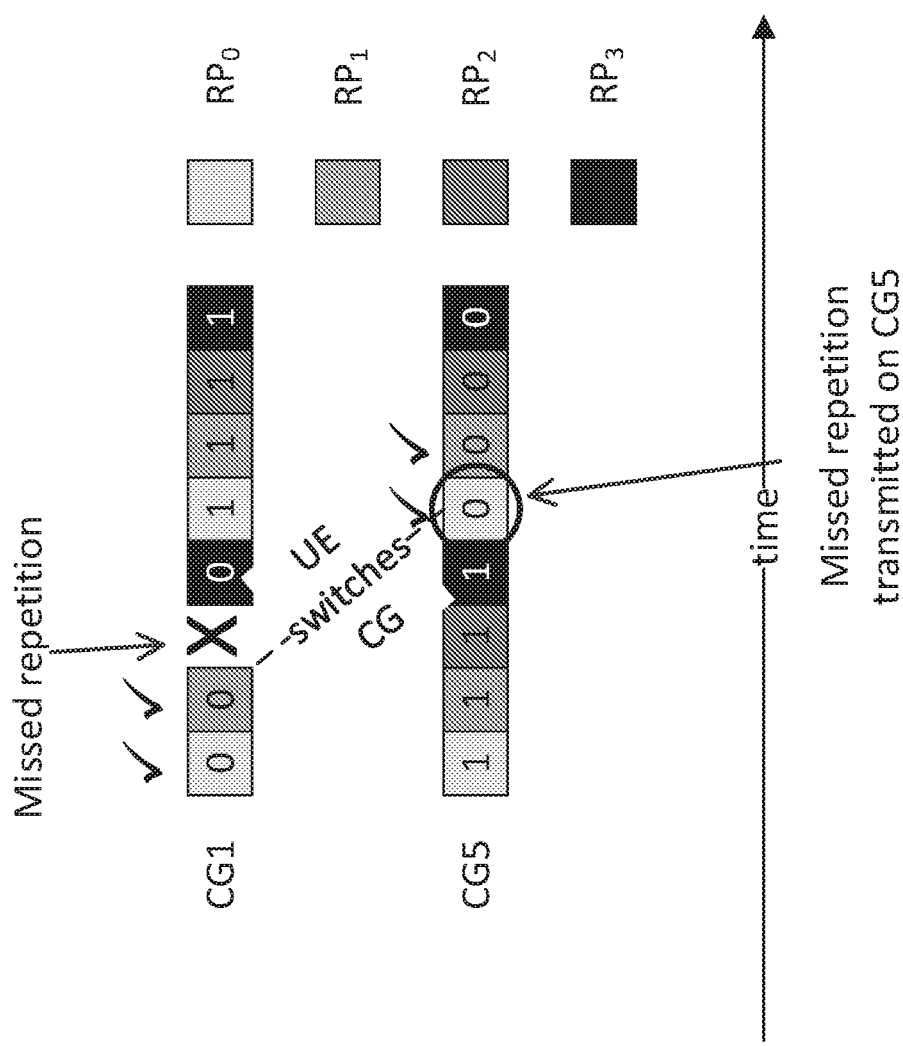
FIG. 59 illustrates an example of repetition of the same RVs on switching.

When the UE misses a transmission and switches to a different CG, it may transmit the same RVs that it transmitted in the earlier CG. For example, as shown in FIG. 59, the UE may transmit RV0 and RV1 on CG1. As resource is not available on CG1 for RV2, the UE switches to CG5 and transmits RV0 and RV1 again on CG2. It stops after the number of repetitions reaches 4. This keeps the latency minimal.

Early Termination of Repetitions

For latency sensitive applications like eURLLC and for time-limited applications like NR-U (COT is limited) it is advantageous to support early termination of repetitions. If the gNB can decode a transmission of a HARQ ID from fewer repetitions, it may transmit an Ack to the UE and the UE may not continue with the repetitions of that HARQ ID.

Note that retransmission is different from repetition; retransmission occurs when Nack is received or a timer such as NR-aul-retransmissionTimer expires from the time of initial transmission. However, repetition occurs up to K times or repetition may occur until an Ack is received.

Figure 60A:
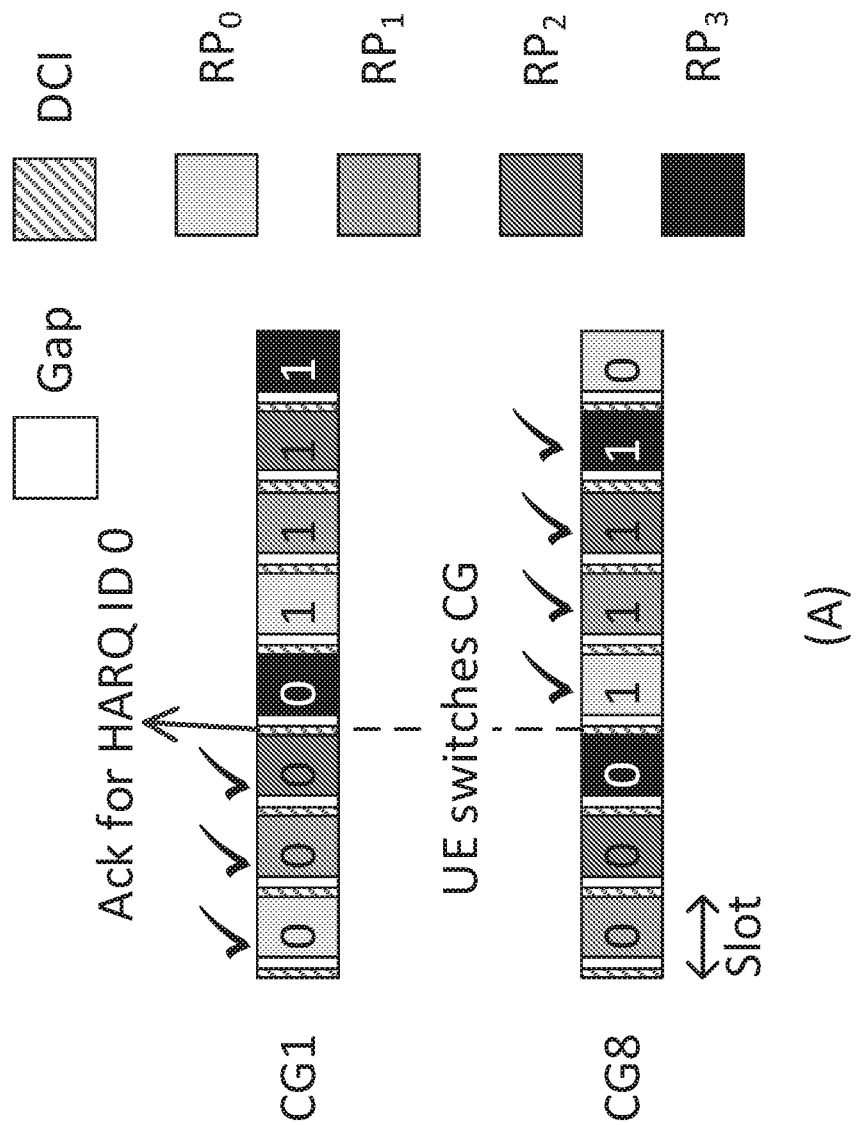
FIG. 60A illustrates an example where a UE switches CG upon early termination to begin transmission of new HARQ ID, where ACK is received after 3rd transmission in repetition bundle
Figure 60B:
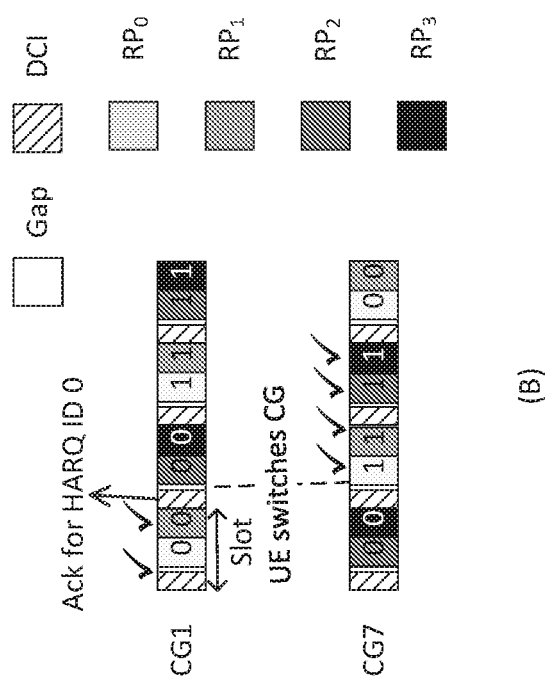
FIG. 60B illustrates an example where a UE switches CG upon early termination to begin transmission of new HARQ ID, where Ack is received after 2nd transmission

On termination, the UE may transmit a different HARQ ID for which it may switch to a different CG. An example is shown in FIG. 60A and FIG. 60B where the UE transmits HARQ ID 0 and receives Ack upon which it terminates transmission of ID 0 prior to completing four repetitions. Each transmission could be a slot or mini-slot such as 2OS, 4OS, and 7OS long transmissions. In FIG. 60A, UE monitors the CORESET at the beginning of every slot. Instead of wasting the transmission opportunity, the UE switches to CG8 to begin transmission of HARQ ID #1 if it has something in that buffer. In FIG. 60B, the UE transmits two mini-slots in each slot and monitors the CORESET at the start of the slot for the DCI. On receiving the Ack for HARQ ID 0 after the first two transmissions in the repetition bundle, the UE does not transmit repetitions RP2 and RP3 and instead switches to another CG to transmit HARQ ID 1.

Retransmission on CGs

If a UE has multiple CGs configured to it and it does not receive Acknowledgement of the transmission of a HARQ ID within certain time duration, it may retransmit the HARQ ID on a different CG, e.g., we propose herein that the retransmission may occur on a CG different from that in the original transmission. The UE may select the new CG in a way that minimizes the latency of the retransmission.

Figure 61:
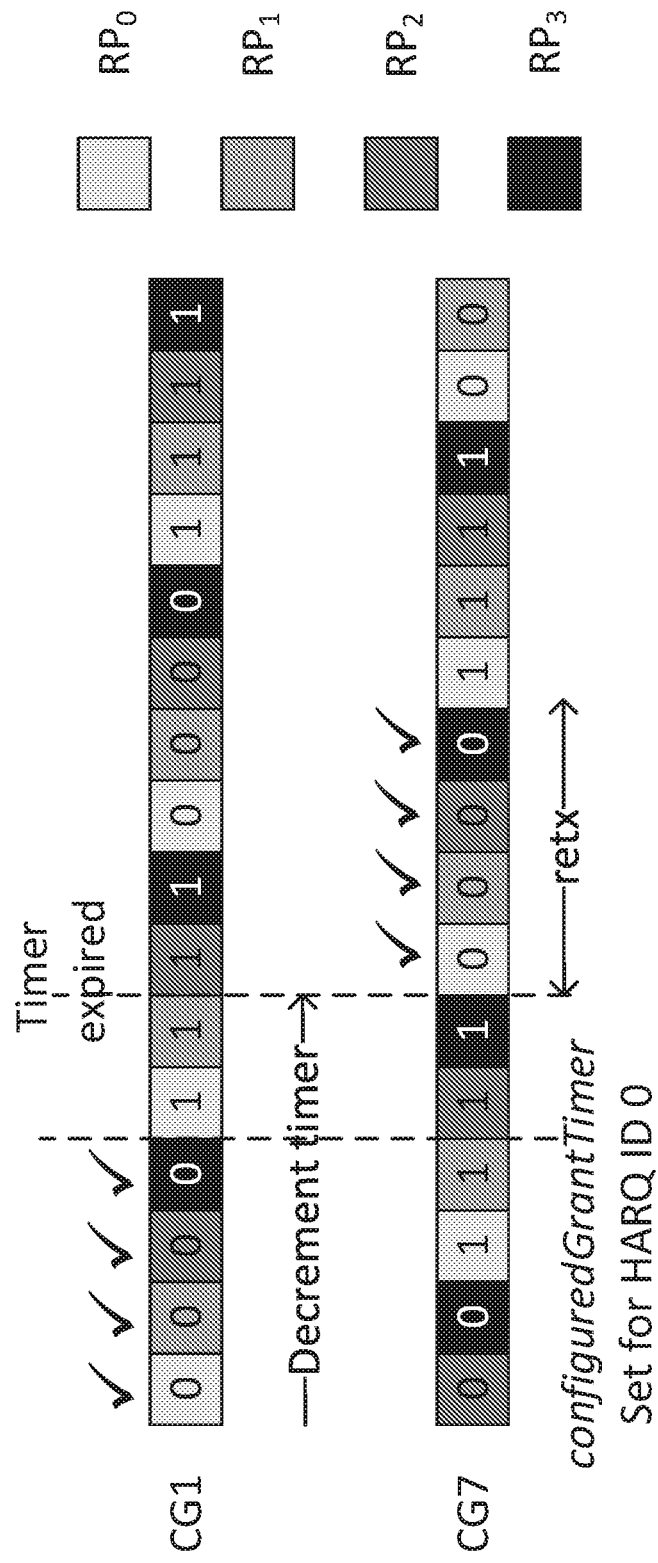
FIG. 61 illustrates an example of retransmission on timer expiry on a different CG

The concept is shown in FIG. 61. The UE transmits HARQ ID 0 on CG1 with four repetitions. It does not receive acknowledgement either in the form of an explicit Ack or scheduled UL grant. The configuredGrantTimer which is set during the HARQ ID transmission decrements when the UE transmits on CG1 and finally expires. On expiration, the UE identifies CG7 as the grant that provides an opportunity to transmit HARQ ID 0. As all K repetitions can be transmitted on CG7, the UE switches to CG7 and retransmits HARQ ID 0.

Frequency Hopping of Repetitions of a CG

Figure 62:
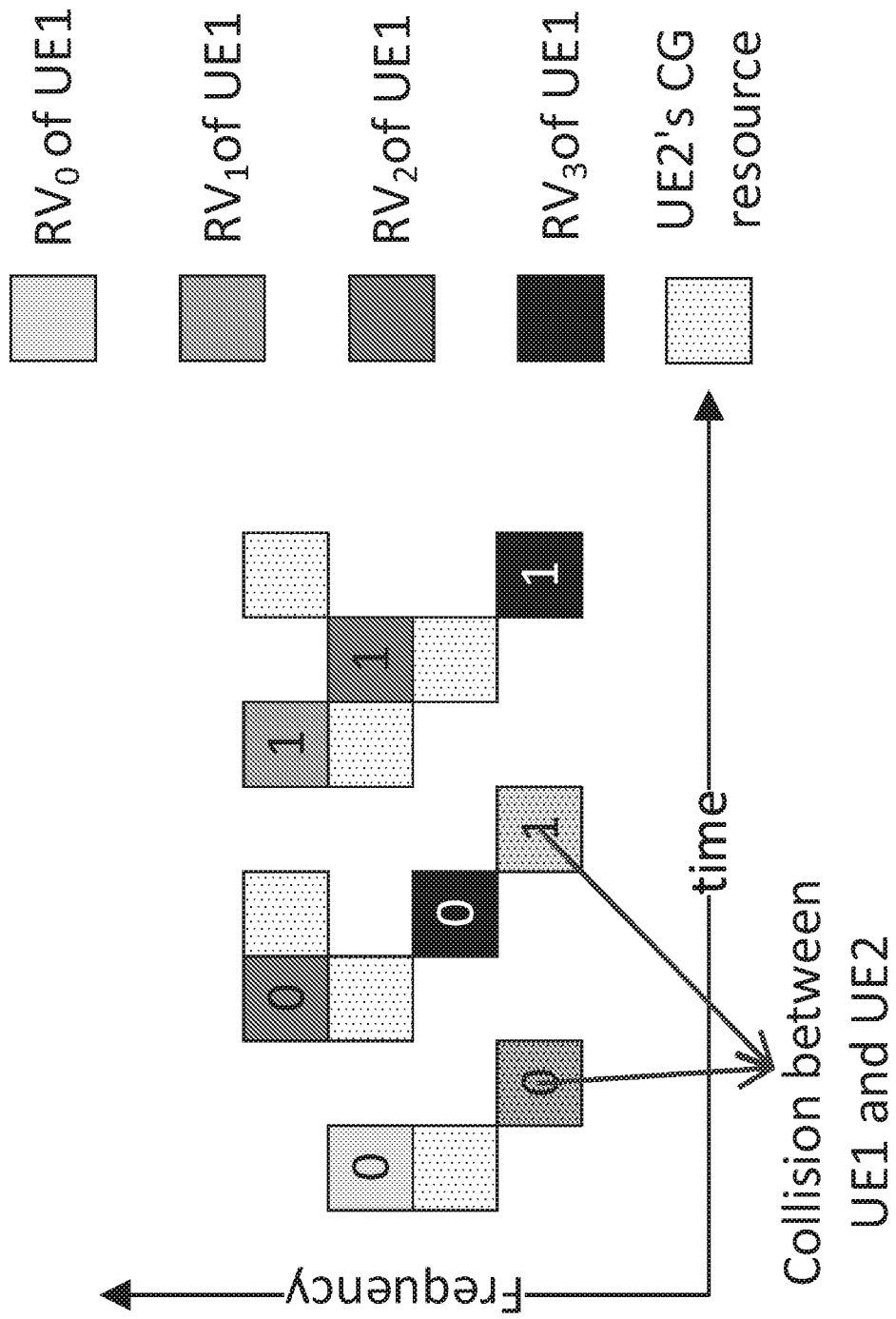
FIG. 62 illustrates an example of frequency hopping for repetitions to minimize collisions.

Depending on the traffic in the cell, the gNB may schedule multiple UEs on the same resource. If multiple UEs transmit at the same time, there can be collision between the UEs. For robustness to collisions, the gNB may schedule UE specific frequency hopping pattern for repetitions in a grant so that the chances of collision is reduced between two UEs, e.g., even if the UEs collide in one transmission, other repetitions may not collide. An example is shown in FIG. 62 where UE1 has a CG with two HARQ processes 0 and 1 with four repetitions for each. UE1's ID 0, $RV_1$ transmission collides with UE2's transmission. UE1's ID 1, $RV_0$ transmission collides with UE2's transmission. The other repetitions of UE1 do not collide, so that gNB has a good chance of correctly decoding the transmissions.

Note that the gNB can identify the collision from the DMRS of the UEs. The DMRS sequences of the UEs may be orthogonal or may be on different ports and can be distinguished by the gNB.

The frequency-hopping pattern is configured through RRC for Type-1 CG and the frequency resource may be tied to the transmission's timing such as slot or mini-slot timing.

For type-2 grants, the frequency-hopping pattern may be provided to the UE in the following ways.

- It is configured through RRC for Type-2 CG in the form of an offset from a reference frequency. The reference frequency is provided in the activation DCI.
- RRC may configure multiple hopping patterns for a CG and the activation DCI may indicate the frequency hopping pattern to use.
- The frequency hopping pattern is provided through the activation DCI.

Time Hopping of Repetitions of a CG

Figure 63:
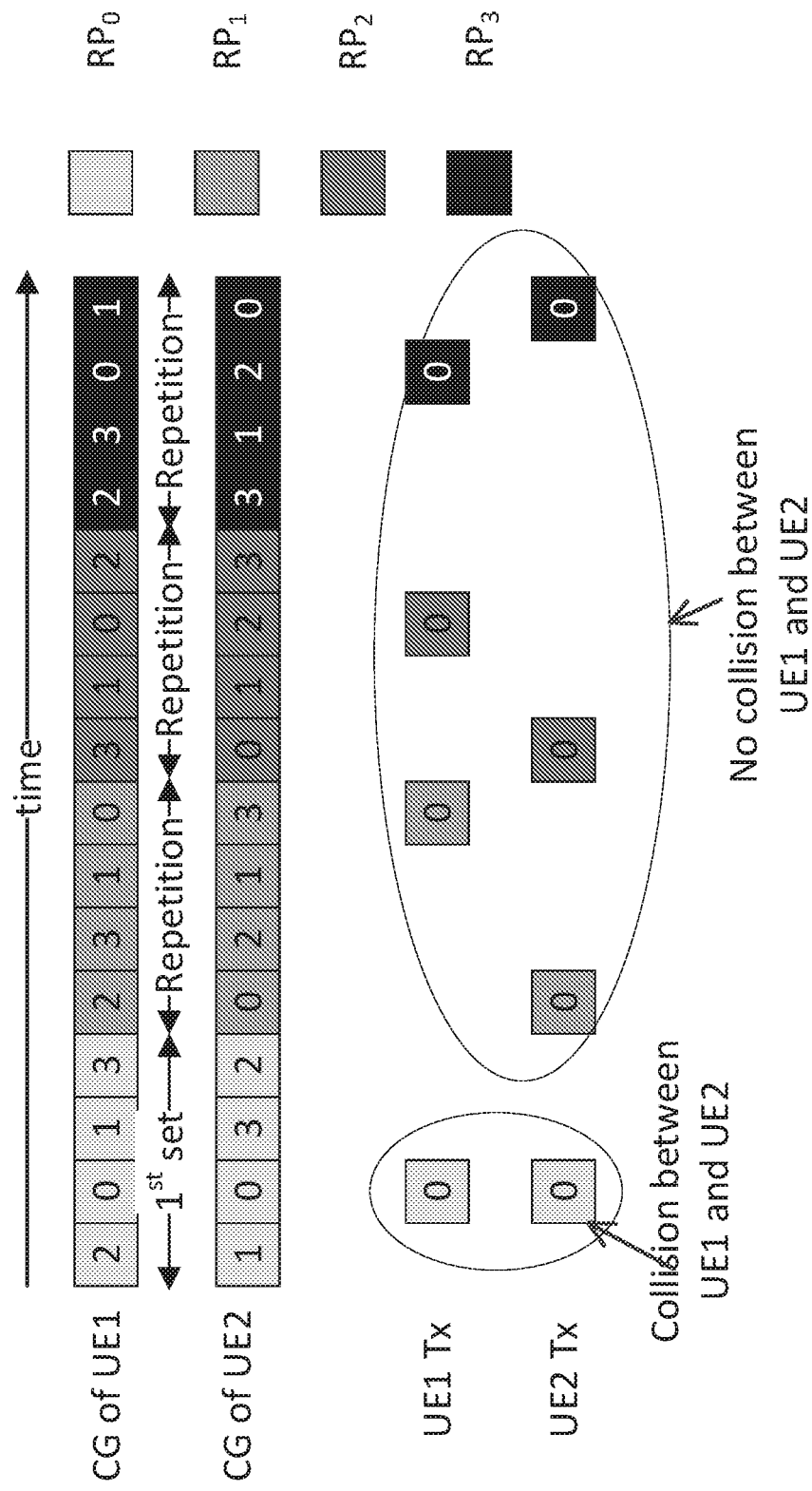
FIG. 63 illustrates an example of time hopping of HARQ process IDs with sets of repetitions.

CG resources may also support time-hopping for more robustness to collisions. For example, the order of transmission of the HARQ IDs and the repetition may vary based on the resource time and in a UE-specific manner as shown in FIG. 63. Here UE1 and UE2 are configured with CG resources on the same frequency and time. Let's say UE1 and UE2 have only HARQ process 0 to transmit, then their transmissions collide only on the first transmission. Thus, the gNB has a good chance of recovering the transmissions of both UEs. In this example, the HARQ processes are transmitted in an interlaced manner within each set of repetitions.

Figure 64:
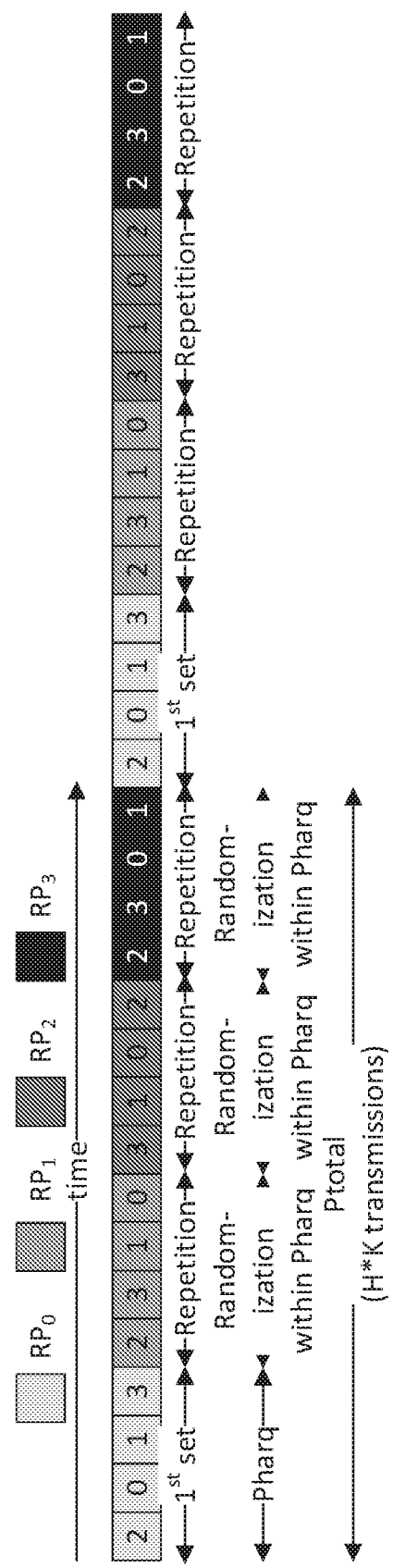
FIG. 64 illustrates an example of HARQ process randomization within Pharq.

We define the total time over which H processes may be transmitted as Pharq. We also define the total time over which all configured HARQ processes are transmitted along with repetitions as Ptotal—this is the total periodicity across all the HARQ processes configured to the UE. These parameters are shown in FIG. 64. If H HARQ processes and K repetitions are supported, the ID and RV may be generated by the following equations.

[HARQ_ID]=F1([floor(CURRENT_symbol/Pharq)] modulo H)

[HARQ_RV]=floor([floor(CURRENT_symbol/Ptotal)] modulo H*K)/K)

Here F1(·) is a function that provides a pseudo random interleaver. F1(·) generates a pseudo random interleaver of length H which is applies to each set of H transmissions (within a single repetition of the HARQ IDs). All the HARQ_RVs are the same within one set of repetitions.

Figure 65:
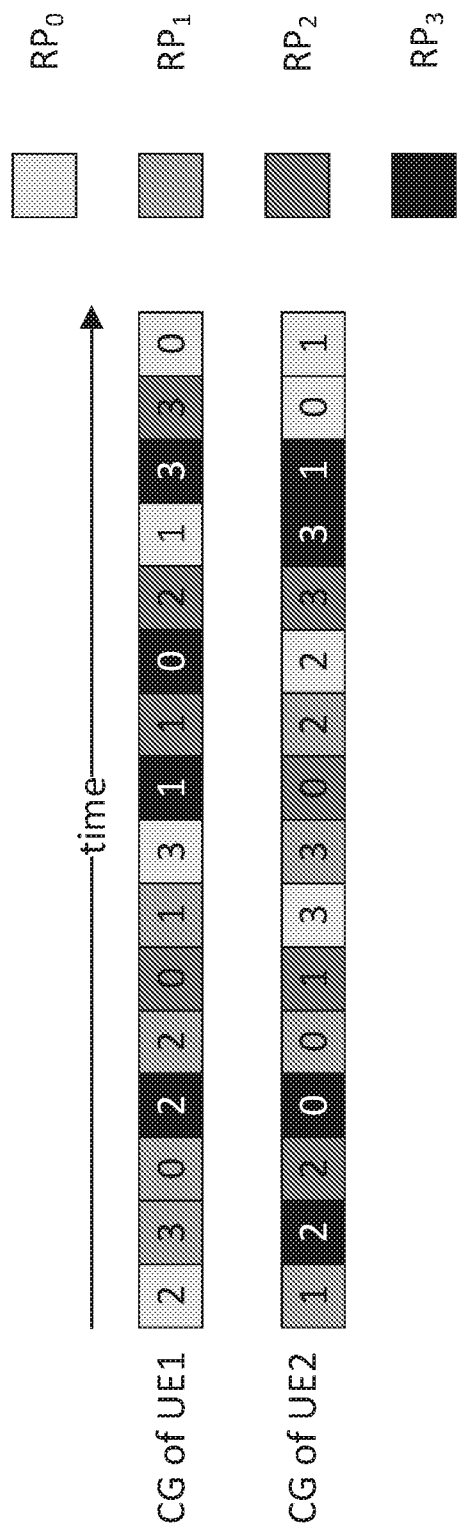
FIG. 65 illustrates an example of time hopping across HARQ process IDs and repetitions.

An alternate way of time hopping across the HARQ IDs and repetitions is shown in FIG. 65. Here the repetitions are hopped across the total period of the fours HARQ processes. This provides more randomness but the latency may not be uniform across all HARQ IDs as the repetitions of one ID may occur too far from each other.

Figure 66:
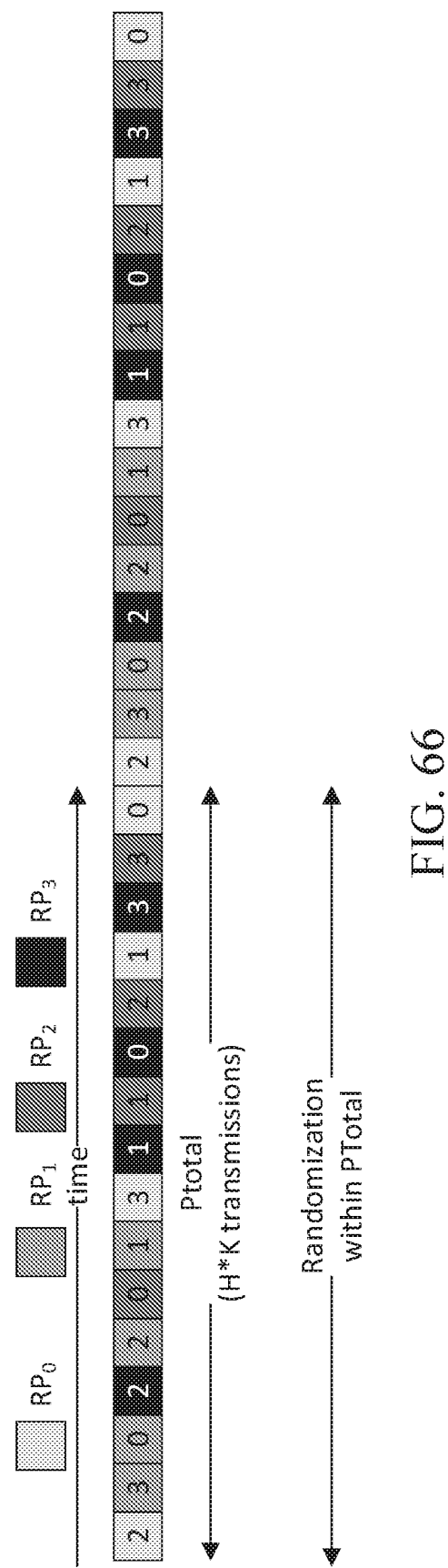
FIG. 66 illustrates an example of randomization of HARQ IDs and RVs across Ptotal.

As shown in FIG. 66, the randomization is across H*K transmissions. The HARQ_ID and HARQ_RV may be generated by the following equation.

[HARQ_ID, HARQ_RV]=F2([floor(CURRENT_symbol/Ptotal)] modulo (H*K))

F2(·) is a function that provides a pseudo random interleaver. F2(·) generates a pseudo random interleaver of length H*K.

Functions F1(·) and F2(·) are ways to randomize the location of the HARQ IDs and RVs as a function of time. They may be configured as a list of indices to the UE through RRC. Alternatively, the pseudo randomness may be a function of time and may be derived from an m-length sequence or gold-sequence generator either from its states or its output sequence (thus making it time varying). The sequence generator may be initialized in a UE-specific manner by the gNB so that different UEs have different random patterns.

Sensing Based CG Selection

We propose herein that a UE may sense the channel to avoid collision with another UE in applications like eV2X and NR-U. The gNB may configure multiple CGs to a UE; the UE selects a CG resource; if it senses a transmission from another node in that resource, the UE may switch to a different CG where it senses a free channel.

Figure 67:
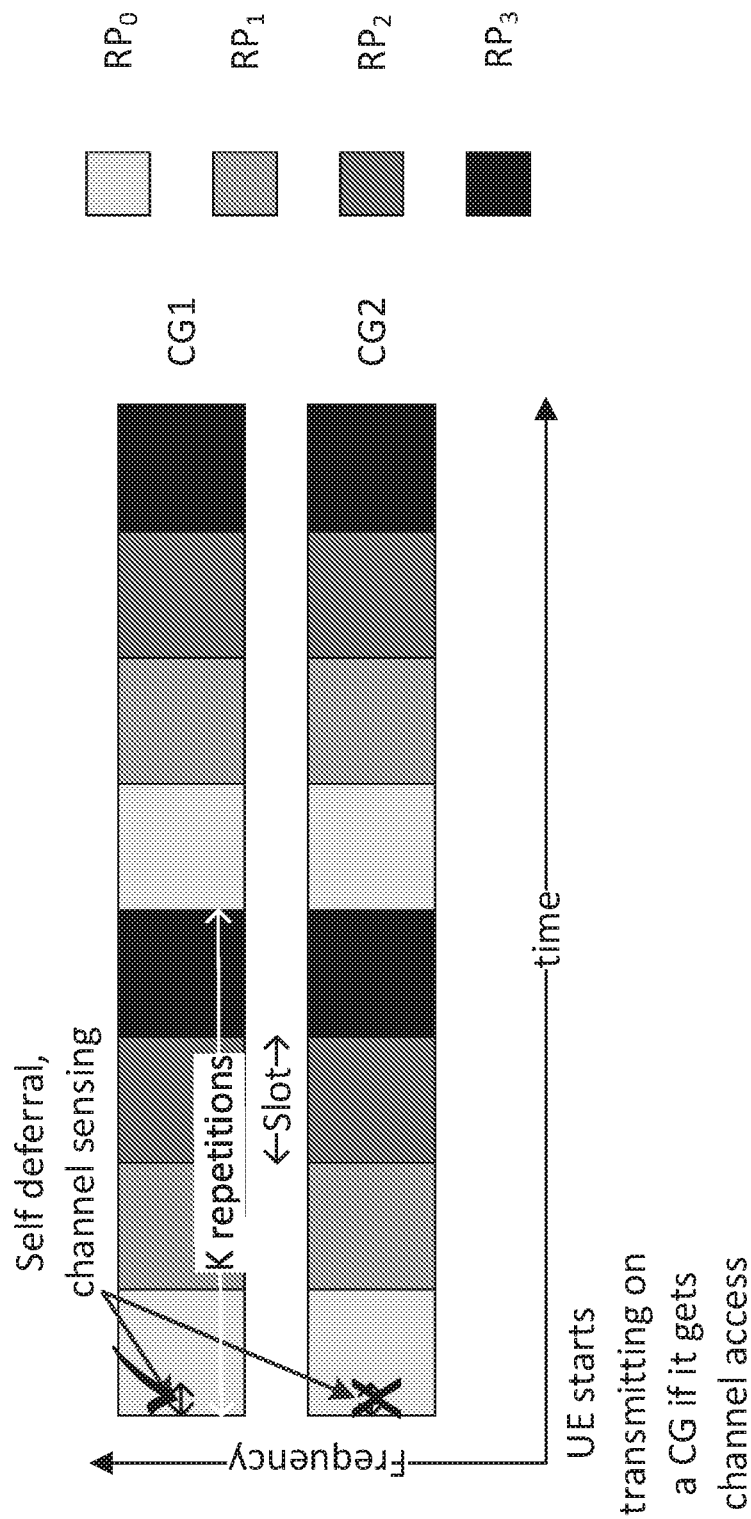
FIG. 67 illustrates an example of sensing-based CG selection.

The UE may sense the channel for the first transmission of a HARQ process. If the channel is not available, the UE may select another CG where it can get channel access to transmit at least k repetitions (k<=K). The concept is shown in FIG. 67. Here the UE obtains access to CG1 but does not get access to CG2; so, it transmits on CG1 and completes K=4 repetitions on CG1.

The self-deferral based backoff may be randomly generated from a set of pre-defined or pre-configured list of random values from a value greater than 0 to multiple OS including fractions of a symbol. Due to self-deferral, some OS may not be available for UL transmission. Therefore, the UE may rate match the PUSCH accordingly. However, the repetitions may have more OS and the UE will rate match to those resources.

In fractional self-deferral, the UE may use CP extension of the next symbol to occupy the fraction of the OS.

The UEs may use a random backoff to obtain channel access so that the likelihood of collision is minimized. The UE may attempt simultaneous channel access to multiple CGs in one of the following ways.

- The UE generates a single self-deferral value up to which it senses the channel on all the CGs. If it finds one or more CGs to be available, it selects one CG for transmission. The concept is shown in FIG. 68A.
- The UE generates multiple self-deferral values, one for each CG. It senses each channel using the corresponding self-deferral value. The UE may select the CG for which the channel is available with the least latency. The concept is shown in FIG. 68B.

If a UE must switch to a different CG, the UE must perform channel sensing for that CG. On a CG accessed by the UE, the UE may transmit in one of the following ways.

Figure 69A:
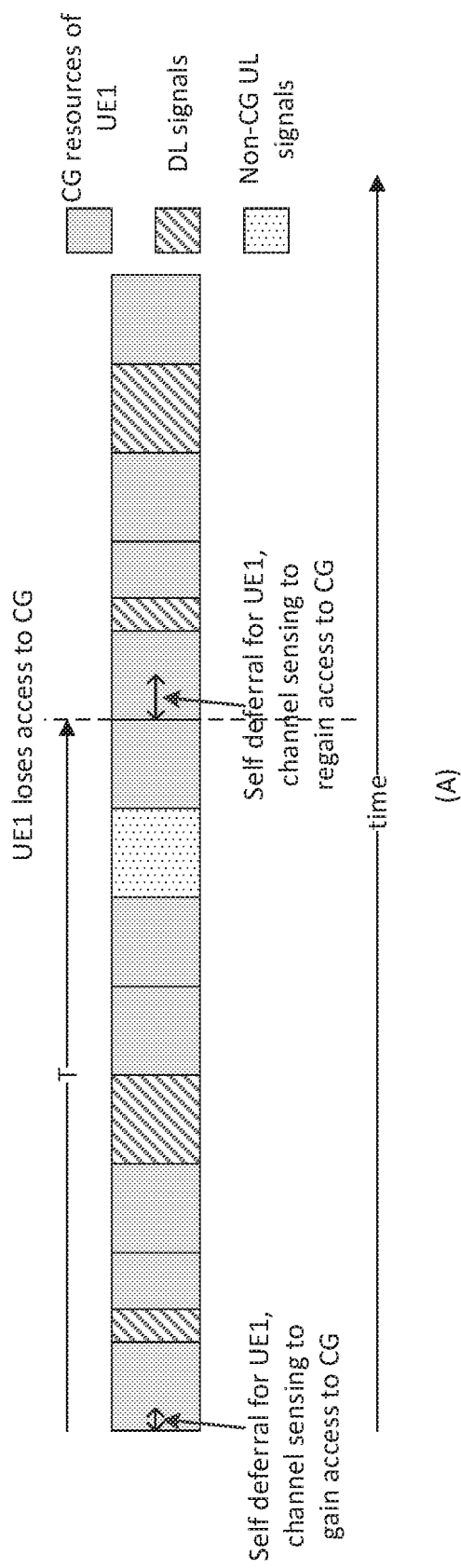
FIG. 69A illustrates an example where a UE gains channel access to a CG for certain duration—Fixed time T.
Figure 69B:
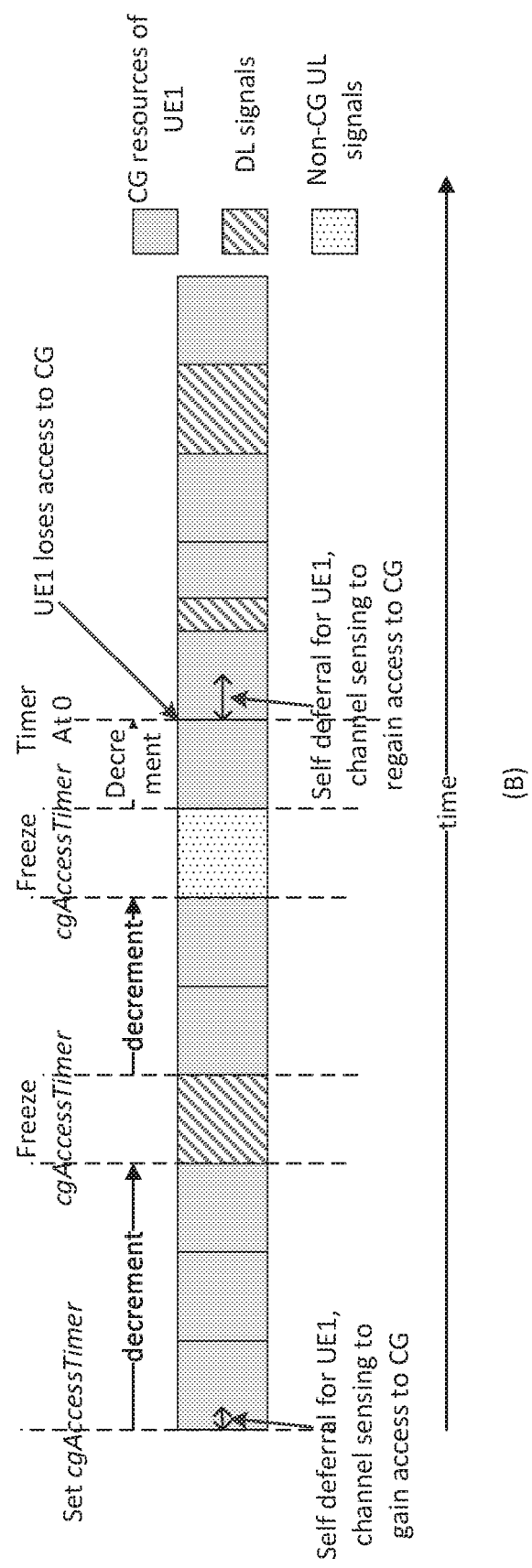
FIG. 69B illustrates an example where a UE gains channel access to a CG for certain duration—Timer based access.

- UE may transmit for time T on the CG, after which it exits the CG. To regain access to the CG, it must perform sensing again. The concept is shown in FIG. 69A. This ensures that other UEs also get an opportunity to access those resources. The gNB configures T through RRC to the UE. The configuration may be per CG if the UE has multiple CGs.
- Alternatively, the UE may use a timer 'cgAccessTimer' which is set at the start of the CG access or on getting access to the CG. cgAccessTimer is decremented during the time the CG is used. cgAccessTimer is frozen during the intermittent DL and non-CG UL resources. When cgAccessTimer expires, the UE exists the CG and has to sense the channel to regain access to it. This ensures that the UE gets enough resources if the intermittent DL or non-CG UL resources are significant during the channel access. The concept is shown in FIG. 69B.

UE may transmit up to N HARQ processes along with its repetitions K on the CG after which it exits the CG. The gNB configures N and K through RRC to the UE. The configuration may be per CG if the UE has multiple CGs.

Figure 70:
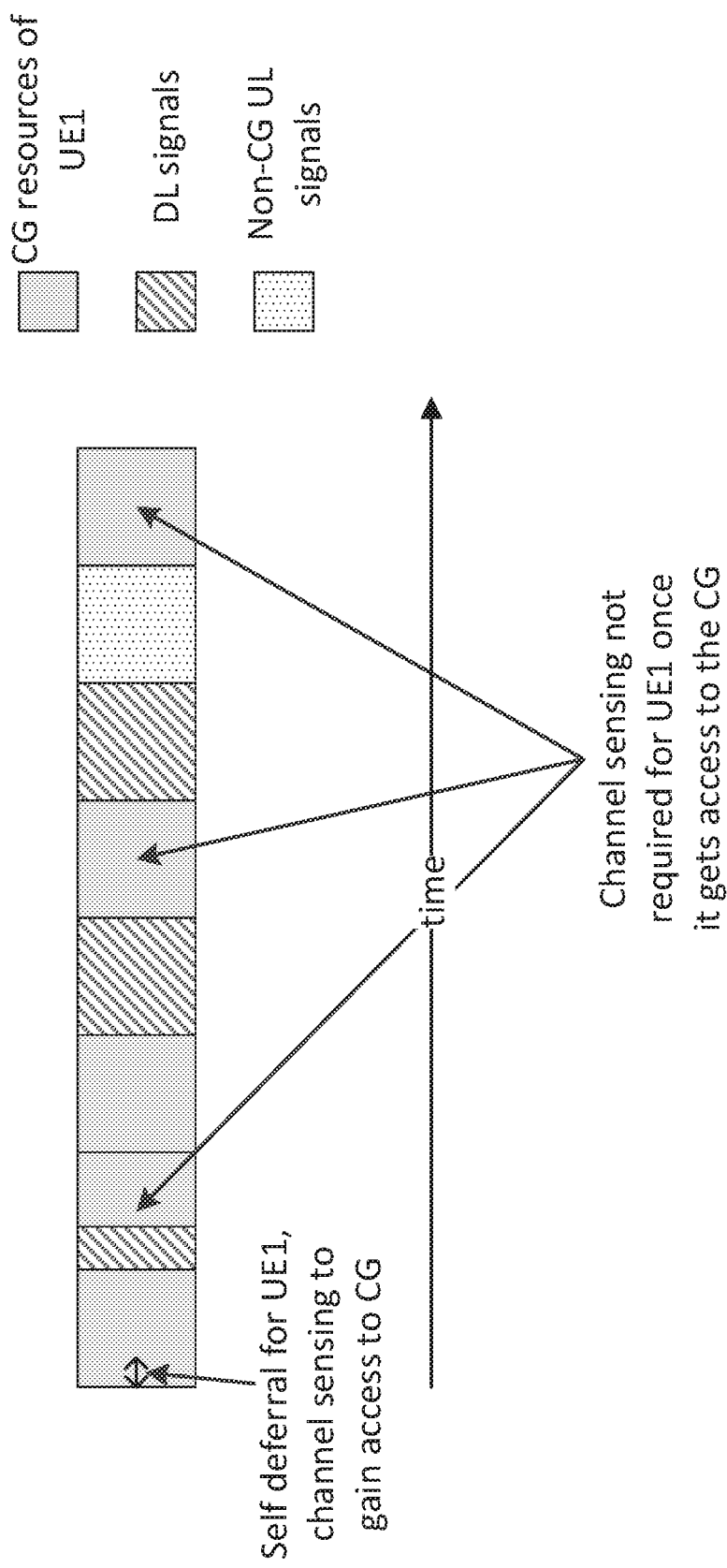
FIG. 70 illustrates an example where channel sensing is not required in CG resources once channel access is obtained.

Once the UE gets access to the channel for a CG, it may transmit its UL without self-deferral on the resources even if there are DL signals or scheduled UL resources between transmissions as shown in FIG. 70. Here the UE does self-deferral in the slot0 and get access to the CG resource. Even though intermittent DL and non-CG UL symbols/slots occur, the UE has access to other CG resources without needs to sense the channel.

Other UEs that may attempt to access resources of the UE1's CG have non-zero self-deferral and will detect UE1's transmission and refrain from transmitting and colliding on those resources.

Figure 71:
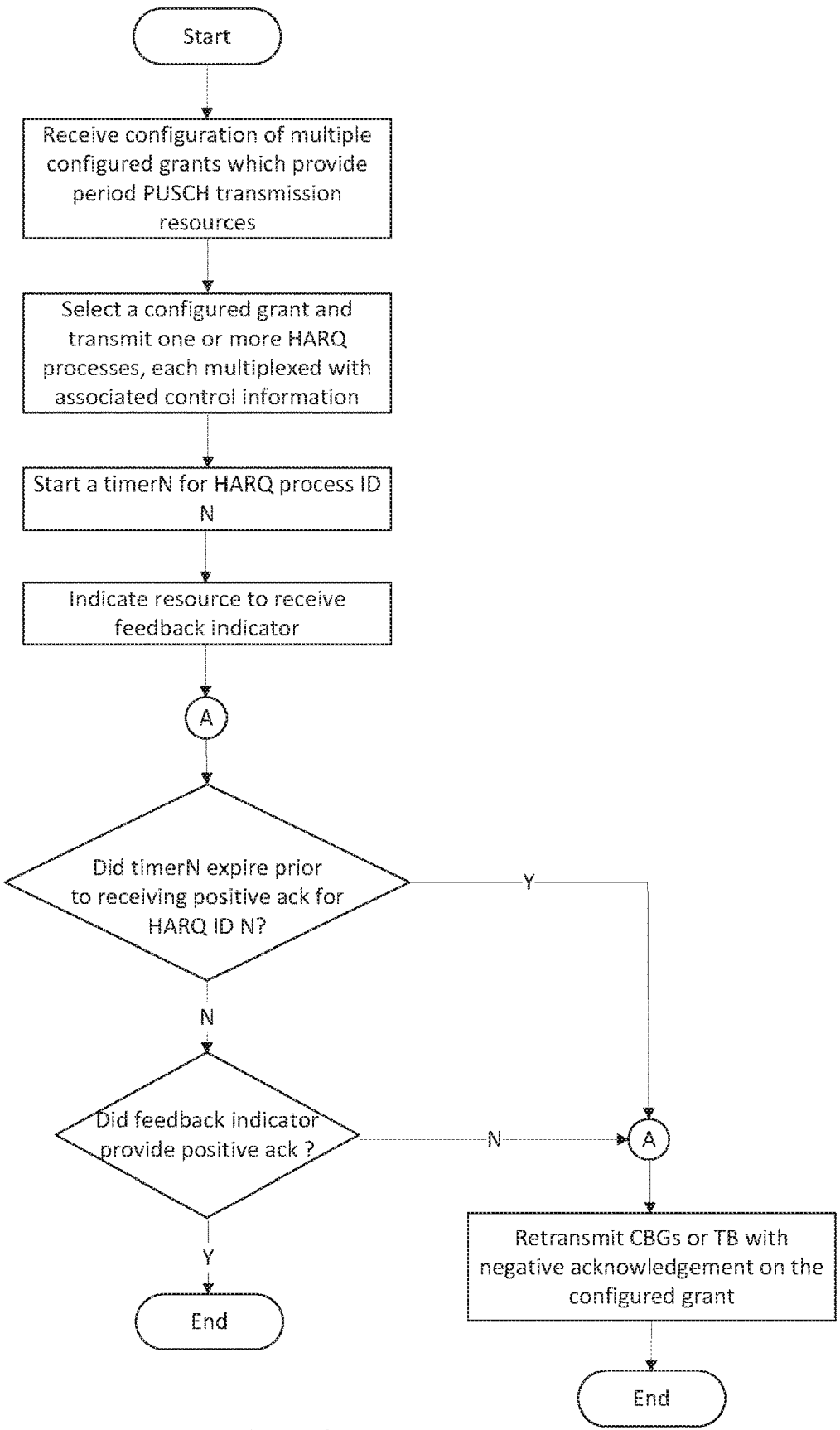
FIG. 71 illustrates an example UE procedure for selecting a configured grant to transmit a HARQ process, receive feedback and retransmit the HARQ process in the event of negative acknowledgement.

Based on the above, an embodiment is provided below for one way to operate the communication system. The UE procedure is shown in FIG. 71. The gNB configures the UE with one or more configured grants for PUSCH transmission. A configured grant provides time-frequency resources for the PUSCH. The time resources may be periodic. Additionally, the time resources are expected to be contiguous for unlicensed channel operation so that the device can get channel access and perform contiguous PUSCH transmission after which it relinquishes channel access. Having selected a transmission time opportunity in a configured grant resource, the UE transmits one or more HARQ process. The UE indicates one or more of the HARQ process ID, its redundancy version and new data indicator information for the HARQ process on a control channel. The control channel may be multiplexed with the PUSCH resources, so that the gNB can decode the control information on the control channel and accordingly decode data on PUSCH. The UE may also send its identification in the form of a Radio Network Temporary Identifier (RNTI) through the control channel.

The UE receives feedback for one or more PUSCH HARQ processes on a feedback-indicator from the gNB. If a NACK is indicated for a HARQ process to the UE, the UE may retransmit the HARQ process on a configured grant. The UE may consider that a NACK if it receives an explicit negative acknowledgement from the gNB either through the feedback indicator or from a dynamic scheduling of a retransmission of that HARQ process ID through a scheduled grant or through the absence of an indication for a configured duration of time. The UE tracks this time duration through one timer per transmitted HARQ process ID. The timer is set when the HARQ process is transmitted via PUSCH. If the timer expires but no feedback is received, that HARQ process may be retransmitted on a configured grant. The configured grant for the retransmission need not be the same as that used for the first transmission.

The ACK/NACK on the feedback indicator may be provided as a bitmap where each bit denotes the acknowledgement per code block group CBG of one or more transport blocks (TB) for the HARQ process. The UE may retransmit only the CBGs of HARQ process that were negatively acknowledged and the UE may indicate the included CBGs in the control information on the control channel.

In some applications, the UE may indicate the resource on which the feedback indicator may be transmitted by the gNB. The UE may indicate this resource through the control channel multiplexed with PUSCH. The UE may indicate this information on multiple PUSCH transmissions in the configured grant through the respective control channels. The feedback may include acknowledgements for multiple HARQ processes, including HARQ processes that may have been transmitted through dynamically scheduled grants. The feedback indicator may also provide other information to the UE such as a command to adjust its power for PUSCH transmission. The feedback indicator may carry an identifier specific to the UE and may be the same as the RNTI used by the UE for control channel transmission.

Another embodiment of a wireless system is provided where the gNB configures the UE with multiple configured grants, each identified by a 'configured grant ID'. The multiple configured grants may be configured as a group of grants with multiple common parameters. At least some parameters would be different between the grants in such as a group—for example, configured grant ID and DMRS would be configured separately for each configured grant. The multiple configured grants may be activated jointly. The multiple configured grants may be deactivated jointly. The UE may autonomously select a configured grant for transmitting one or more HARQ processes of PUSCH. The Demodulation reference signal (DMRS) of the PUSCH transmitted on the configured grant is associated with the configured grant ID. Thus, on receiving the DMRS, the gNB can determine the autonomously selected configured grant. The UE may transmit the configured grant ID of the selected configured grant through control information multiplexed with the PUSCH resources.

The 3rd Generation Partnership Project (3GPP) develops technical standards for cellular telecommunications network technologies, including radio access, the core transport network, and service capabilities—including work on codecs, security, and quality of service. Recent radio access technology (RAT) standards include WCDMA (commonly referred as 3G), LTE (commonly referred as 4G), and LTE-Advanced standards. 3GPP has begun working on the standardization of next generation cellular technology, called New Radio (NR), which is also referred to as "5G". 3GPP NR standards development is expected to include the definition of next generation radio access technology (new RAT), which is expected to include the provision of new flexible radio access below 6 GHz, and the provision of new ultra-mobile broadband radio access above 6 GHz. The flexible radio access is expected to consist of a new, non-backwards compatible radio access in new spectrum below 6 GHz, and it is expected to include different operating modes that may be multiplexed together in the same spectrum to address a broad set of 3GPP NR use cases with diverging requirements. The ultra-mobile broadband is expected to include cmWave and mmWave spectrum that will provide the opportunity for ultra-mobile broadband access for, e.g., indoor applications and hotspots. In particular, the ultra-mobile broadband is expected to share a common design framework with the flexible radio access below 6 GHz, with cmWave and mmWave specific design optimizations.

3GPP has identified a variety of use cases that NR is expected to support, resulting in a wide variety of user experience requirements for data rate, latency, and mobility. The use cases include the following general categories: enhanced mobile broadband (e.g., broadband access in dense areas, indoor ultra-high broadband access, broadband access in a crowd, 50+ Mbps everywhere, ultra-low cost broadband access, mobile broadband in vehicles), critical communications, massive machine type communications, network operation (e.g., network slicing, routing, migration and interworking, energy savings), and enhanced vehicle-to-everything (eV2X) communications. Specific service and applications in these categories include, e.g., monitoring and sensor networks, device remote controlling, bi-directional remote controlling, personal cloud computing, video streaming, wireless cloud-based office, first responder connectivity, automotive ecall, disaster alerts, real-time gaming, multi-person video calls, autonomous driving, augmented reality, tactile internet, and virtual reality to name a few. All of these use cases and others are contemplated herein.

Figure 72:
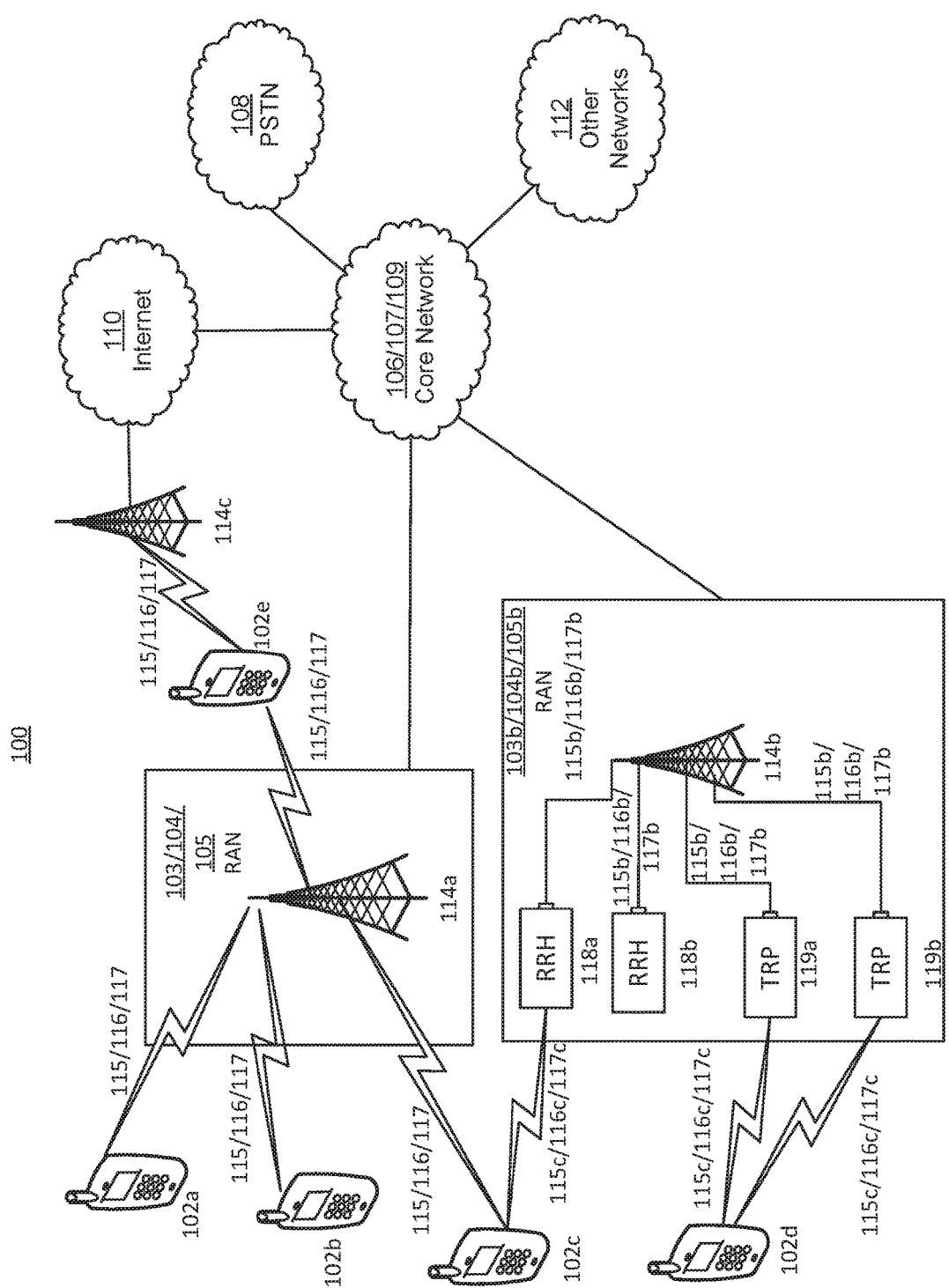
FIG. 72 illustrates an example communications system.

FIG. 72 illustrates one embodiment of an example communications system 100 in which the methods and apparatuses described and claimed herein may be embodied. As shown, the example communications system 100 may include wireless transmit/receive units (WTRUs) 102a, 102b, 102c, and/or 102d (which generally or collectively may be referred to as WTRU 102), a radio access network (RAN) 103/104/105/103b/104b/105b, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d, 102e may be any type of apparatus or device configured to operate and/or communicate in a wireless environment. Although each WTRU 102a, 102b, 102c, 102d, 102e is depicted in FIGS. 72-76 as a hand-held wireless communications apparatus, it is understood that with the wide variety of use cases contemplated for 5G wireless communications, each WTRU may comprise or be embodied in any type of apparatus or device configured to transmit and/or receive wireless signals, including, by way of example only, user equipment (UE), a mobile station, a fixed or mobile subscriber unit, a pager, a cellular telephone, a personal digital assistant (PDA), a smartphone, a laptop, a tablet, a netbook, a notebook computer, a personal computer, a wireless sensor, consumer electronics, a wearable device such as a smart watch or smart clothing, a medical or eHealth device, a robot, industrial equipment, a drone, a vehicle such as a car, truck, train, or airplane, and the like.

The communications system 100 may also include a base station 114a and a base station 114b. Base stations 114a may be any type of device configured to wirelessly interface with at least one of the WTRUs 102a, 102b, 102c to facilitate access to one or more communication networks, such as the core network 106/107/109, the Internet 110, and/or the other networks 112. Base stations 114b may be any type of device configured to wiredly and/or wirelessly interface with at least one of the RRHs (Remote Radio Heads) 118a, 118b and/or TRPs (Transmission and Reception Points) 119a, 119b to facilitate access to one or more communication networks, such as the core network 106/107/109, the Internet 110, and/or the other networks 112. RRHs 118a, 118b may be any type of device configured to wirelessly interface with at least one of the WTRU 102c, to facilitate access to one or more communication networks, such as the core network 106/107/109, the Internet 110, and/or the other networks 112. TRPs 119a, 119b may be any type of device configured to wirelessly interface with at least one of the WTRU 102d, to facilitate access to one or more communication networks, such as the core network 106/107/109, the Internet 110, and/or the other networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114b may be part of the RAN 103b/104b/105b, which may also include other base stations and/or network elements (not shown), such as a base station controller (BSC), a radio network controller (RNC), relay nodes, etc. The base station 114a may be configured to transmit and/or receive wireless signals within a particular geographic region, which may be referred to as a cell (not shown). The base station 114b may be configured to transmit and/or receive wired and/or wireless signals within a particular geographic region, which may be referred to as a cell (not shown). The cell may further be divided into cell sectors. For example, the cell associated with the base station 114a may be divided into three sectors. Thus, in an embodiment, the base station 114a may include three transceivers, e.g., one for each sector of the cell. In an embodiment, the base station 114a may employ multiple-input multiple output (MIMO) technology and, therefore, may utilize multiple transceivers for each sector of the cell.

The base stations 114a may communicate with one or more of the WTRUs 102a, 102b, 102c over an air interface 115/116/117, which may be any suitable wireless communication link (e.g., radio frequency (RF), microwave, infrared (IR), ultraviolet (UV), visible light, cmWave, mmWave, etc.). The air interface 115/116/117 may be established using any suitable radio access technology (RAT).

The base stations 114b may communicate with one or more of the RRHs 118a, 118b and/or TRPs 119a, 119b over a wired or air interface 115b/116b/117b, which may be any suitable wired (e.g., cable, optical fiber, etc.) or wireless communication link (e.g., radio frequency (RF), microwave, infrared (IR), ultraviolet (UV), visible light, cmWave, mmWave, etc.). The air interface 115b/116b/117b may be established using any suitable radio access technology (RAT).

The RRHs 118a, 118b and/or TRPs 119a, 119b may communicate with one or more of the WTRUs 102c, 102d over an air interface 115c/116c/117c, which may be any suitable wireless communication link (e.g., radio frequency (RF), microwave, infrared (IR), ultraviolet (UV), visible light, cmWave, mmWave, etc.). The air interface 115c/116c/117c may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c, or RRHs 118a, 118b and TRPs 119a, 119b in the RAN 103b/104b/105b and the WTRUs 102c, 102d, may implement a radio technology such as Universal Mobile Telecommunications System (UMTS) Terrestrial Radio Access (UTRA), which may establish the air interface 115/116/117 or 115c/116c/117c respectively using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In an embodiment, the base station 114a and the WTRUs 102a, 102b, 102c, or RRHs 118a, 118b and TRPs 119a, 119b in the RAN 103b/104b/105b and the WTRUs 102c, 102d, may implement a radio technology such as Evolved UMTS Terrestrial Radio Access (E-UTRA), which may establish the air interface 115/116/117 or 115c/116c/117c respectively using Long Term Evolution (LTE) and/or LTE-Advanced (LTE-A). In the future, the air interface 115/116/117 may implement 3GPP NR technology.

In an embodiment, the base station 114a in the RAN 103/104/105 and the WTRUs 102a, 102b, 102c, or RRHs 118a, 118b and TRPs 119a, 119b in the RAN 103b/104b/105b and the WTRUs 102c, 102d, may implement radio technologies such as IEEE 802.16 (e.g., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114c in FIG. 72 may be a wireless router, Home Node B, Home eNode B, or access point, for example, and may utilize any suitable RAT for facilitating wireless connectivity in a localized area, such as a place of business, a home, a vehicle, a campus, and the like. In an embodiment, the base station 114c and the WTRUs 102e, may implement a radio technology such as IEEE 802.11 to establish a wireless local area network (WLAN). In an embodiment, the base station 114c and the WTRUs 102d, may implement a radio technology such as IEEE 802.15 to establish a wireless personal area network (WPAN). In yet another embodiment, the base station 114c and the WTRUs 102e, may utilize a cellular-based RAT (e.g., WCDMA, CDMA2000, GSM, LTE, LTE-A, etc.) to establish a picocell or femtocell. As shown in FIG. 72, the base station 114b may have a direct connection to the Internet 110. Thus, the base station 114c may not be required to access the Internet 110 via the core network 106/107/109.

The RAN 103/104/105 and/or RAN 103b/104b/105b may be in communication with the core network 106/107/109, which may be any type of network configured to provide voice, data, applications, and/or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, video distribution, etc., and/or perform high-level security functions, such as user authentication.

Although not shown in FIG. 72, it will be appreciated that the RAN 103/104/105 and/or RAN 103b/104b/105b and/or the core network 106/107/109 may be in direct or indirect communication with other RANs that employ the same RAT as the RAN 103/104/105 and/or RAN 103b/104b/105b or a different RAT. For example, in addition to being connected to the RAN 103/104/105 and/or RAN 103b/104b/105b, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d, 102e to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 and/or RAN 103b/104b/105b or a different RAT.

Some or all of the WTRUs 102a, 102b, 102c, 102d in the communications system 100 may include multi-mode capabilities, e.g., the WTRUs 102a, 102b, 102c, 102d, and 102e may include multiple transceivers for communicating with different wireless networks over different wireless links. For example, the WTRU 102e shown in FIG. 72 may be configured to communicate with the base station 114a, which may employ a cellular-based radio technology, and with the base station 114c, which may employ an IEEE 802 radio technology.

Figure 73:
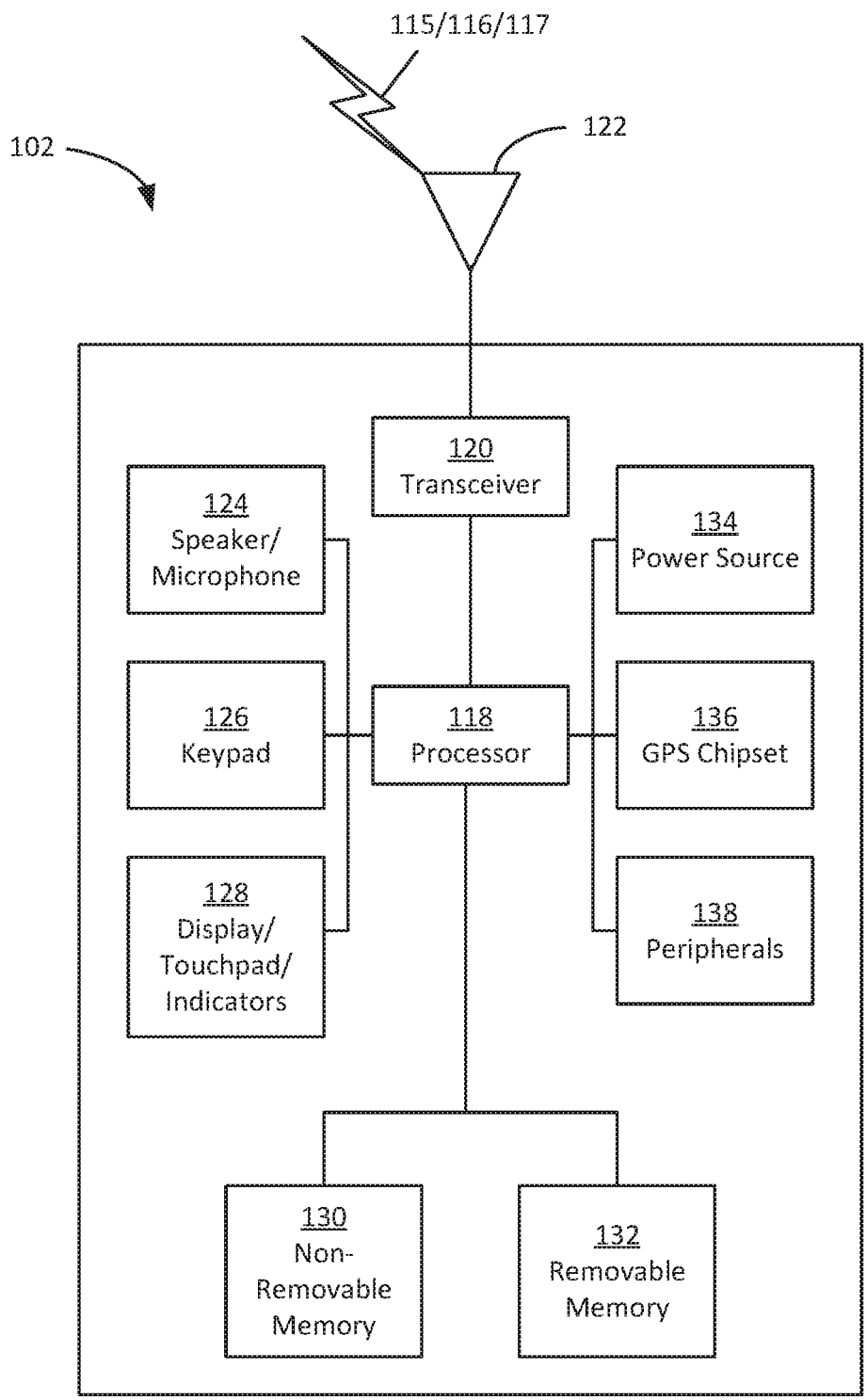
FIG. 73 is a block diagram of an example apparatus or device configured for wireless communications such as, for example, a wireless transmit/receive unit (WTRU).

FIG. 73 is a block diagram of an example apparatus or device configured for wireless communications in accordance with the embodiments illustrated herein, such as for example, a WTRU 102. As shown in FIG. 73, the example WTRU 102 may include a processor 118, a transceiver 120, a transmit/receive element 122, a speaker/microphone 124, a keypad 126, a display/touchpad/indicators 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 73 and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 73 depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in an embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet an embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 73 as a single element, the WTRU 102 may include any number of transmit/receive elements 122. More specifically, the WTRU 102 may employ MIMO technology. Thus, in an embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad/indicators 128 (e.g., a liquid crystal display (LCD) display unit or organic light-emitting diode (OLED) display unit). The processor 118 may also output user data to the speaker/microphone 124, the keypad 126, and/or the display/touchpad/indicators 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In an embodiment, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries, solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include various sensors such as an accelerometer, biometrics (e.g., finger print) sensors, an e-compass, a satellite transceiver, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The WTRU 102 may be embodied in other apparatuses or devices, such as a sensor, consumer electronics, a wearable device such as a smart watch or smart clothing, a medical or eHealth device, a robot, industrial equipment, a drone, a vehicle such as a car, truck, train, or airplane. The WTRU 102 may connect to other components, modules, or systems of such apparatuses or devices via one or more interconnect interfaces, such as an interconnect interface that may comprise one of the peripherals 138.

Figure 74:
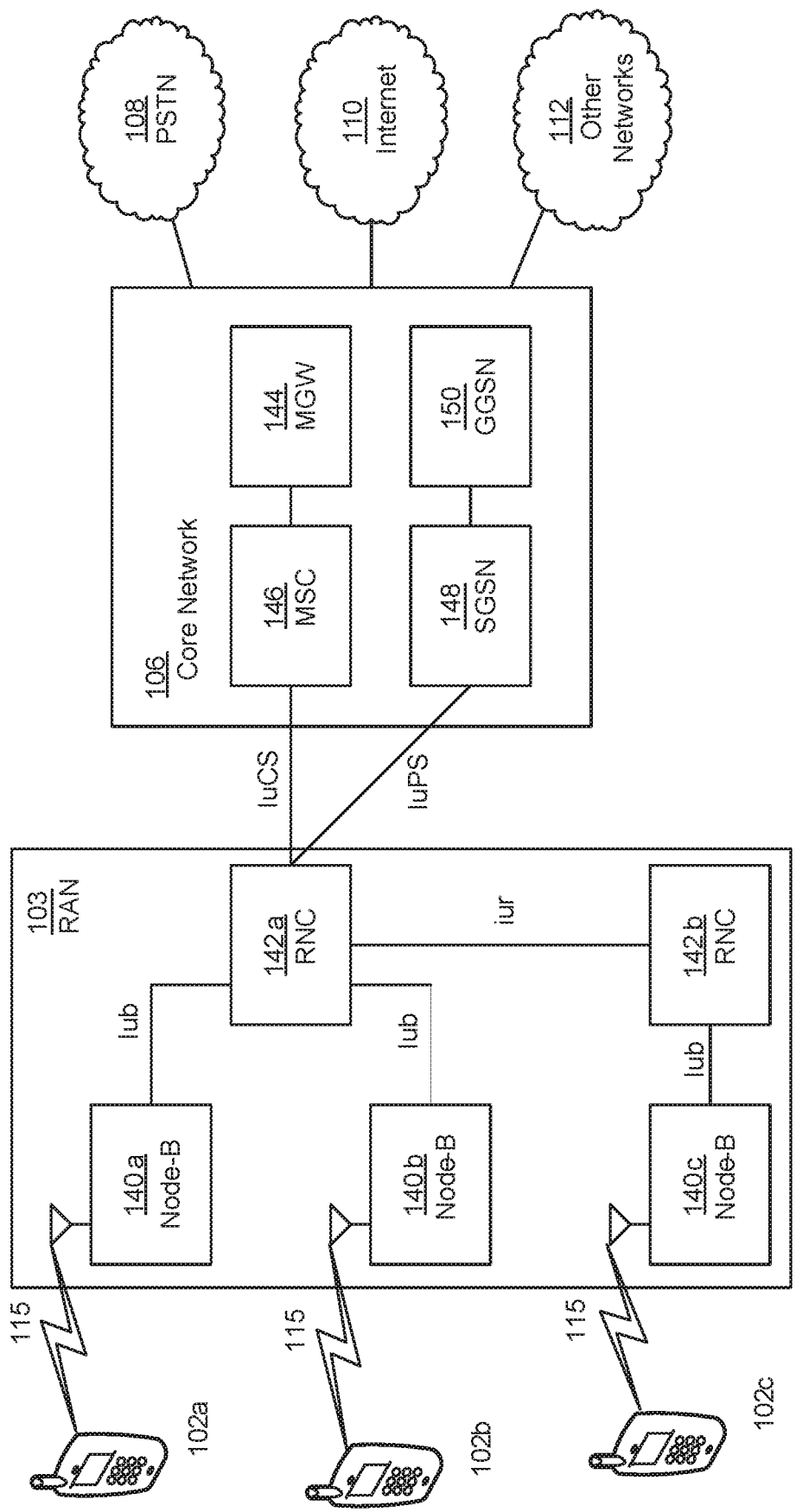
FIG. 74 is a system diagram of a first example radio access network (RAN) and core network.

FIG. 74 is a system diagram of the RAN 103 and the core network 106 according to an embodiment. As noted above, the RAN 103 may employ a UTRA radio technology to communicate with the WTRUs 102a, 102b, and 102c over the air interface 115. The RAN 103 may also be in communication with the core network 106. As shown in FIG. 74, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 74, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macro-diversity, security functions, data encryption, and the like.

The core network 106 shown in FIG. 74 may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 75:
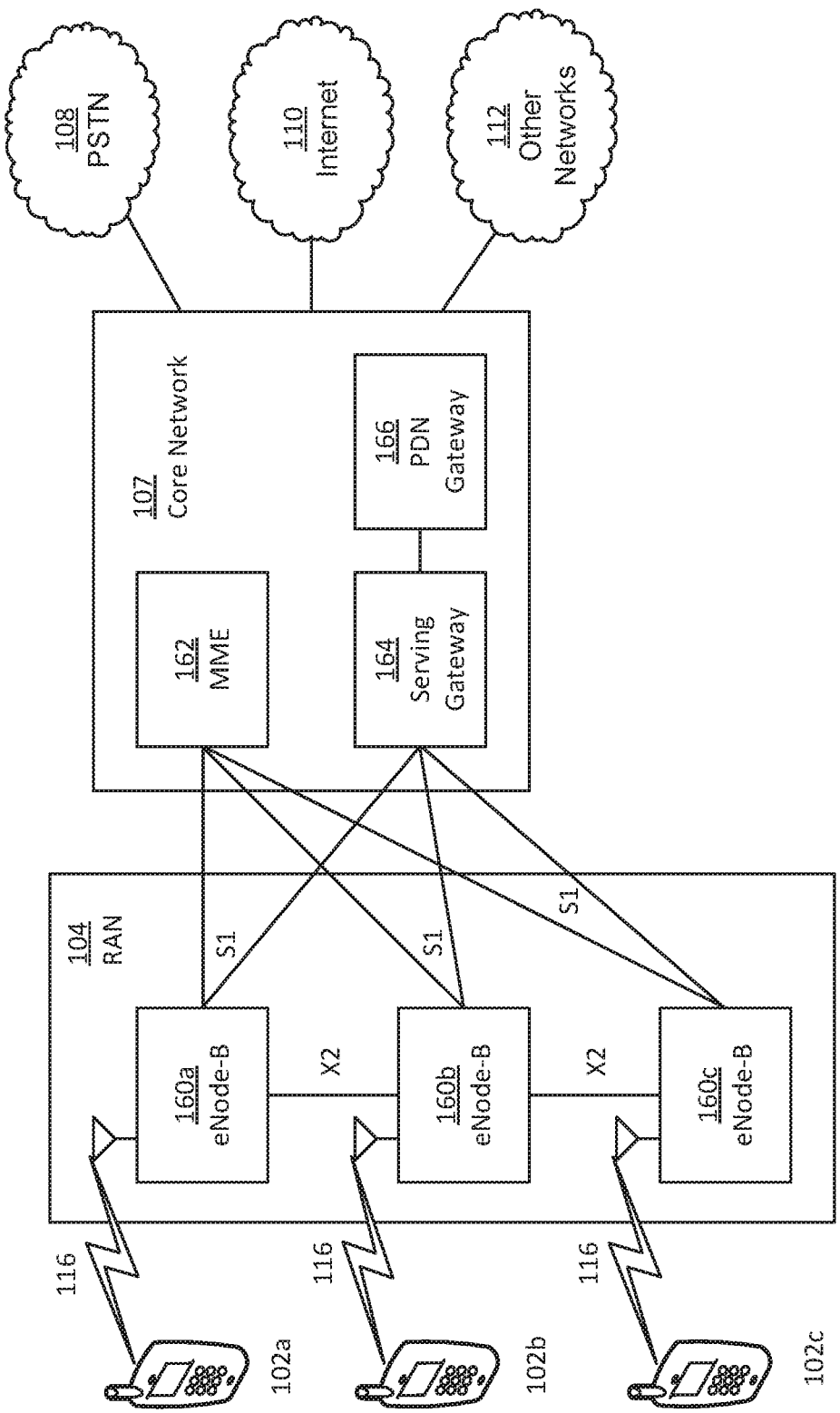
FIG. 75 is a system diagram of a second example radio access network (RAN) and core network.

FIG. 75 is a system diagram of the RAN 104 and the core network 107 according to an embodiment. As noted above, the RAN 104 may employ an E-UTRA radio technology to communicate with the WTRUs 102a, 102b, and 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In an embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, and 160c may be associated with a particular cell (not shown) and may be configured to handle radio resource management decisions, handover decisions, scheduling of users in the uplink and/or downlink, and the like. As shown in FIG. 75, the eNode-Bs 160a, 160b, 160c may communicate with one another over an X2 interface.

The core network 107 shown in FIG. 75 may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, and 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, and 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

Figure 76:
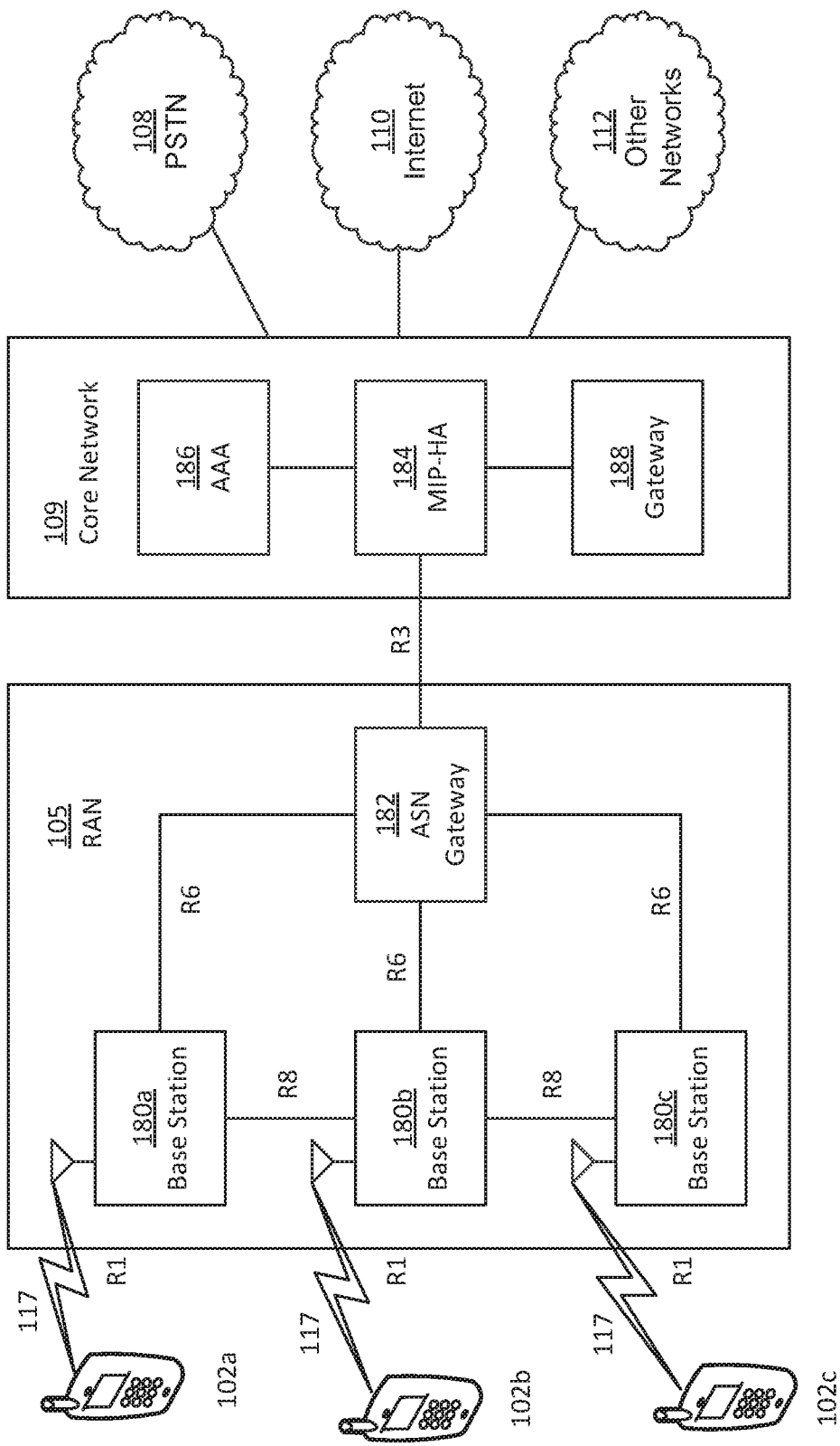
FIG. 76 is a system diagram of a third example radio access network (RAN) and core network.

FIG. 76 is a system diagram of the RAN 105 and the core network 109 according to an embodiment. The RAN 105 may be an access service network (ASN) that employs IEEE 802.16 radio technology to communicate with the WTRUs 102a, 102b, and 102c over the air interface 117. As will be further discussed below, the communication links between the different functional entities of the WTRUs 102a, 102b, 102c, the RAN 105, and the core network 109 may be defined as reference points.

As shown in FIG. 76, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell in the RAN 105 and may include one or more transceivers for communicating with the WTRUs 102a, 102b, 102c over the air interface 117. In an embodiment, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, and 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, and 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 76, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, and 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional land-line communications devices. In addition, the gateway 188 may provide the WTRUs 102a, 102b, 102c with access to the networks 112, which may include other wired or wireless networks that are owned and/or operated by other service providers.

Although not shown in FIG. 76, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks.

The core network entities described herein and illustrated in 71-75 are identified by the names given to those entities in certain existing 3GPP specifications, but it is understood that in the future those entities and functionalities may be identified by other names and certain entities or functions may be combined in future specifications published by 3GPP, including future 3GPP NR specifications. Thus, the particular network entities and functionalities described and illustrated in FIGS. 72-76 are provided by way of example only, and it is understood that the subject matter disclosed and claimed herein may be embodied or implemented in any similar communication system, whether presently defined or defined in the future.

Figure 77:
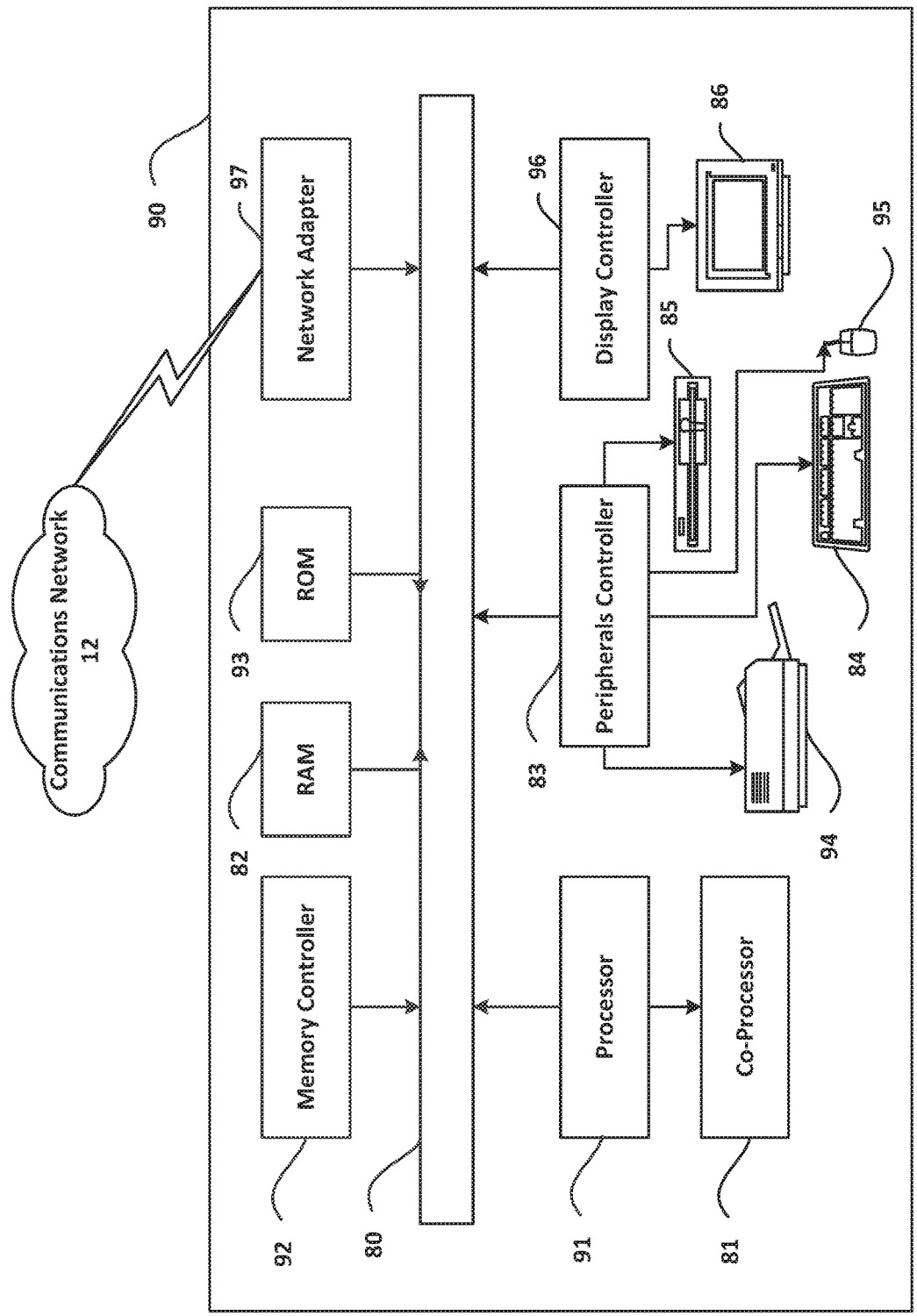
FIG. 77 is a block diagram of an exemplary computing system in which one or more apparatuses of communications networks may be embodied, such as certain nodes or functional entities in the RAN, core network, public switched telephone network (PSTN), Internet, or other networks.

FIG. 77 is a block diagram of an exemplary computing system 90 in which one or more apparatuses of the communications networks illustrated in FIGS. 72-76 may be embodied, such as certain nodes or functional entities in the RAN 103/104/105, Core Network 106/107/109, PSTN 108, Internet 110, or Other Networks 112. Computing system 90 may comprise a computer or server and may be controlled primarily by computer readable instructions, which may be in the form of software, wherever, or by whatever means such software is stored or accessed. Such computer readable instructions may be executed within a processor 91, to cause computing system 90 to do work. The processor 91 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 91 may perform signal coding, data processing, power control, input/output processing, and/or any other functionality that enables the computing system 90 to operate in a communications network. Coprocessor 81 is an optional processor, distinct from main processor 91, that may perform additional functions or assist processor 91. Processor 91 and/or coprocessor 81 may receive, generate, and process data related to the methods and apparatuses disclosed herein.

In operation, processor 91 fetches, decodes, and executes instructions, and transfers information to and from other resources via the computing system's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 may be read or changed by processor 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode may access only memory mapped by its own process virtual address space; it cannot access memory within another process's virtual address space unless memory sharing between the processes has been set up.

In addition, computing system 90 may contain peripherals controller 83 responsible for communicating instructions from processor 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. The visual output may be provided in the form of a graphical user interface (GUI). Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a network adapter 97, that may be used to connect computing system 90 to an external communications network, such as the RAN 103/104/105, Core Network 106/107/109, PSTN 108, Internet 110, or Other Networks 112 of FIGS. 72-76, to enable the computing system 90 to communicate with other nodes or functional entities of those networks. The communication circuitry, alone or in combination with the processor 91, may be used to perform the transmitting and receiving steps of certain apparatuses, nodes, or functional entities described herein.

It is understood that any or all of the apparatuses, systems, methods and processes described herein may be embodied in the form of computer executable instructions (e.g., program code) stored on a computer-readable storage medium which instructions, when executed by a processor, such as processors 118 or 91, cause the processor to perform and/or implement the systems, methods and processes described herein. Specifically, any of the steps, operations or functions described herein may be implemented in the form of such computer executable instructions, executing on the processor of an apparatus or computing system configured for wireless and/or wired network communications. Computer readable storage media include volatile and nonvolatile, removable and non-removable media implemented in any non-transitory (e.g., tangible or physical) method or technology for storage of information, but such computer readable storage media do not includes signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which may be used to store the desired information and which may be accessed by a computing system.

APPENDIX

TABLE 1

| Abbreviations | |
|---|---|
| AUL | Autonomous UpLink |
| AUL-UCI | Autonomous UpLink-Uplink Control Information |
| AUL-DFI | Autonomous UpLink-Downlink Feedback Information |
| BWP | Bandwidth Part |
| CA | Carrier Aggregation |
| CCI | Composite Carrier Indicator |
| CBRA | Contention Based Random Access |
| CBG | Code Block Group |
| CBGTI | Code Block Group Transmission Indication |
| CBW | Carrier Bandwidth |
| CCA | Clear Channel Assessment |
| CFRA | Contention Free Random Access |
| CG | Configured Grant |
| COT | Channel Occupancy Time |
| CORESET | Control Resource SET |
| C-RNTI | Cell Radio-Network Temporary Identifier |
| CSI-RS | Channel State Information Reference Signal |
| CWS | Contention Window Size |
| DC | Dual Connectivity |
| DCI | Downlink Control Information |
| DL | Downlink |
| DL-SCH | Downlink Shared Channel |
| DRS | Discovery Reference Signal |
| ED | Energy Detection |
| eLAA | evolved License Assisted Access |
| eMBB | enhanced Mobile Broadband |
| eNB | Evolved Node B |
| eURLLC | enhanced Ultra Reliable Low Latency COmmunications |
| feLAA | further evolved License Assisted Access |
| FDD | Frequency Division Duplex |
| FDM | Frequency Division Multiplexing |
| gNB | NR NodeB |
| HARQ | Hybrid ARQ |
| HRLLC | Highly reliable low latency communications |
| IE | Information Element |
| KPI | Key Performance Indicators |
| L1 | Layer 1 |
| L2 | Layer 2 |
| L3 | Layer 3 |
| LAA | License Assisted Access |
| LBT | Listen before talk |
| LTE | Long Term Evolution |
| MAC | Medium Access Control |
| MCS | Modulation and Coding Scheme |
| MIB | Master Information Block |
| MCOT | Maximum Channel Occupancy Time |
| MTC | Machine-Type Communications |
| mMTC | Massive Machine Type Communication |
| NR | New Radio |
| NR-AUL | New Radio - Autonomous UpLink |

TABLE 1-continued

| Abbreviations | |
|---|---|
| NR-AUL-UCI | New Radio - Autonomous UpLink-Uplink Control Information |
| NR-AUL-DFI | New Radio - Autonomous UpLink-Downlink Feedback Information |
| NR-U | NR Unlicensed |
| OFDM | Orthogonal Frequency Division Multiplexing |
| OS | OFDM Symbol |
| PCell | Primary Cell |
| PHY | Physical Layer |
| PUSCH | Physical Uplink Shared CHannel |
| PRACH | Physical Random Access Channel |
| RACH | Random Access Channel |
| RAN | Radio Access Network |
| RAT | Radio Access Technology |
| RMSI | ReMaining System Information |
| RRC | Radio Resource Control |
| RRM | Radio Resource Monitoring |
| RV | Redundancy Version |
| S-UL | Scheduled UL |
| SCell | Secondary Cell |
| SDU | Service Data Unit |
| SI | System Information |
| SIB | System Information Block |
| SR | Scheduling Request |
| SS | Synchronization Signal |
| SSB | SS Block |
| SS/PBCH | Synchronization Signal/Physical Broadcast CHannel |
| TDD | Time Division Duplex |
| TDM | Time Division Multiplexing |
| TRP | Transmission and Reception Point |
| TTI | Transmission Time Interval |
| UCI | Uplink Control Information |
| UE | User Equipment |
| UL | Uplink |
| UL-SCH | Uplink Shared Channel |
| URLLC | Ultra-Reliable and Low Latency Communications |

TABLE 2

PUSCH time domain resource allocation for group-grant with four grants

| Row index | PUSCH mapping type | S | L | $K_2$ for grant-1 | $K_2$ for grant-2 | $K_2$ for grant-3 | $K_2$ for grant-4 |
|---|---|---|---|---|---|---|---|
| 1 | Type A | 0 | 14 | 1 | 2 | 3 | 0 |
| 2 | Type A | 0 | 12 | 1 | 2 | 3 | 0 |
| 3 | Type A | 0 | 10 | 1 | 2 | 3 | 0 |
| 4 | Type B | 2 | 10 | 1 | 2 | 3 | 0 |
| 5 | Type B | 4 | 10 | 1 | 2 | 3 | 0 |
| 6 | Type B | 4 | 8 | 1 | 2 | 3 | 0 |
| 7 | Type B | 4 | 6 | 1 | 2 | 3 | 0 |
| 8 | Type A | 0 | 14 | 1 | 2 | 3 | 0 |
| 9 | Type A | 0 | 12 | 1 | 2 | 3 | 0 |
| 10 | Type A | 0 | 10 | 1 | 2 | 3 | 0 |
| 11 | Type A | 0 | 14 | 1 | 2 | 3 | 0 |
| 12 | Type A | 0 | 12 | 1 | 2 | 3 | 0 |
| 13 | Type A | 0 | 10 | 1 | 2 | 3 | 0 |
| 14 | Type B | 8 | 6 | 1 | 2 | 3 | 0 |
| 15 | Type A | 0 | 14 | 1 | 2 | 3 | 0 |
| 16 | Type A | 0 | 10 | 1 | 2 | 3 | 0 |

TABLE 3

PUSCH time domain resource allocation for group-grant

| Row index | PUSCH mapping type | S | L | K₂ for grant-1 | K₂ for grant-2 | K₂ for grant-3 | K₂ for grant-4 |
|---|---|---|---|---|---|---|---|
| 1 | Type A | 0 | 14 | 1 | 2 | x | x |
| 2 | Type A | 0 | 12 | 1 | 2 | x | x |
| 3 | Type A | 0 | 10 | 1 | 2 | x | x |
| 4 | Type B | 2 | 10 | 1 | 2 | x | x |
| 5 | Type B | 4 | 10 | 1 | 2 | x | x |
| 6 | Type B | 4 | 8 | 1 | 2 | x | x |
| 7 | Type B | 4 | 6 | 1 | 2 | x | x |
| 8 | Type A | 0 | 14 | 1 | 2 | x | x |
| 9 | Type A | 0 | 12 | 1 | 2 | 3 | 0 |
| 10 | Type A | 0 | 10 | 1 | 2 | 3 | 0 |
| 11 | Type A | 0 | 14 | 1 | 2 | 3 | 0 |
| 12 | Type A | 0 | 12 | 1 | 2 | 3 | 0 |
| 13 | Type A | 0 | 10 | 1 | 2 | 3 | 0 |
| 14 | Type B | 8 | 6 | 1 | 2 | 3 | 0 |
| 15 | Type A | 0 | 14 | 1 | 2 | 3 | 0 |
| 16 | Type A | 0 | 10 | 1 | 2 | 3 | 0 |

```
-- ASN1START
-- TAG-CONFIGUREDGRANTCONFIG-START
GrantGroupConfig ::=            SEQUENCE {
ID                              INTEGER(1..G),      -- Group-grant ID
frequencyHopping                ENUMERATED {mode1, mode2}        OPTIONAL, -- Need S,
cg-DMRS-Configuration               DMRS-UplinkConfig1, DMRS-UplinkConfig2 .. DMRS-
                                    UplinkConfigG-- G DMRS configs
mcs-Table                       ENUMERATED {qam256, spare1}         OPTIONAL,  -- Need S
mcs-TableTransformPrecoder      ENUMERATED {qam256, spare1}       OPTIONAL,  -- Need S
uci-OnPUSCH                     SetupRelease { CG-UCI-OnPUSCH },
resourceAllocation              ENUMERATED { resourceAllocationType0, resourceAllocationType1, dynamicSwitch },
rbg-Size                        ENUMERATED {config2}            OPTIONAL,  -- Need S
powerControlLoopToUse           ENUMERATED {n0, n1},
p0-PUSCH-Alpha                  P0-PUSCH-AlphaSetId,
transformPrecoder               ENUMERATED {enabled}            OPTIONAL,  -- Need S
nrofHARQ-Processes              INTEGER(1..16),
repK                            ENUMERATED {n1, n2, n4, n8},
repK-RV                         ENUMERATED {s1-0231, s2-0303, s3-0000}   OPTIONAL,
                                -- Cond RepK
periodicity                     ENUMERATED {
    sym2, sym7, sym1x14, sym2x14, sym4x14, sym5x14, sym8x14,
    sym10x14, sym16x14, sym20x14,
    sym32x14, sym40x14, sym64x14, sym80x14, sym128x14,
    sym160x14, sym256x14, sym320x14, sym512x14,
    sym640x14, sym1024x14, sym1280x14, sym2560x14,
    sym5120x14,
    sym6, sym1x12, sym2x12, sym4x12, sym5x12, sym8x12,
    sym10x12, sym16x12, sym20x12, sym32x12,
    sym40x12, sym64x12, sym80x12, sym128x12, sym160x12,
    sym256x12, sym320x12, sym512x12, sym640x12,
    sym1280x12, sym2560x12
},
configuredGrantTimer            INTEGER (1..64)         OPTIONAL,  -- Need R
rrc-ConfiguredUplinkGrant       SEQUENCE {
    timeDomainOffset            INTEGER (0..5119),  INTEGER (0..5119), ... INTEGER (0..5119),-- G
    timeDOmain Offsets for G grants
    timeDomainAllocation        INTEGER (0..15),
    frequencyDomainAllocation   BIT STRING (SIZE(18)),
    antennaPort                 INTEGER  (0..31),
    dmrs-SeqInitialization      INTEGER  (0..1)
                                                OPTIONAL, -- Cond NoTransformPrecoder
    precodingAndNumberOfLayers  INTEGER  (0..63),
    srs-ResourceIndicator       INTEGER  (0..15),
    mcsAndTBS                   INTEGER  (0..31),
    frequencyHoppingOffset      INTEGER (1.. maxNrofPhysicalResourceBlocks-1)
                                            OPTIONAL,   -- Need M
    pathlossReferenceIndex      INTEGER (0..maxNrofPUSCH-PathlossReferenceRSs-1),
    ...
}
                                            OPTIONAL -- Need R
}
CG-UCI-OnPUSCH ::= CHOICE {
dynamic                         SEQUENCE (SIZE (1..4)) OF BetaOffsets,
semiStatic                      BetaOffsets
}
-- TAG-GRANTGROUPCONFIG-STOP
-- ASN1STOP
```

```
-- ASN1START
-- TAG-CONFIGUREDGRANTCONFIG-START
GrantGroupConfig ::=    SEQUENCE {
ID                      INTEGER(1..N),      -- Group-grant ID
grant-ID                LIST of G values    -- List of IDs of grants
                                            that belong to the group-grant
}
-- TAG-GRANTGROUPCONFIG-STOP
-- ASN1STOP
```

What is claimed is:

1. A wireless transmit/receive unit (WTRU) comprising: a processor and memory, wherein the processor and memory are configured to:
receive one or more configured grants, each of the one or more configured grants comprising an indication of periodic transmission resources, each periodic transmission resource comprising time and frequency resources for hybrid automatic repeat request (HARQ) process transmission;
send a transmission in accordance with a first configured grant of the one or more configured grants, wherein the transmission is associated with one or more HARQ processes and control information, the control information comprising a HARQ process identifier (ID) and a redundancy version (RV) for each of the one or more HARQ processes, wherein a number of resources for the control information is based on an offset value;
receive a downlink control information (DCI) using an ID of the WTRU, the DCI comprising a downlink feedback indicator and a bitmap, wherein each bit of the bitmap indicates feedback for a corresponding HARQ process of the one or more HARQ processes; and
retransmit data associated with a first HARQ process of the one or more HARQ processes, upon determining a negative acknowledgement for the first HARQ process based on the downlink feedback indicator and the bitmap for a prior transmission of the data associated with the first HARQ process.

2. The WTRU of claim 1, wherein the processor and memory are further configured to:
start a retransmission timer upon transmitting the data associated with the first HARQ process;
retransmit, in accordance with the first configured grant if no acknowledgement is received prior to expiration of the retransmission timer, the data associated with the first HARQ process.

3. The WTRU of claim 1, wherein the processor and memory are further configured to determine, via the DCI, an acknowledgement for a second HARQ process, wherein data associated with the second HARQ process is not transmitted via the first configured grant.

4. The WTRU of claim 1, wherein the processor and memory are further configured to: indicate the time resources for the DCI on two or more contiguous transmissions on the first configured grant.

5. The WTRU of claim 1, wherein the processor and memory are further configured to:
receive, from a second device, a configuration for each of multiple configured grants, each configuration comprising a configured grant ID, the configurations being distinguished from each other by their reference signals;
select the first configured grant from the multiple configured grants; and indicate, to the second device via a reference signal, the selection of the first configured grant.

6. The WTRU of claim 5, wherein the second device is a gNB.

7. The WTRU of claim 5, wherein the processor and memory are further configured to receive, through a command in a single control signal, a joint activation of the multiple configured grants.

8. The WTRU of claim 7, wherein the processor and memory are further configured to receive, through a command in a single control signal, a joint deactivation of the multiple configured grants.

9. The apparatus of claim 5, wherein the processor and memory are further configured to select the first configured grant from the multiple configured grants based, at least in part, on the first configured grant providing a lowest latency to transmit a HARQ process.

10. The WTRU of claim 1, wherein a number of coded modulation signals per layer associated with control information transmission is determined based in part on the offset value.

11. A base station comprising a processor and memory, wherein the processor and memory are configured to:
send one or more configured grants, each of the one or more configured grants comprising an indication of periodic transmission resources, each periodic transmission resource comprising time and frequency resources for hybrid automatic repeat request (HARQ) process transmission;
receive a transmission in accordance with a first configured grant of the one or more configured grants, wherein the transmission is associated with one or more HARQ processes and control information, the control information comprising a HARQ process identifier (ID) and a redundancy version (RV) for each of the one or more HARQ processes, wherein a number of resources for the control information is based on an offset value;
transmit a downlink control information (DCI) using an ID of the WTRU, the DCI comprising a downlink feedback indicator and a bitmap, wherein each bit of the bitmap indicates feedback for a corresponding HARQ process of the one or more HARQ processes, and wherein the downlink feedback indicator and the bitmap indicate a negative acknowledgement for a prior transmission of data associated with a first HARQ process of the one or more HARQ processes; and
receive a retransmission of the data associated with the first HARQ process of the one or more HARQ processes.

12. The base station in claim 11, wherein the processor and memory are further configured to send, via the DCI, an acknowledgement for a second HARQ process, wherein data associated with the second HARQ process is not transmitted through the first configured grant.

13. The base station in claim 11, wherein the processor and memory are further configured to receive the time resources for the DCI on two or more contiguous transmissions on the first configured grant.

14. The base station of claim 11, wherein the processor and memory are further configured to:
send a configuration for each of multiple configured grants, each configuration comprising a configured grant ID, the configurations being distinguished from each other by their reference signals; and
receive, via a reference signal, an indication of a selection of the first configured grant.

15. The base station of claim 14, wherein the processor and memory are further configured to send, through a command in a single control signal, a joint deactivation of the multiple configured grants.

16. The base station of claim 11, wherein a number of coded modulation signals per layer associated with control information transmission is determined based in part on the offset value.

17. A method performed by a wireless transmit/receive unit (WTRU) and comprising:
- receiving one or more configured grants, each of the one or more configured grants comprising an indication of periodic transmission resources, each periodic transmission resource comprising time and frequency resources for hybrid automatic repeat request (HARQ) process transmission;
- sending a transmission in accordance with a first configured grant of the one or more configured grants, wherein the transmission is associated with one or more HARQ processes and control information, the control information comprising a HARQ process identifier (ID) and a redundancy version (RV) for each of the one or more HARQ processes, wherein a number of resources for the control information is based on an offset value;
- receiving a downlink control information (DCI) using an ID of the WTRU, the DCI comprising a downlink feedback indicator and a bitmap, wherein each bit of the bitmap indicates feedback for a corresponding HARQ process of the one or more HARQ processes; and
- retransmitting data associated with a first HARQ process of the one or more HARQ processes, upon determining a negative acknowledgement for the first HARQ process based on the downlink feedback indicator and the bitmap for a prior transmission of the data associated with the first HARQ process.

18. The method of claim 17, wherein a number of coded modulation signals per layer associated with control information transmission is determined based in part on the offset value.

* * * * *